US012178772B2

(12) United States Patent
Kuehne et al.

(10) Patent No.: US 12,178,772 B2
(45) Date of Patent: *Dec. 31, 2024

(54) DIFFERENTIAL AIR PRESSURE SYSTEMS AND METHODS OF USING AND CALIBRATING SUCH SYSTEMS FOR MOBILITY IMPAIRED USERS

(71) Applicant: ALTERG, INC., Fremont, CA (US)

(72) Inventors: Eric Richard Kuehne, Los Gatos, CA (US); Christopher Loew, Newark, CA (US); Glen R. Mangseth, El Dorado Hills, CA (US); Kenneth R. Krieg, Fremont, CA (US); David P. Grenewetzki, Novato, CA (US); Clifford T. Jue, Santa Cruz, CA (US); Trevor L. Donald, Buckinghamshire (GB)

(73) Assignee: AlterG, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,662

(22) Filed: Jul. 27, 2023

(65) Prior Publication Data

US 2024/0130917 A1 Apr. 25, 2024
US 2024/0225935 A9 Jul. 11, 2024

Related U.S. Application Data

(63) Continuation of application No. 17/073,267, filed on Oct. 16, 2020, now Pat. No. 11,752,058, which is a
(Continued)

(51) Int. Cl.

*A61H 1/02* (2006.01)
*A61H 9/00* (2006.01)
(Continued)

(52) U.S. Cl.

CPC ....... *A61H 1/0229* (2013.01); *A63B 22/0235* (2013.01); *A63B 69/0064* (2013.01);
(Continued)

(58) Field of Classification Search

CPC .... A61H 2201/0103; A61H 2201/5061; A61H 2201/0161; A61H 2201/1652; A61H 1/00;
(Continued)

(56) References Cited

U.S. PATENT DOCUMENTS

| | | |
|---|---|---|
| 44,198 A | 9/1864 | Jones |
| 54,530 A | 5/1866 | Hadfield |

(Continued)

FOREIGN PATENT DOCUMENTS

| | | |
|---|---|---|
| CN | 2034152 U | 3/1989 |
| CN | 2208414 Y | 9/1995 |

(Continued)

OTHER PUBLICATIONS

"Feedback Control System;" The Encyclopedia Americana International Edition; pp. 82-84; Dec. 2003.

(Continued)

*Primary Examiner* — Tu A Vo
(74) *Attorney, Agent, or Firm* — Shay Glenn LLP

(57) ABSTRACT

Described herein are various embodiments of differential air pressure systems and methods of using and calibration such systems for individuals with impaired mobility. The differential air pressure systems may include an access assist device configured to help a mobility impaired user to stand in a pressure chamber configured to apply a positive pressure on a portion of the user's body in the sealed pressure chamber. The system may also include load sensors configured to measure the user's weight exerted inside and outside the chamber. The system may be calibrated by determining a relationship between the actual weight of the user and the
(Continued)

pressure in the chamber, where the actual weight of the user may be measured by more than one load sensor and at least one load sensor is not in the pressure chamber.

18 Claims, 41 Drawing Sheets

Related U.S. Application Data continuation of application No. 15/993,136, filed on May 30, 2018, now abandoned, which is a continuation of application No. 13/423,124, filed on Mar. 16, 2012, now abandoned.

(60) Provisional application No. 61/454,432, filed on Mar. 18, 2011.

(51) Int. Cl.
*A63B 22/02* (2006.01)
*A63B 69/00* (2006.01)
*A63B 71/00* (2006.01)
*A63B 22/00* (2006.01)

(52) U.S. Cl.
CPC .......... *A63B 71/0009* (2013.01); *A61H 9/005* (2013.01); *A61H 2201/0103* (2013.01); *A61H 2201/0161* (2013.01); *A61H 2201/0173* (2013.01); *A61H 2201/1652* (2013.01); *A61H 2201/5061* (2013.01); *A61H 2201/5071* (2013.01); *A61H 2201/5097* (2013.01); *A61H 2203/0406* (2013.01); *A61H 2203/0431* (2013.01); *A61H 2230/80* (2013.01); *A63B 2022/0094* (2013.01); *A63B 2071/0018* (2013.01); *A63B 2208/053* (2013.01); *A63B 2220/51* (2013.01); *A63B 2225/50* (2013.01)

(58) Field of Classification Search
CPC .. A61H 1/0229; A61H 1/0237; A61H 1/0262; A61H 9/005; A61H 2003/002; A61H 3/008; A61H 2201/0173; A61H 2201/5071; A61H 2203/0406; A61H 2201/5097; A61H 2230/30; A61H 2230/305; A63B 69/0064; A63B 22/0235; A63B 71/0009; A63B 2071/0018; A63B 2220/51; A63B 2225/50; A63B 2022/0094; A63B 2208/053
See application file for complete search history.

(56) References Cited

U.S. PATENT DOCUMENTS 60,883 A 1/1867 Hadfield
72,631 A 12/1867 Hadfield
100,867 A 3/1870 Curran
871,074 A 11/1907 Stockton
1,336,774 A * 4/1920 Cooper .............. A63B 22/0605 482/57
1,504,166 A 8/1924 Thornley
2,785,004 A 3/1957 Cooper
3,165,314 A 1/1965 Clearman et al.
3,176,793 A 4/1965 Roland
3,292,613 A 12/1966 Macleod
3,332,176 A 7/1967 Knetzer
3,335,529 A 8/1967 Gedney
3,353,309 A 11/1967 Kwake
3,428,015 A 2/1969 Cloud
3,768,467 A 10/1973 Jennings
3,911,913 A 10/1975 June
4,149,712 A 4/1979 Murphy
4,257,407 A 3/1981 Macchi
4,343,302 A 8/1982 Dillon
4,411,422 A 10/1983 Solloway
4,509,513 A 4/1985 Lasley
4,536,163 A 8/1985 Schnirch et al.
4,576,376 A 3/1986 Miller
4,614,337 A 9/1986 Schönenberger
4,621,621 A 11/1986 Marsalis
4,712,788 A 12/1987 Gaudreau, Jr.
4,731,882 A 3/1988 Ekman
4,776,581 A 10/1988 Shepherdson
4,805,601 A 2/1989 Eischen, Sr.
4,887,317 A 12/1989 Phillips et al.
4,934,694 A 6/1990 McIntosh
4,959,047 A 9/1990 Tripp, Jr.
4,974,829 A 12/1990 Gamow et al.
5,029,579 A 7/1991 Trammel
5,075,902 A 12/1991 McReynolds et al.
5,112,045 A 5/1992 Mason et al.
5,133,339 A * 7/1992 Whalen ............ A63B 21/00181 482/52
5,242,339 A 9/1993 Thornton
5,273,502 A * 12/1993 Kelsey ................ A61H 1/0229 482/69
5,295,929 A 3/1994 Weisz
5,356,361 A * 10/1994 Watenpaugh .... A63B 21/00069 482/111
5,368,532 A 11/1994 Farnet
5,372,561 A 12/1994 Lynch
5,398,678 A 3/1995 Gamow
5,527,242 A 6/1996 Gangloff
5,569,129 A 10/1996 Naraghi et al.
5,571,062 A 11/1996 Saganovsky
5,577,598 A 11/1996 Schoenenberger
5,623,944 A * 4/1997 Nashner ............... A61B 5/1038 600/595
5,626,540 A 5/1997 Hall
5,662,311 A 9/1997 Waedekin et al.
5,667,461 A 9/1997 Hall
5,688,225 A 11/1997 Walker
5,702,323 A 12/1997 Poulton
5,706,822 A 1/1998 Khavari
5,738,612 A 4/1998 Tsuda
5,799,652 A 9/1998 Kotliar
5,830,162 A * 11/1998 Giovannetti ......... A61B 5/1038 482/69
5,860,857 A 1/1999 Wasastjerna et al.
5,919,419 A 7/1999 Majuri
5,921,892 A 7/1999 Easton
5,960,480 A 10/1999 Neustater et al.
6,027,464 A 2/2000 Dahlquist
6,033,344 A 3/2000 Trulaske et al.
6,042,537 A 3/2000 Kaiser
6,146,315 A 11/2000 Schonenberger
6,174,268 B1 1/2001 Novak
6,273,844 B1 * 8/2001 Kelsey ............ A63B 21/00181 482/69
6,332,290 B1 12/2001 DeLamare
6,332,354 B1 12/2001 Lalor et al.
6,348,025 B1 2/2002 Schönenberger
6,405,685 B1 6/2002 Cox
6,482,128 B1 11/2002 Michalow
6,527,678 B1 3/2003 Wang et al.
6,539,946 B2 4/2003 Weyergans
6,565,624 B2 5/2003 Kutt et al.
6,609,054 B2 8/2003 Wallace
6,645,126 B1 11/2003 Martin et al.
6,656,091 B1 12/2003 Abelbeck et al.
6,666,831 B1 12/2003 Edgerton et al.
6,689,075 B2 * 2/2004 West .................... A61H 1/0262 482/69
D495,384 S 8/2004 Rolfes
6,783,482 B2 8/2004 Oglesby et al.
6,821,233 B1 11/2004 Colombo et al.
6,905,459 B2 6/2005 Humphries, Jr.
6,918,858 B2 7/2005 Watterson et al.
7,141,007 B2 11/2006 Egger
7,166,064 B2 1/2007 Watterson et al.
7,381,163 B2 6/2008 Gordon et al.
7,544,172 B2 6/2009 Santos-Munne et al.

(56) References Cited

U.S. PATENT DOCUMENTS

| | | | | |
|---|---|---|---|---|
| 7,556,040 | B2 | 7/2009 | Meyer et al. | |
| 7,591,795 | B2 * | 9/2009 | Whalen .................. | A63B 22/02 600/19 |
| 7,594,281 | B1 | 9/2009 | Stinson et al. | |
| 7,762,930 | B2 * | 7/2010 | Egger .................. | A61H 1/0237 482/57 |
| 7,837,597 | B2 | 11/2010 | Reyes et al. | |
| 7,850,629 | B2 | 12/2010 | Ravikumar | |
| 7,857,731 | B2 | 12/2010 | Hickman et al. | |
| 7,862,478 | B2 | 1/2011 | Watterson et al. | |
| 7,883,450 | B2 | 2/2011 | Hidler | |
| 7,914,420 | B2 | 3/2011 | Daly et al. | |
| 7,955,219 | B2 | 6/2011 | Birrell et al. | |
| 8,083,643 | B2 | 12/2011 | Ng et al. | |
| 8,172,724 | B2 | 5/2012 | Solomon | |
| 8,235,724 | B2 | 8/2012 | Gilley et al. | |
| 8,447,401 | B2 | 5/2013 | Miesel et al. | |
| 8,464,716 | B2 | 6/2013 | Kuehne et al. | |
| 8,762,167 | B2 | 6/2014 | Blander et al. | |
| 8,840,572 | B2 | 9/2014 | Whalen et al. | |
| 9,087,454 | B2 | 7/2015 | Crivello et al. | |
| 9,642,764 | B2 | 5/2017 | Kuehne et al. | |
| 9,672,754 | B2 | 6/2017 | Yuen et al. | |
| 9,914,003 | B2 | 3/2018 | Kuehne et al. | |
| 10,265,565 | B2 | 4/2019 | Jue et al. | |
| 10,342,461 | B2 | 7/2019 | Basta et al. | |
| 1,493,309 | A1 | 12/2019 | Jue et al. | |
| 11,752,058 | B2 * | 9/2023 | Kuehne .............. | A63B 69/0064 601/5 |
| 2001/0018564 | A1 | 8/2001 | Manor et al. | |
| 2002/0022554 | A1 | 2/2002 | Borsheim | |
| 2002/0025889 | A1 * | 2/2002 | Egger ................ | A63B 22/0605 482/57 |
| 2002/0032103 | A1 | 3/2002 | Cook | |
| 2002/0065173 | A1 | 5/2002 | Cook | |
| 2003/0032904 | A1 | 2/2003 | Egger | |
| 2003/0046113 | A1 | 3/2003 | Johnson et al. | |
| 2003/0153438 | A1 * | 8/2003 | Gordon .............. | A63B 69/0064 482/92 |
| 2003/0204148 | A1 | 10/2003 | Lange et al. | |
| 2004/0016043 | A1 | 1/2004 | Uno et al. | |
| 2004/0019304 | A1 * | 1/2004 | West .................... | A61H 1/0237 601/5 |
| 2004/0171465 | A1 | 9/2004 | Hald et al. | |
| 2004/0238285 | A1 | 12/2004 | Stokes | |
| 2004/0249675 | A1 | 12/2004 | Stark et al. | |
| 2004/0259689 | A1 | 12/2004 | Wilkins et al. | |
| 2005/0075680 | A1 | 4/2005 | Lowry et al. | |
| 2005/0239613 | A1 | 10/2005 | Colombo et al. | |
| 2006/0009333 | A1 | 1/2006 | Wang | |
| 2006/0052728 | A1 * | 3/2006 | Kerrigan .......... | A63B 21/00181 600/595 |
| 2006/0185065 | A1 | 8/2006 | Allen | |
| 2006/0190051 | A1 | 8/2006 | Gerber et al. | |
| 2006/0199712 | A1 | 9/2006 | Barnard et al. | |
| 2006/0240947 | A1 | 10/2006 | Qu | |
| 2006/0247104 | A1 * | 11/2006 | Grabiner ............ | A63B 69/0064 482/54 |
| 2007/0054783 | A1 | 3/2007 | Egger | |
| 2007/0104316 | A1 | 5/2007 | Ruchala et al. | |
| 2007/0219059 | A1 | 9/2007 | Schwartz et al. | |
| 2007/0272484 | A1 | 11/2007 | Helms | |
| 2008/0070757 | A1 * | 3/2008 | Albert ................ | A63B 71/0009 482/54 |
| 2008/0109262 | A1 | 5/2008 | Dovark et al. | |
| 2008/0246581 | A1 | 10/2008 | Irie et al. | |
| 2008/0281633 | A1 | 11/2008 | Burdea et al. | |
| 2008/0306412 | A1 | 12/2008 | Nieminen et al. | |
| 2009/0014004 | A1 | 1/2009 | Whalen et al. | |
| 2009/0036272 | A1 * | 2/2009 | Yoo .................... | A63B 22/0257 482/7 |
| 2009/0047644 | A1 | 2/2009 | Mensah et al. | |
| 2009/0082700 | A1 | 3/2009 | Whalen et al. | |
| 2009/0221404 | A1 | 9/2009 | Dorogusker et al. | |
| 2009/0236176 | A1 | 9/2009 | Sheu et al. | |
| 2009/0255531 | A1 | 10/2009 | Johnson et al. | |
| 2009/0269728 | A1 | 10/2009 | Verstegen et al. | |
| 2010/0000547 | A1 | 1/2010 | Johnson et al. | |
| 2010/0006737 | A1 | 1/2010 | Colombo et al. | |
| 2010/0170546 | A1 | 7/2010 | Popovic et al. | |
| 2011/0054946 | A1 | 3/2011 | Coulter et al. | |
| 2011/0098157 | A1 | 4/2011 | Whalen et al. | |
| 2011/0098615 | A1 | 4/2011 | Whalen et al. | |
| 2011/0179068 | A1 | 7/2011 | O'Brien | |
| 2011/0312473 | A1 | 12/2011 | Chu et al. | |
| 2012/0029666 | A1 | 2/2012 | Crowley et al. | |
| 2012/0238921 | A1 | 9/2012 | Kuehne et al. | |
| 2012/0277643 | A1 | 11/2012 | Whalen et al. | |
| 2012/0302301 | A1 | 11/2012 | Homsi | |
| 2013/0095459 | A1 | 4/2013 | Tran | |
| 2013/0117908 | A1 | 5/2013 | Dyson | |
| 2013/0325491 | A1 | 12/2013 | Ferrari | |
| 2014/0026893 | A1 | 1/2014 | Johnson et al. | |
| 2014/0058312 | A1 | 2/2014 | Ziehler et al. | |
| 2014/0113775 | A1 | 4/2014 | Egan | |
| 2015/0011917 | A1 | 1/2015 | Whalen et al. | |
| 2015/0379239 | A1 | 12/2015 | Basta et al. | |
| 2016/0000155 | A1 | 1/2016 | Marecek et al. | |
| 2016/0073704 | A1 | 3/2016 | Basta et al. | |
| 2016/0242993 | A1 | 8/2016 | Whalen et al. | |
| 2017/0014295 | A1 | 1/2017 | Whalen et al. | |
| 2017/0128769 | A1 | 5/2017 | Long et al. | |
| 2017/0367916 | A1 | 12/2017 | Kuehne et al. | |
| 2019/0046828 | A1 | 2/2019 | Kuehne et al. | |
| 2019/0099315 | A1 | 4/2019 | Kuehne et al. | |
| 2019/0099320 | A1 | 4/2019 | Whalen et al. | |
| 2019/0150530 | A1 | 5/2019 | Basta et al. | |
| 2019/0392939 | A1 | 12/2019 | Basta et al. | |
| 2020/0221975 | A1 | 7/2020 | Basta et al. | |
| 2020/0384309 | A1 | 12/2020 | Long et al. | |
| 2021/0187347 | A1 | 6/2021 | Remsberg et al. | |
| 2021/0187348 | A1 | 6/2021 | Phillips et al. | |
| 2021/0196552 | A1 | 7/2021 | Whalen et al. | |
| 2021/0205165 | A1 | 7/2021 | Kuehne et al. | |
| 2021/0251841 | A1 | 8/2021 | Whalen et al. | |
| 2022/0054893 | A1 | 2/2022 | Basta et al. | |
| 2022/0059198 | A1 | 2/2022 | Basta et al. | |
| 2023/0058141 | A1 | 2/2023 | Long et al. | |
| 2023/0240928 | A1 | 8/2023 | Kuehne et al. | |
| 2023/0263695 | A1 | 8/2023 | Whalen et al. | |

FOREIGN PATENT DOCUMENTS

| | | | |
|---|---|---|---|
| DE | 20305670 | U1 | 8/2003 |
| DE | 10362043 | A1 | 5/2005 |
| DE | 102006010887 | A1 | 9/2007 |
| GB | 2128488 | A | 5/1984 |
| JP | 59002993 | A | 1/1984 |
| JP | 63109878 | A | 5/1988 |
| JP | 05500760 | A | 2/1993 |
| JP | 05049596 | A | 6/1993 |
| JP | 1022334 | S | 10/1998 |
| JP | 11113988 | A | 4/1999 |
| JP | 2000342713 | A | 12/2000 |
| JP | 2001112886 | A | 4/2001 |
| JP | 2001517187 | A | 10/2001 |
| JP | 200228202 | A | 1/2002 |
| JP | 2002360644 | A | 12/2002 |
| JP | 2004073445 | A | 3/2004 |
| JP | 2005102798 | A | 4/2005 |
| JP | 2007151676 | A | 6/2007 |
| JP | 2008538511 | A | 10/2008 |
| JP | 1395000 | S | 8/2010 |
| JP | 1421980 | S | 8/2011 |
| JP | 2012214936 | A | 11/2012 |
| TW | 425592 | B | 3/2001 |
| TW | I235427 | B | 7/2005 |
| WO | WO2004/103176 | A1 | 12/2004 |
| WO | WO2006/050787 | A1 | 5/2006 |
| WO | WO2006/061834 | A2 | 6/2006 |
| WO | WO2007/038888 | A1 | 4/2007 |
| WO | WO2007/115565 | A2 | 10/2007 |
| WO | WO2008/058567 | A1 | 5/2008 |

(56) References Cited

FOREIGN PATENT DOCUMENTS

| | | | |
|---|---|---|---|
| WO | WO2010/132550 | A1 | 11/2010 |
| WO | WO2012/129125 | A2 | 9/2012 |
| WO | WO2013/019956 | A1 | 2/2013 |
| WO | WO2013/021709 | A1 | 2/2013 |
| WO | WO2019/079655 | A1 | 4/2019 |

OTHER PUBLICATIONS

Hamilton; Low-Tech Alternative to AlterG on Market; Runner's World; 2 pgs.; Aug. 16, 2012; (printed from internet: http://www.runnersworld.com/elite-runners/low-tech-alternative-alterg-market).

Hargens et al.; Lower body negative pressure to provide load bearing in space; Aviat Space Environ Med; 62(10); pp. 934-937; Oct. 1991.

Kawai et al.; Rehabilitation apparatus for treadmill walking using lower body positive pressure (Japanese & English abstracts); Aerospace and Environmental Medicine; vol. 44; No. 4; 2007.

Vacu Well Wellness & Beauty; Company History and Vacu Well Power Professional treadmill specifications; printed from website (http://www.vacuwell.com); 3 pgs.; printed Apr. 4, 2012.

Phillips et al.; U.S. Appl. No. 18/319,290 entitled "System for unweighting a user and related methods of exercise," filed May 17, 2023.

Long et al.; U.S. Appl. No. 18/450,961 entitled "Pressure chamber and lift for differential air pressure system with medical data collection capabilities," filed Aug. 16, 2023.

Basta et al.; U.S. Appl. No. 18/476,016 entitled "Method of gait evaluation and training with differential pressure system," filed Sep. 27, 2023.

Remsberg et al.; U.S. Pat. Appl. # U.S. Appl. No. 18/419,253 entitled "Gait data collection and analytics system and methods for operating unweighting training systems," filed Jan. 22, 2024.

* cited by examiner

DIFFERENTIAL AIR PRESSURE SYSTEMS AND METHODS OF USING AND CALIBRATING SUCH SYSTEMS FOR MOBILITY IMPAIRED USERS

CROSS REFERENCE TO RELATED APPLICATIONS

This application is a continuation of U.S. patent application Ser. No. 17/073,267, filed Oct. 16, 2020, titled "DIFFERENTIAL AIR PRESSURE SYSTEMS AND METHODS OF USING AND CALIBRATING SUCH SYSTEMS FOR MOBILITY IMPAIRED USERS," now U.S. Patent Application Publication No. 2021/0267833, which is a continuation of U.S. patent application Ser. No. 15/993,136, filed May 30, 2018, titled "DIFFERENTIAL AIR PRESSURE SYSTEMS AND METHODS OF USING AND CALIBRATING SUCH SYSTEMS FOR MOBILITY IMPAIRED USERS," now U.S. Patent Application Publication No. 2019/0099315, which is a continuation of U.S. patent application Ser. No. 13/423,124, filed Mar. 16, 2012, titled "DIFFERENTIAL AIR PRESSURE SYSTEMS AND METHODS OF USING AND CALIBRATING SUCH SYSTEMS FOR MOBILITY IMPAIRED USERS" now U.S. Patent Application Publication No. 2012/0238921, which claims benefit to U.S. Provisional Patent Application No. 61/454,432, filed on Mar. 18, 2011 and titled "DIFFERENTIAL AIR PRESSURE SYSTEMS."

INCORPORATION BY REFERENCE

All publications and patent applications mentioned in this specification are herein incorporated by reference to the same extent as if each individual publication or patent application was specifically and individually indicated to be incorporated by reference.

FIELD

Described herein are various embodiments of differential air pressure systems for use by individuals with impaired mobility and methods of calibrating and using such systems.

BACKGROUND

Methods of counteracting gravitational forces on the human body have been devised for therapeutic applications as well as physical training. Rehabilitation from orthopedic injuries or neurological conditions often benefits from precision unweighting (i.e. partial weight bearing) therapy. One way to counteract the effects of gravity is to suspend a person using a body harness to reduce ground impact forces. However, harness systems may cause pressure points that may lead to discomfort and sometimes even induce injuries. Another approach to counteract the gravity is to submerge a portion of a user's body into a water-based system and let buoyancy provided by the water offset gravity. However, the upward supporting force provided by such water-based systems distributes unevenly on a user's body, varying with the depth of the user's body from the water surface. Moreover, the viscous drag of the water may substantially alter the muscle activation patterns of the user.

Differential Air Pressure (DAP) systems have been developed to use air pressure in, for example, a sealed chamber to simulate a low gravity effect and support a patient at his center of gravity without the discomfort of harness systems or the inconvenience of water-based therapies. DAP systems generally utilize a chamber for applying differential air pressure to a portion of a user's body, but in order to use these systems, a user must first be able to access the chamber, which may require stepping or climbing over one or more portions of the system. In some instances, an individual may have limited or low degree of mobility which may hinder his ability to access the chamber. For example, patients who have suffered a stroke or physical injury may be wheelchair-bound or bedridden and unable to walk or stand independently without a great deal of assistance. Similarly, patients who have a lesser degree of impairment such as muscle strain or a sprain may also require a moderate amount of assistance to enter, stand in, and exit the chamber. Accordingly, these patients with varying levels of impaired mobility may not be able to take advantage of the many benefits of differential air pressure therapy because of the difficulty in getting in and out of the systems. As such a need exists for a DAP system that allows patients with varying degrees of impaired mobility to access and use DAP therapy systems.

In addition, another obstacle to providing treatment for the mobility impaired user is the proper calibration of a DAP system for the disabled user. A DAP system is often calibrated for each user prior to initiating therapy. In the past, calibration of DAP systems has relied on the ability to weigh the patient on a ground mounted horizontal surface scale which required the patient to stand still on their feet during calibration for several minutes. Such calibration methods may be used for patients with a high degree of mobility requiring none or minimum assistance, but are difficult or impossible to employ for individuals who require greater assistance, especially for those who cannot bear their own weight upright. Although DAP systems can be used even with mobility impaired individuals without calibration, calibration improves the precision of the treatment and provides personalized therapy for the user. A calibrated DAP system can deliver precise, repeatable unweighting regimes and therapies accurate to 1% of patient weight. Precision is desirable as it allows clinicians and doctors to control a treatment and rehabilitation protocol with great specificity to deliver maximum rehabilitation effectiveness. As such, there is a need for a calibration system and method for allowing calibration of a DAP system where the user requires weight support assistance during the calibration procedure.

SUMMARY OF THE DISCLOSURE

The present invention relates to differential air pressure systems that provide therapeutic conditioning and training for individuals with impaired mobility. Included in this description are methods and devices configured to assist users with impaired mobility in entering, exiting, and using differential air pressure systems.

Some embodiments described provide a differential air pressure (DAP) system with an access assist device designed to improve mobility of a disabled individual. These differential pressure systems may include a pressure chamber with a seal interface configured to receive a portion of a disabled user's body and to form a seal between the user's body and the chamber, the chamber is configured to apply pressure to the portion of the user's body while the user's body is sealed in the chamber; an exercise device can be placed in the pressure chamber, where the exercise device is configured to contact the user's body while the exercise device is in operation; a first load sensor is coupled to the exercise device, the first load sensor configured to measure the load applied by the user to the exercise device while the user is in the chamber and provide an output signal; a second load sensor is coupled to the differential pressure system at a position that is different than the first load sensor and configured to provide an output signal.

Optionally, in any of the preceding embodiments, a processor may be configured to receive the output signals from the load sensors and to calibrate the system for use by the disabled user.

Additionally, in any of the preceding embodiments, calibrating the system may entail generating a relationship between pressure in the chamber and actual weight of the user while the user is sealed in the chamber, wherein the actual weight of the user is the total load or total user weight measured by the first and second load sensors at pressure points, the processor regulating the pressure of the chamber according to said relationship.

Optionally, in any of the preceding embodiments, the DAP system may further comprise an access assist device configured to assist the disabled user's access to the chamber. Additionally, in any of the preceding embodiments, the second load sensor may be in communication with the access assist device. Additionally, in any of the preceding embodiments, the second load sensor may be positioned on the access assist device.

Optionally, in any of the preceding embodiments, the access assist device is configured to vertically adjust the user's position relative to the chamber. Optionally, in any of the preceding embodiments, the access assist device is configured to bear a portion of the user's weight during calibration.

Additionally, in any of the preceding embodiments, the access assist device is configured to bear substantially all of the user's weight during calibration.

Optionally, in any of the preceding embodiments, the DAP system may further have a plurality of load sensors coupled to the pressure chamber and configured to engage the portion of the user's body sealed in the pressure chamber and a plurality of load sensors coupled to the differential pressure system and configured to engage the user's body outside the sealed interface of the pressure chamber.

Optionally, in any of the preceding embodiments, the DAP system has a first load sensor positioned within the pressure chamber and is configured to engage the portion of the user's body in the pressure chamber, and a second load sensor positioned outside the pressure chamber and the second load sensor is configured to engage the user's body outside the pressure chamber.

Optionally, in any of the preceding embodiments, the DAP system includes a treadmill comprising a runway belt and a load sensor under the runway belt.

Optionally, in any of the preceding embodiments, calibrating the system includes using an actual weight of the user which is provided by the total load or total user weight measured by the plurality of load sensors coupled to the pressure chamber and configured to engage the portion of the user's body sealed in the pressure chamber and a plurality of load sensors coupled to the differential pressure system and configured to engage the user's body outside the sealed interface of the pressure chamber.

Optionally, in any of the preceding embodiments, the DAP system includes handrails outside the pressure chamber. Additionally, the handrails may be optionally configured to bear the user's weight anywhere along the length of the handrail. Load sensors may be mounted or removably connected to the handrail to measure the amount of weight supported by the handrails.

Optionally, in any of the preceding embodiments, the DAP system has a seal frame supporting the seal of the pressure chamber and configured to support the weight of the user, wherein the second load sensor measures the weight supported during supported during calibration.

Additionally, in any of the preceding embodiments, the DAP system can include a frame assembly that the disabled user's weight during calibration and a load sensor measures the amount of weight borne by the frame assembly.

Optionally, in any of the preceding embodiments, the access assist device can include a user connection configured to adjust the position of the disabled user relative to the seal of the chamber.

Optionally, in any of the preceding embodiments, the access assist device can include a hoist device. Additionally, the access assist device can use a harness assembly designed to be worn by the user. In other variations, the access assist device can include an overhead suspension device.

Other embodiments described herein provide for a DAP system for improving mobility of a disabled individual only able to stand with assistance where the DAP system has a pressure chamber with a seal interface configured to receive a portion of a disabled user's body and to form a seal between the user's body and the chamber; a blower and valve control system configured to apply pressure to the portion of the user's body while the user's body is sealed in the chamber; an exercise device within the pressure chamber, wherein the exercise device is configured to contact the user's body while a portion of the user's body is within the seal interface; an access assist device configured to assist the disabled user's ingress and egress to the chamber; a first load sensor positioned in the pressure chamber below the user's torso and configured to measure the weight of the user in the chamber and communicate the measurements to a processor; a second load sensor positioned on the system outside the pressure chamber and configured to measure the weight of the user exerted on the access assist device and communicate the measurements to a processor; a processor configured to receive weight input from inside and outside the pressure chamber, wherein the processor calibrates the system for the user system by generating a relationship between pressure in the chamber and actual weight of the user, wherein the actual weight of the user is provided by the total weight measured by the load sensors at pressure points, the processor regulating the pressure of the chamber according to said relationship.

Optionally, in any of the preceding embodiments, the load sensors can be placed on the access assist device.

In further variations, the access assist device comprises a support frame attached to the system and configured to support a portion of the disabled user's weight while the user is upright.

Optionally, in any of the preceding embodiments, the support frame is detachable from the system. In some variations, the support frame is a detachable support bar and can electronically communicate wirelessly or through a wired connection with the processor.

Additionally, in any of the preceding embodiments, the access assist device vertically and horizontally adjusts the position of the disabled user.

Optionally, in any of the preceding embodiments, the DAP system includes an interlocking mechanism configured to engage with at least one of the vertical adjustment or the horizontal adjustment of the access assist device, wherein the processor is configured to engage the interlocking mechanism to stop movement of the access assist device. In other variations, the interlocking mechanism comprises at least one interlock checkpoint at which the interlocking mechanism can engage if the chamber is not configured to receive the user.

Additionally, in any of the preceding embodiments, the access assist device supports at least a portion of the user's weight prior to calibration and provides substantially no weight support to the user following calibration. The access assist device can also optionally provide no weight support during calibration. Additionally, the access assist device may provide the user substantially no weight support while the chamber is pressurized and the exercise device is operating.

Optionally, in any of the preceding embodiments, the DAP system further includes at least one performance sensor for measuring a performance parameter of the user while the user is moving in contact with the exercise device.

Optionally in any of the preceding embodiments, the access assist device comprises a waist support device.

Optionally in any of the preceding embodiments, the access assist device is a motorized lift.

In another variation, the DAP system includes a pressure chamber with a seal interface configured to receive a portion of a disabled user's body and to form a seal between the user's body and the chamber, the chamber configured to apply pressure to the portion of the user's body while the user's body is sealed in the chamber; an exercise device placed in the pressure chamber, wherein the exercise device is configured to contact the user's body while the exercise device is in operation; a load sensor coupled to the exercise device, the load sensor configured to measure the weight applied by the user to the exercise device while the user is in the chamber and to provide an output signal for weight measurements; a calibration device configured to measure the weight of the user body exerted outside the pressure chamber, the calibration device providing an output signal for weight measurements; and a processor configured to receive the output signals from the load sensor and the calibration device to calibrate the system for use by the disabled user by generating a relationship between pressure in the chamber and actual weight of the user while the user is sealed in the chamber, wherein the actual weight of the user is the total load or total user weight measured by the load sensor and the calibration device at pressure points, the processor regulating the pressure of the chamber according to said relationship.

Additionally, in any of the preceding embodiments, at least one load sensor can be placed on the seal interface of the chamber.

Optionally, in any of the preceding embodiments, the calibration device is a support frame configured to support at least a portion of the user's weight during calibration. In some embodiments, the support frame is configured to allow the user to lean against the frame. In further variations, the support frame comprises at least one load sensor for measuring the weight exerted against the support frame during calibration. Optionally, in any of the preceding embodiments, the support frame can be a handrail or arm rest.

Optionally, in any of the preceding embodiments, the support frame is removable following calibration.

Optionally, in any of the preceding embodiments, the load sensor is part of a removable adjustable pad that can be attached to the support frame of an access assist device or the frame assembly of the DAP system.

Optionally, in any of the preceding embodiments, a portion of the support frame is inside the pressure chamber.

Optionally, in any of the preceding embodiments, the support frame is an overhead handlebar.

Optionally, in any of the preceding embodiments, the DAP system can include a height adjustable seal frame configured to receive and support a portion of the user's body. In some embodiments, the seal frame is height adjustable by way of a motorized lift configured to raise and lower the seal frame and generate an output signal reading the weight of the user raised or lowered by the motorized lift device.

Optionally, in any of the preceding embodiments, the calibration device is a support bar that can be removably inserted into a receiving channel on the system. The support bar can include circuitry allowing the bar to communicate with the processor. Optionally, in any of the preceding variations, the support bar can store user related data.

Additionally, in other variations, the support bar is detachable from a support bar receiver on the DAP system, where the support receiver is configured to measure the weight of the user exerted against the support bar.

Other embodiments herein also provide for a method of calibrating a differential pressure system for a disabled user with impaired mobility by supporting a portion of the user's weight with a calibration device; supporting another portion of the user's weight inside a sealed pressure chamber; sealing the chamber around an area of the user's body; and calibrating the differential pressure system for the disabled user based on the total weight supported.

Additionally, in any of the preceding embodiments, the method of calibrating includes detecting whether a calibration device has been connected to the system.

Additionally, in any of the preceding embodiments, the method of calibrating includes detecting that the calibration device has been disengaged from the system.

Optionally, in any of the preceding embodiments, load sensors can be configured to communicate wirelessly or through a wired path with the processor.

Other embodiments provide for a method of calibrating the differential pressure system by supporting at least a portion of the user weight in a pressure chamber with an access assist device having an assist device load sensor configured to measure the weight supported by the assist device while the user is in the pressure chamber; sealing the chamber around an area of the user's body; and calibrating the differential pressure system for the disabled user based on the total load or total user weight measure by the load sensor.

Optionally, in any of the preceding embodiments, the method of calibrating includes measuring the weight of the user using a load sensor in the pressure chamber; and calibrating the differential pressure system by measuring the total weight input from all the load sensors at different pressure levels.

Additionally, in any of the preceding embodiments, calibration includes generating a relationship between the pressure in the chamber and the actual weight of the user. In some embodiments, the actual weight of the user is the total load or total user weight measured by the load sensors in the access assist device and the chamber.

An additional method of calibrating includes lifting a user relative to an opening in a pressure chamber with an access assist device; lowering the user into the opening such that a portion of the user's body is in the pressure chamber; sealing the chamber around the portion of the patient's body; outputting a signal from a load sensor in the pressure chamber; outputting a signal from a load sensor coupled to the access assist device; and calibrating the differential pressure system for the disabled user based on the total load or total user weight measured by an output from a load sensor coupled to the pressure chamber and an output from the load sensor coupled to the access assist device.

Optionally, in any of the preceding embodiments, the system may have a pressure sensor in the chamber that outputs a signal on pressure in the chamber. Additionally, the pressure in the chamber may be regulated according to a relationship between pressure and the total load or total user weight measured from the load sensors at pressure points.

Other embodiments provide for a differential pressure system for improving mobility of a disabled individual, with a pressure chamber with a seal interface configured to receive a portion of a disabled user's body and to form a seal between the user's body and the chamber, the chamber configured to apply pressure to the portion of the user's body while the user's body is sealed in the chamber; a platform in the pressure chamber, wherein the platform is configured to contact the user's body; a first load sensor positioned substantially underneath the user's torso and configured to measure the load applied by the user while the user is in the chamber and to provide an output signal; a second load sensor coupled to the differential pressure system at a position that is different from the first load sensor, the second load sensor configured to provide an output signal; a processor configured to receive the output signals from the load sensors and to calibrate the system for use by the disabled user by generating a relationship between pressure in the chamber and actual weight of the user while the user is sealed in the chamber, wherein the actual weight of the user is the total weight of the user measured by the first and second load sensors at pressure points, the processor regulating the pressure of the chamber according to said relationship.

In any of the preceding embodiments, the system may optionally include an access assist device configured to assist the disabled user's access to the chamber, wherein the second load sensor is in communication with the access assist device. Additionally, the second load sensor may be positioned on the access assist device. Optionally, in any of the preceding embodiments, the access assist device is configured to bear a portion of the user's weight during calibration. Optionally, in any of the preceding embodiments, the access assist device is configured to bear substantially all of the user's weight during calibration.

Additionally, the system can include, optionally, a plurality of load sensors substantially underneath the user's torso and a plurality of load sensors coupled to the differential pressure system at one or more locations above the user's lower extremities. In some embodiments, the first load sensor is positioned within the pressure chamber and is configured to engage the portion of the user's body in the pressure chamber, and the second load sensor is positioned outside the pressure chamber and is configured to engage the user's body outside the pressure chamber. Optionally, in any of the preceding embodiments, the system comprises an actual weight of the user provided by the total user weight measured by the plurality of load sensors at a pressure point. Additionally, in any preceding embodiments, the total weight of the user is determined by summing the load measured by the first and second sensors and subtracting a baseline load measurement from the sum.

Optionally, in the any of the preceding embodiments, the system can further include a handrail outside the pressure chamber wherein the handrail is configured to bear a portion of the user's weight and the second load sensor measures the amount of the user's weight supported by the handrail during calibration.

Optionally, in any of the preceding embodiments, the system can further comprise a seal interface frame supporting the seal interface of the pressure chamber and configured to support the weight of the user, wherein the second load sensor measures the amount of the user's weight supported by the seal interface frame during calibration.

Optionally, in any of the preceding embodiments, the system can further comprise a frame assembly, wherein the frame assembly bears a portion of the disabled user's weight during calibration and the second load sensor measures the amount of the user's weight supported by the frame assembly during calibration.

Optionally, in any of the preceding embodiments, the access assist device comprises an overhead suspension device.

Optionally, in any of the preceding embodiments, the access assist device is a handrail, motored lift, or a support that is removably attachable to a frame on the system. Additionally, in any of the preceding embodiments, the support bar comprising an attachment mechanism to removably attach and detach the bar from the frame. The support bar can also output a measured load signal to the processor. Optionally, in any of the preceding embodiments, the support bar is configured to store user-related data. Optionally, in any of the preceding embodiments, the system further comprising a support bar receiver, wherein the support receiver is configured to measure the weight of the user exerted against the support bar while the support bar is attached to the system.

Optionally, in any of the preceding embodiments, any load sensor can be configured to communicate wirelessly, through wired connection, and/or both with the system or processor.

Optionally, in any of the preceding embodiments, the plurality of load sensors coupled to the system above the user's lower extremities are positioned on the system at a distance within the user's arm span.

Other embodiments provide a differential pressure system for improving mobility of a disabled individual, comprising a pressure chamber with a seal interface configured to receive a portion of a disabled user's body and to form a seal between the user's body and the chamber, the chamber configured to apply pressure to the portion of the user's body while the user's body is sealed in the chamber; an exercise device placed in the pressure chamber, wherein the exercise device is configured to contact the user's body while the exercise device is in operation; at least one load sensor on the exercise device, the load sensor configured to measure the load applied by the user to the exercise device while the user is in the chamber and to provide an output signal; at least one load sensor not on the exercise device and positioned on the differential pressure system above the user's lower extremities, the load sensor configured to provide an output signal; a processor configured to receive the output signals from the load sensors and to calibrate the system for use by the disabled user by generating a relationship between pressure in the chamber and actual weight of the user while the user is sealed in the chamber, wherein the actual weight of the user is the total user weight measured by the load sensors at pressure points, the processor regulating the pressure of the chamber according to said relationship.

Optionally, in any of the preceding embodiments, the exercise device is a treadmill comprising a runway belt and the load sensor on the exercise device is under the runway belt.

Optionally, in any of the preceding embodiments, the load sensor not on the exercise device is positioned on the access assist device.

Other embodiments provide for a method of calibrating a differential pressure system for a disabled user with impaired mobility comprising supporting at least a portion of the user's weight with an access assist device having an assist device load sensor configured to measure the user's weight supported by the assist device; positioning the user in a pressure chamber; sealing the chamber around an area of the user's body; and calibrating the differential pressure system for the disabled user based on the total user weight measured by the load sensor.

Optionally, in any of the preceding embodiments, calibrating further comprises calculating the total user weight by subtracting a baseline load measurement from the total load measured by the sensor. Optionally, in any of the preceding embodiments, calibrating further comprises zeroing the load sensor prior to supporting the user's weight. Optionally, in any of the preceding embodiments, calibrating further comprises supporting a portion of the user's weight from underneath the user's torso while the user is in the chamber, the chamber having a chamber load sensor to measure the supported user weight and calibrating the system based on the total user weight measured from the load sensors.

Another method of calibrating comprises lifting a user relative to an opening in a pressure chamber with an access assist device; lowering the user into the opening such that a portion of the user's body is in the pressure chamber; sealing the chamber around the portion of the patient's body; outputting a signal from a load sensor in the pressure chamber; outputting a signal from a load sensor coupled to the access assist device; and calibrating the differential pressure system for the disabled user based on the total user weight measured by an output from the load sensor in the pressure chamber and an output from the load sensor coupled to the access assist device. Optionally, in any of the preceding embodiments, the total user weight is calculated by subtracting a baseline load measurement from the total load measured by the load sensors while the user is sealed in the chamber.

Other embodiments provide for a differential pressure system for improving the mobility of a disabled individual comprising: a pressure chamber with a seal interface configured to receive a portion of a disabled user's body and to form a seal between the user's body and the chamber, the chamber configured to apply pressure to the portion of the user's body while the user's body is sealed in the chamber; an exercise device placed in the pressure chamber, wherein the exercise device is configured to contact the user's body while the exercise device is in operation; a load sensor coupled to the exercise device, the load sensor configured to measure the weight applied by the user to the exercise device while the user is in the chamber and to provide an output signal for weight measurements; a calibration device configured to measure the weight of the user's body exerted outside the pressure chamber, the calibration device providing an output signal for weight measurements; and a processor configured to receive the output signals from the load sensor and the calibration device to calibrate the system for use by the disabled user by generating a relationship between pressure in the chamber and actual weight of the user while the user is sealed in the chamber, wherein the actual weight of the user is the total user weight measured by the load sensor and the calibration device at pressure points, the processor regulating the pressure of the chamber according to said relationship.

Optionally, in any of the preceding embodiments, the calibration device is a support bar configured to removably attach to the system outside the pressure chamber. Optionally, in any of the preceding embodiments, the calibration device comprises a load sensor. Optionally, in any of the preceding embodiments, the calibration device supports a portion of the user's weight during calibration.

Other embodiments provide a differential air pressure system comprising a positive pressure chamber with a seal interface configured to receive a portion of a user's body and form a seal between the user's body and the chamber; a lift access device comprising a hoist device and a load sensor, wherein the load sensor outputs a load measurement when lifting a user; a load sensor attached a bottom portion of the pressure chamber, wherein the load sensor outputs a load measurement when a user is in the sealed chamber; and a processor configured to calibrate the system by receiving the load measurements from the load sensors, calculating the total user weight supported by the lift access device and chamber at pressure points, and generating a pressure weight relationship.

Additionally, in any of the preceding embodiments, the system may include an interlocking mechanism configured to engage with the lift access device, wherein the processor is configured to engage the interlocking mechanism to stop movement of the lift access device. Optionally, the interlocking mechanism comprises at least one interlock checkpoint at which the interlocking mechanism can engage if the chamber is not configured to receive the user.

Other embodiments provide for a method of improving cardiovascular function in a paralyzed user comprising lifting the paralyzed user; lowering and sealing the user into a pressure chamber of a differential pressure system; supporting a portion of the user's body such that the user is substantially upright; sealing the pressure chamber; calibrating the differential pressure system to generate a pressure-weight relationship; and regulating the pressure in the chamber according to the relationship.

Other embodiments provide for a method of improving a stroke patient's motor skills comprising supporting a portion of the patient's weight with a calibration device; supporting another portion of the patient's weight inside a sealed pressure chamber; sealing the chamber around an area of the patient's body; calibrating the differential pressure system; and regulating the pressure in the chamber according to the relationship.

BRIEF DESCRIPTION OF THE DRAWINGS

A better understanding of various features and advantages of the embodiments described herein may be obtained by reference to the following detailed description that sets forth illustrative examples and the accompanying drawings of which:

FIG. 4A is a frontal view of the pressure chamber and FIG. 4B is the top view of the chamber in FIG. 4A.

DETAILED DESCRIPTION

Described here are differential air pressure (DAP) systems designed to be used by individuals with impaired mobility. Generally, DAP systems utilize changes in air pressure to provide positive or negative weight support for training and rehabilitation systems and programs. Various examples of DAP systems are described in International Patent Application Serial No. PCT/US2006/038591, filed on Sep. 28, 2006, titled "Systems, Methods and Apparatus for Applying Air Pressure on A Portion of the Body of An Individual," International Patent Application Serial No. PCT/US2008/011807, filed on Oct. 15, 2008, entitled "Systems, Methods and Apparatus for Calibrating Differential Air Pressure Devices," International Patent Application Serial No. PCT/US2008/011832, filed on Oct. 15, 2008, entitled "Systems, Methods and Apparatus for Differential Air Pressure Devices," and International Patent Application Serial No. PCT/US2010/034518, filed on May 12, 2010, entitled "Differential Air Pressure Systems," all of which are hereby incorporated by reference in their entirety.

Figure 1A:
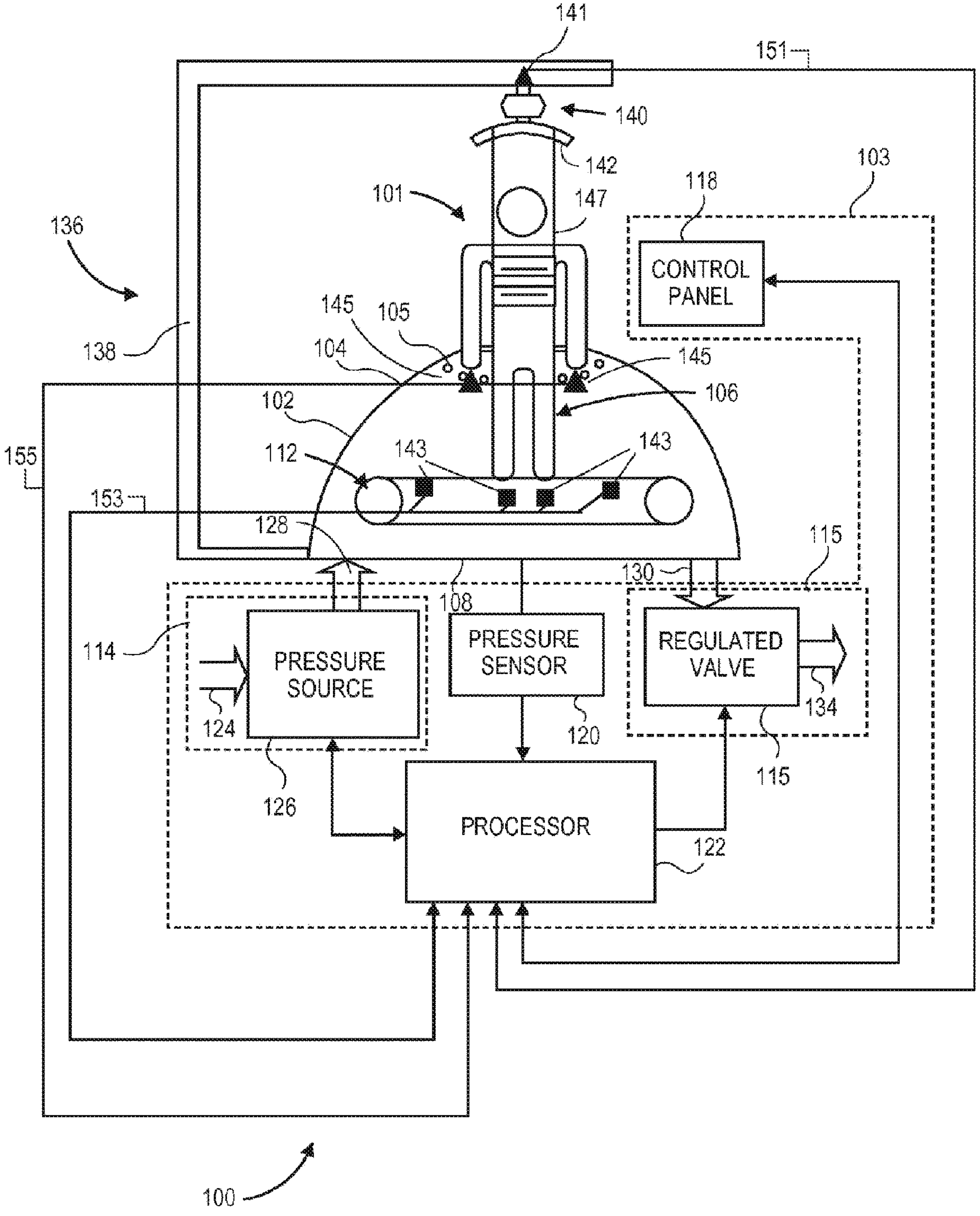
FIG. 1A is a block diagram schematically illustrating one example of a differential air pressure system according to one embodiment.

In some embodiments described herein, the DAP systems comprise a chamber for receiving at least a portion of a user's body and an access assist device for facilitating user access to the chamber. FIG. 1A schematically illustrates one example of a DAP system 100, comprising a sufficiently airtight chamber 102 which houses an optional exercise system 112. The chamber 102 includes a user seal 104 configured to receive a user 101 and to provide a sufficient airtight seal with the user's lower body 106.

A pressure control system 103 is used to generate alter the pressure level (P2) inside the chamber 102 relative to the ambient pressure outside the chamber (P1). When a user positioned in the DAP system is sealed to the chamber 102 and the chamber pressure (P2) is changed, the differential air pressure (ΔP=P2-P1) between the lower body 106 of the user 101 inside chamber 102 and the upper body outside the chamber 102 generates a vertical force acting through the seal 104 and also directly onto the user's lower body 106. If the chamber pressure P2 is higher than the ambient air pressure P1, there will be an upward vertical force (Fair) that is proportionate to the product of the air pressure differential (ΔP) and the cross-sectional area of the user seal 110. The upward force (Fair) may counteract gravitational forces, providing a partial body-weight-support that is proportional to the air pressure differential (ΔP). This weight support may reduce ground impact forces acting on the joints, and/or reduce muscular forces needed to maintain posture, gait, or other neuromuscular activities, for example.

The chamber 102 may be attached to a platform or base 108 that supports the chamber 102 and the exercise machine 112. The exercise machine 112 may be at least partially or wholly housed within the chamber 102. Any of a variety of exercise machines may be used, e.g., a treadmill, a stepper machine, an elliptical trainer, a balance board, and the like. Other exercise machines that may be used also include seated equipment, such as a stationary bicycle or a rowing machine. Weight support with seated equipment may be used to facilitate physical therapy or exercise in non-ambulatory patients, including but not limited to patients with pressure ulcers or other friable skin conditions located at the ischial tuberosities or sacral regions, for example. The exercise system or machine 112, such a treadmill, may have one or more adjustment mechanisms (e.g., workload, height, inclination, and/or speed), which may be controlled or adjusted by the DAP system console, or may controlled separately. Other features, such as a heart rate sensor, may also be separately managed or integrated with the DAP console. Those of ordinary skill in the art will appreciate that the treadmill shown in FIG. 1A is not intended to be limiting and that other exercise machines can be used without departing from the concepts herein disclosed.

The chamber 102 may comprise a flexible chamber or enclosure, and may be made of any suitable flexible material. The flexible material may comprise a sufficiently airtight fabric or a material coated or treated with a material to resist or reduce air leakage. The material may also be slightly permeable or otherwise porous to permit some airflow therethrough, but sufficiently airtight to allow pressure to be increase inside the chamber. The chamber 102 may have a unibody design, or may comprise multi-panels and/or or multiple layers. In some variations, the chamber 102 may comprise one or more flexible portions and one or more semi-rigid or rigid portions. Rigid portions may be provided to augment the structural integrity of the chamber 102, and/or to control the expansion or collapse of the chamber 102. The rigid portions may have a fixed position, e.g., affixed to a fixed platform or rail, or may comprise a rigid section, panel, or rod (or other reinforcement member) surrounded by flexible material which changes position with inflation or deflation. In other examples, the chamber 102 may comprise a frame or other structures comprising one or more elongate members, disposed either inside and/or outside of a flexible enclosure, or integrated into the enclosure material(s). A rigid enclosure or a rigid portion may be made of any suitable rigid material, e.g., wood, plastic, metal, etc.

The user seal 104 of the chamber 102 may comprise an elliptical, circular, polygonal or other shape and may be made from flexible materials to accommodate various shapes and/or sizes of waistline of individual user 101. The user seal 104 may be adjustable to accommodate persons of different body sizes and/or shapes, or configured for a particular range of sizes or body forms. Non-limiting examples of the various user seal designs include the use of zippers, elastic bands, a cinchable member (e.g., drawstrings or laces), high friction materials, cohesive materials, magnets, snaps, buttons, VELCRO™, and/or adhesives, and are described in greater detail in International Patent Appl. Serial Nos. PCT/US2006/038591, PCT/US2008/011807, and PCT/US2008/011832, which were previously referenced and incorporated by reference. In some examples, the user seal 104 may comprise a separate pressure structure or material that may be removably attached to the chamber 102. For example, the user seal may comprise a waistband or belt with panels or a skirt, or a pair of shorts or pants. One or more of above listed attaching mechanisms may be used to attach such separate pressure closure to the user's body in a sufficiently airtight manner. The seal 104 may be breathable and/or washable. In some embodiments, the seal 104 may seal up to the user's chest, and in some variations the seal 104 may extend from the user's waist region up to the chest.

The user seal 104 and/or chamber 102 may comprise a plurality of openings 105. The openings 105 may be used to alter the temperature and/or humidity in the chamber or the torso region of the user, and/or may be configured to control the pressure distribution about the waist or torso of the user 101. For example, openings positioned in front of the user's torso may prevent pressure from building up around the user's stomach due to ballooning of the flexible waist seal under pressure. The openings may comprise regions of non-airtight fabrics, or by forming larger openings in the wall of the chamber 102. The openings may have a fixed configuration (e.g., fixed effective opening size) or a variable configuration (e.g., adjustable effective opening size or flow). The openings may comprise a port or support structure, which may provide reinforcement of the patency and/or integrity of the opening. The port or support structure may also comprise a valve or shutter mechanism to provide a variable opening configuration. These openings may be manually adjustable or automatically adjustable by a controller. In some variations, the openings with a variable configuration may be independently controlled.

As mentioned previously, a pressure control system 103 may be used to manage the pressure level within the chamber 102. Various examples of pressure control systems are described in International Patent Appl. Serial Nos. PCT/US2006/038591, PCT/US2008/011807, and PCT/US2008/011832, which were previously incorporated by reference. As illustrated in FIG. 1A, the pressure control system 103 may comprise one or more pressure sensors 120, a processor 122, and a pressure source 114. The pressure source 114 may be a pump, a blower or any type of device that may introduce pressurized gas into the chamber 102. In the particular example in FIG. 1A, the pressure source 114 comprises a compressor or blower system 126, which further comprises an inlet port 124 for receiving a gas (e.g., air), an outlet port 128 to the chamber 102. The compressor or blower system 126 may comprise a variable pump or fan speed that may be adjusted to control the airflow or pressure to the chamber 102. In other examples, the pressure control system may be located within the chamber, such that the inlet port of the system is located about a wall of the chamber and where the outlet port of the system is located within the chamber.

In some variations, the DAP system 100 may further comprise a chamber venting system 116. The venting system 116 may comprise an inlet port 130 to receive gas or air from the chamber 102, one or more pressure regulating valves 132, and an outlet port 134. The pressure regulating valve 132 and its outlet port 134 may be located outside the chamber 102, while the inlet port 130 may be located in a wall of the chamber 102 (or base). In other variations, the pressure regulating valve and the inlet port may be located within the chamber while the outlet port is located in a wall of the chamber or base. The valve 132 may be controlled by the pressure control system 103 to reduce pressures within the chamber 102, either in combination with the control of the pressure source 114 (e.g., reducing the flow rate of the blower 126) and/or in lieu of control of the pressure source 114 (e.g., where the pressure source is an unregulated pressure source). The valve 132 may also be configured for use as a safety mechanism to vent or de-pressurize the chamber 102, during an emergency or system failure, for example. In other variations, the DAP system may comprise a safety valve (not shown) separate from the pressure regulating valve, where the safety valve may act as a safety mechanism as described immediately above. In these instances, the separate safety valve may be configured to have a larger opening or provide a higher flow rate than the pressure regulating valve.

In some examples, the processor 122 may be configured to control and/or communicate with the pressure source 114, a chamber pressure sensor 120, the exercise system 112, a user interface system (e.g., a user control panel) 118, and/or a portion of the access assist device 136. The communication between the processor 122 and each of above referenced components of the control system 103 may be one-way or two-way. The processor 122 may receive any of a variety of signals to or from pressure source 114, such as on/off status and temperature of the pressure source 114, the gas velocity/temperature at the inlet port 124 and/or the outlet port 128. The processor 122 may also send or receive signals from the control panel 118, including a desired pressure within the chamber 102, a desired percentage of body weight of the individual to be offset, an amount of weight to offset the user's body weight, and/or a pain level.

The processor 122 may also receive input from the pressure sensor 120 corresponding to the pressure level within the chamber 102. Based on its input from any of above described sources, the processor 122 may send a drive signal to the pressure source 114 (or pressure regulating valve 115) to increase or decrease the airflow to the chamber 102 so as to regulate the pressure within chamber 102 to the desired level. In some variations, the desired pressure level may be a pre-set value, and in other variations may be a value received from the control panel 118 or derived from information received from the user, e.g., via the control panel 118, or other sensors, including weight sensors, stride frequency sensors, heart rate sensors, gait analysis feedback such as from a camera with analysis software, or ground reaction force sensors, etc. The processor 122 may send signals to change one or more parameters of the exercise system 112 based on the pressure reading of the chamber 102 from the pressure sensor 120 and/or user instructions from the control panel 118. The processor 122 may send signals to control or move one or more portions of the access assist device 136. For example, the processor 122 may send a control signal to hoist device 140 to raise or lower connection portion 142, or to move hoist device 140 relative to frame 138.

In some embodiments, as described generally above, the DAP system may include sensors for measuring the weight or load exerted in the chamber. For example, as shown in FIG. 1A, chamber load sensors 143 may be placed inside and on the bottom of the chamber 102. While the user is in the chamber 102, the chamber load sensor 143 measures the weight of the load supported by the chamber 102. In other variations, there are multiple chamber load sensors 143 present. These sensors may be placed on a bottom surface of the chamber 102 such as on the exercise device (e.g. treadmill) or on the base or platform 108 of the DAP system such that the load sensors 143 can measure the weight of the user supported by the chamber 102. In other variations, the load sensors 143 may be placed under the exercise device such as under the belt of a treadmill so that when a user is on the exercise device, the load sensor 143 measures the weight of the user applied to the device. In further variations, the load sensor 145 may be part of the user seal 104. For example, the sensor 145 may be attached to a frame supporting the user seal 104. The sensor 145 may measure the weight of the user supported by the chamber 102 while the chamber 102 is sealed.

In addition, the access assist device may have one or more load sensors 141 equipped to measure the load supported by the access assist device when the user is connected or attached to the assist device. As shown in FIG. 1A, the load sensor may be affixed to a portion of an overhead suspension assist device. Depending on the location of the load sensor on the DAP system or the access assist device, any number of suitable sensors may be used. For example, a sensor designed to measure compression may be used under the exercise device to measure the weight exerted from above the exercise device. For an overhead suspension system such as the access assist device shown in FIG. 1A, the sensor may be designed to measure tension exerted against the access assist device as the device supports the weight of the user from above. Other types of load sensors include piezoelectric gauges, strain gauges, and spring mechanisms. In some embodiments, the load is derived from the deflection of a spring mechanism by way of a spring with a known spring rate, and deflection when a force is applied.

The term load sensor as used herein is not used in any limited definition but includes all sensors or devices that can measure the weight of the user. As such, although the sensors shown in FIG. 1A appear to be attached to portions of the DAP system, in some variations, the load supported by the chamber or the access assist device may be received from the control panel 118 or derived from information received from the user, e.g., via the control panel 118, or other sensors such as a shock absorption sensor that measures the force of an impact exerted against the DAP system. Similarly, the weight of the user may be derived from other aspects of the DAP system, for example, the user's weight on a treadmill may be derived from a comparison of the power needed to move a stopped belt without a user to the power needed to move a stopped belt with the user on the treadmill.

Additionally, the processor 122 may be configured to control and/or communicate with any of the load sensors 141, 143, 145. The communication between the processor 122 and the load sensors may be one-way or two-way. The processor 122 may receive any of a variety of signals to or from the load sensor such as the weight exerted on an access assist device or other portion of the DAP system, on/off status of a load sensor, changes in the weight exerted, and/or direction of the weight exerted (e.g. right, left, etc.). The processor 122 may also send or receive signals from the control panel 118, regarding the body weight of the individual. FIG. 1A shows communication lines 151, 153, and 155 between load sensors 141, 143, 145 and the processor 122 respectively.

The control panel 118 may also be used to initiate or perform one or more calibration procedures. Various examples of calibration procedures that may be used are described in International Patent Appl. Serial Nos. PCT/US2006/038591 and PCT/US2008/011832, which were previously incorporated by reference in their entirety. Briefly, the pressure control system 103 may apply a series or range of pressures (or airflow rates) to a user sealed to the DAP system 100 while measuring the corresponding weight or ground reaction force of the user. The weight of the user may be measured by any number of load sensors in the DAP system and/or access assist device, for example, load sensors 145 in the base of the DAP system may provide the weight of user exerted in the chamber 102 and load sensor 141 can provide the weight of the user supported by the access assist device. In embodiments where the user's weight is apportioned among different load sensors, the total weight of the user is the sum of the load measured by the load sensors at each pressure point.

Based upon the paired values of pressure and corresponding weight, the pressure control system can generate a calibrated interrelationship between pressure and the relative weight of a user, as expressed as a percentage of normal body weight or gravity. In some examples, the series or range of pressures may be a fixed or predetermined series or range, e.g., the weight of the user is measured for each chamber pressure from X mm Hg to Y mm Hg in increments of Z mm Hg (any unit of pressure may be used). X may be in the range of about 0 to about 100 or more, sometimes about 0 to about 50, and other times about 10 to about 30. Y may be in the range of about 40 to about 150 or more, sometimes about 50 to about 100, and other times about 60 to about 80. Z may be in the range of about 1 to about 30 or more, sometimes about 5 to about 20 and other times about 10 to about 15. The fixed or predetermined series or range may be dependent or independent of the user's weight or mass, and/or other factors such as the user's height or the elevation above sea level. In one specific example, a user's baseline weight is measured at atmospheric pressure and then X, Y and/or Z are determined based upon the measured weight.

In still another example, one or more measurements of the user's static ground reaction force may be made at one or more non-atmospheric pressures and then escalated to a value Y determined during the calibration process. In some examples, the pressure control system may also include a verification process whereby the chamber pressure is altered to for a predicted relative body weight and while measuring or displaying the actual body weight. In some further examples, during the calibration procedures, if one or more measured pressure or ground reaction force values falls outside a safety range or limit, the particular measurement may be automatically repeated a certain number of times and/or a system error signal may be generated. The error signal may halt the calibration procedure, and may provide instructions to through the control panel 118 to perform certain safety checks before continuing.

Figure 1B:
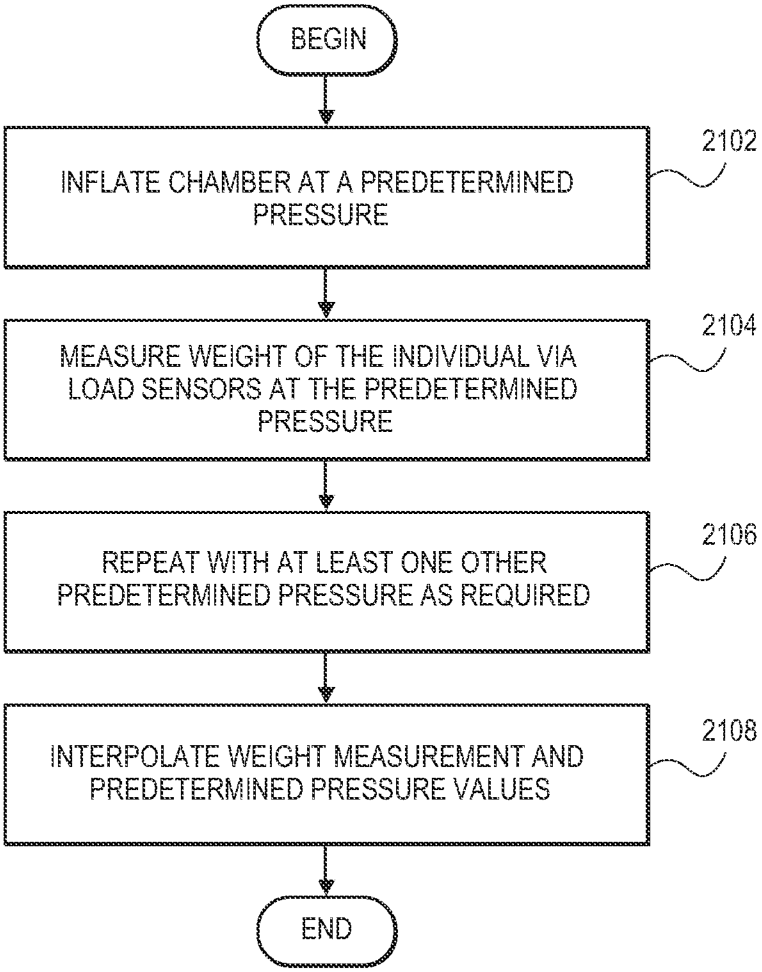
FIG. 1B is a flow diagram schematically illustrating a method for calibrating the system of FIG. 1A in accordance with one embodiment.

In other variations, as shown in flowchart FIG. 1B, the DAP system may be calibrated by applying pressure to the portion of the user's body in the chamber by inflating the chamber at a predetermined pressure. The weight of the individual is then measured (for example as the sum total of the load sensors present in the DAP system). The measured weight from the load sensors may be directly communicated to the processor, which then can generate a weight-pressure relationship for the user. In some embodiments, the relationship between pressure and weight is generated by interpolating the measured values and predetermined pressure values across the full operating pressure range of the system. Multiple measured points may be desirable in the event of non-linear relationship generated during the calibration process.

In some cases, the relationship generated may be between "actual" weight of the user and pressure. As used herein, actual weight refers to the total weight of the user measured by the load sensors. The actual weight may be the same as the weight of the individual outside the DAP system. For example, at ambient pressure, the user's body weight is the same as the actual weight. However, under positive pressure in the chamber, the user's actual weight may be different and less than the normal ambient body weight because the pressure in the chamber provides a supportive upward force to offset a portion or substantially all of the user's body weight.

Figure 20:
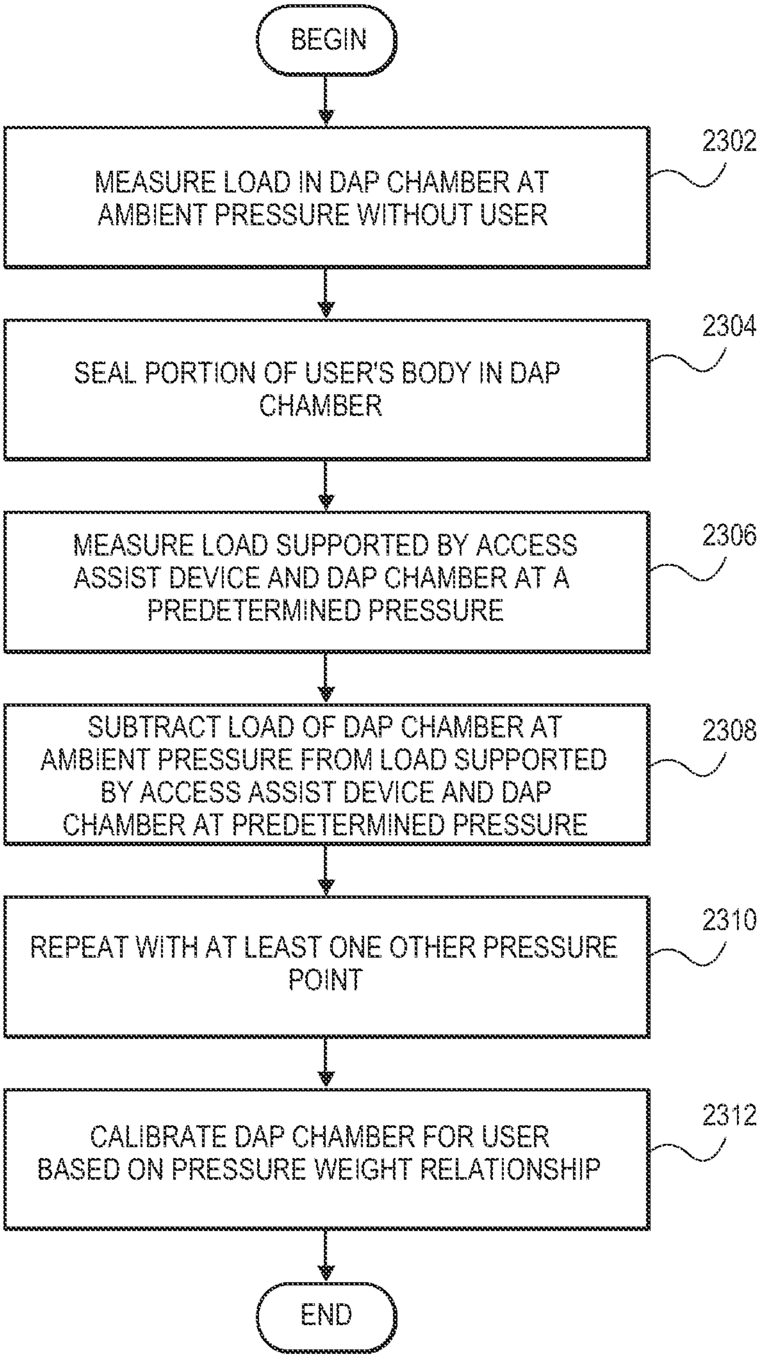
FIG. 20 is a flow diagram schematically illustrating a method for calibrating the system according to one embodiment.
Figure 21:
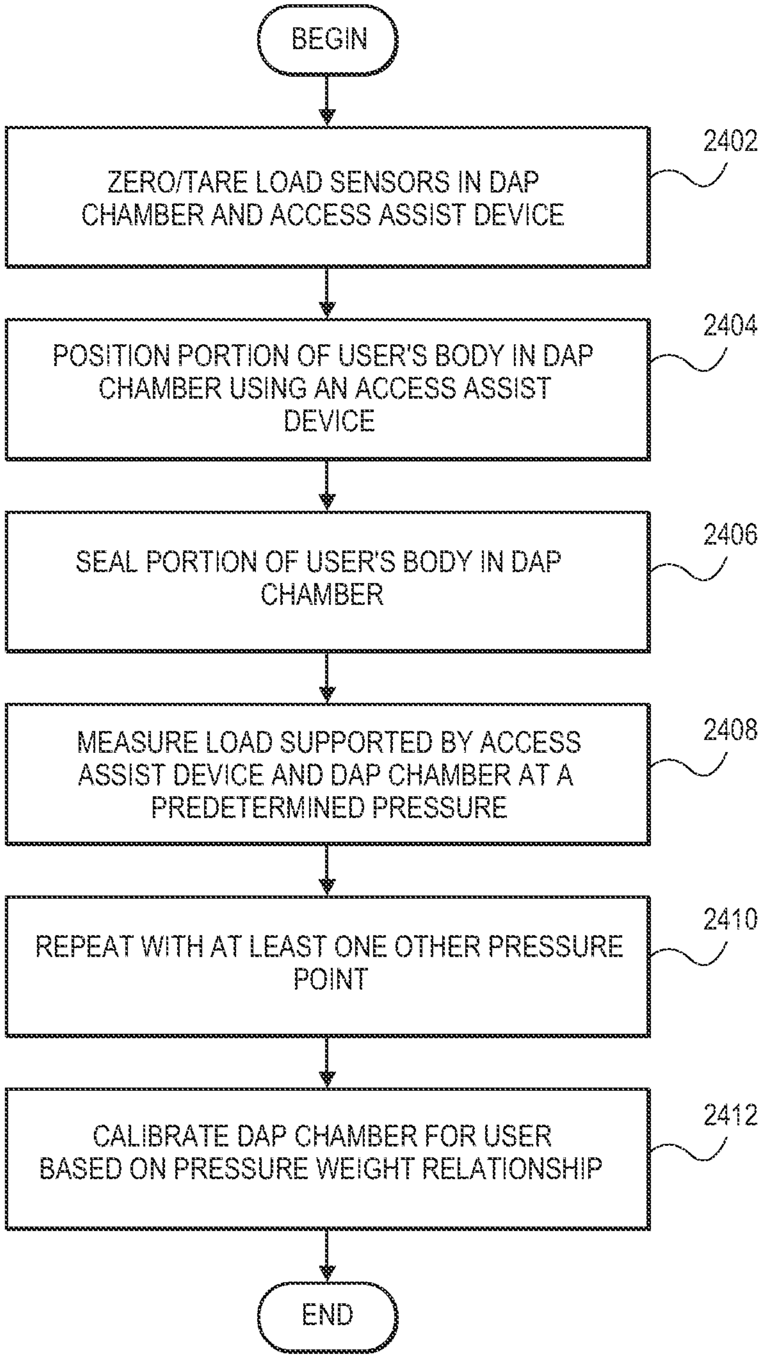
FIG. 21 is a flow diagram schematically illustrating a method for calibrating the system according to one embodiment.

Similarly, the load or total load measured by the load sensors may include only the user's weight or in some circumstances the user's weight with system weight. In some cases (see FIGS. 20 and 21 described in further detail in a later section), the load of the user is obtained by deducting the load of the system (and access assist device if present) prior to the user's use. For example, FIG. 20 shows that the baseline weight/load measured prior to the user's use is deducted from the total weight of the system with the user. FIG. 21 shows that the load sensors are zeroed before the user enters the system. Depending on the placement of the load sensors, all or a subset of the load sensors will need to be zeroed or baseline loads measured prior the user's use. For load sensors in the base or platform of the DAP system, those sensors may be constantly registering the weight of the system on the base/platform. In such embodiments, the user's weight will be subsumed in the load measured when the user is standing on the chamber. To obtain the user's weight, the baseline weight (of the system without user) will need to be subtracted from the total weight measured by the load sensors in the chamber with the user. As shown in FIGS. 20 and 21, this process can be done by obtaining baseline measurements or by zeroing the load sensors prior to use. Additionally, not every load sensor may be required for calibration. In situations where one or more load sensors measure negligible values, the load sensors can be ignored for calibration. This can be the case where an access assist device 142 provides no support during the calibration process and the user is standing in the chamber substantially unassisted by the lift access device 142. In such cases, the load sensor 141 can be ignored for calibration. Furthermore, rather than measuring a baseline each time, a baseline load of the system may be inputted into the system for user each time the system is calibrated or operated.

FIGS. 2A-2C, 3A, 3B, 4A, 4B, and 5 illustrate various portions of one embodiment of a contemplated DAP system 300. This DAP system 300 comprises a pressure chamber 310 with a user seal 350, an optional exercise machine within the chamber 310 (not shown), a frame 320, a console 330, and an access assist device. Although DAP system 300 may comprise an access assist device, the components of access assist device are not illustrated in FIGS. 2A to 2C to allow unimpeded views of the remaining portions of DAP system 300. The DAP system 300 may also comprise a height adjustment mechanism 334 to alter the height of a user seal 350, and a locking mechanism 333 may also be provided to maintain the adjustment mechanism 334 at a desired position. Referring back to FIG. 2A, the interface of the locking mechanism 333 may comprise a movable lever 345 protruding from a slot 344 located in the adjustment bar 352 of the movable assembly 330. The lever 345 may comprise a locked position which restricts movement of the movable assembly 330 is locked and an unlocked position which permits movement. Features and variations of the DAP system 300 are discussed in greater detail below.

Figure 2A:
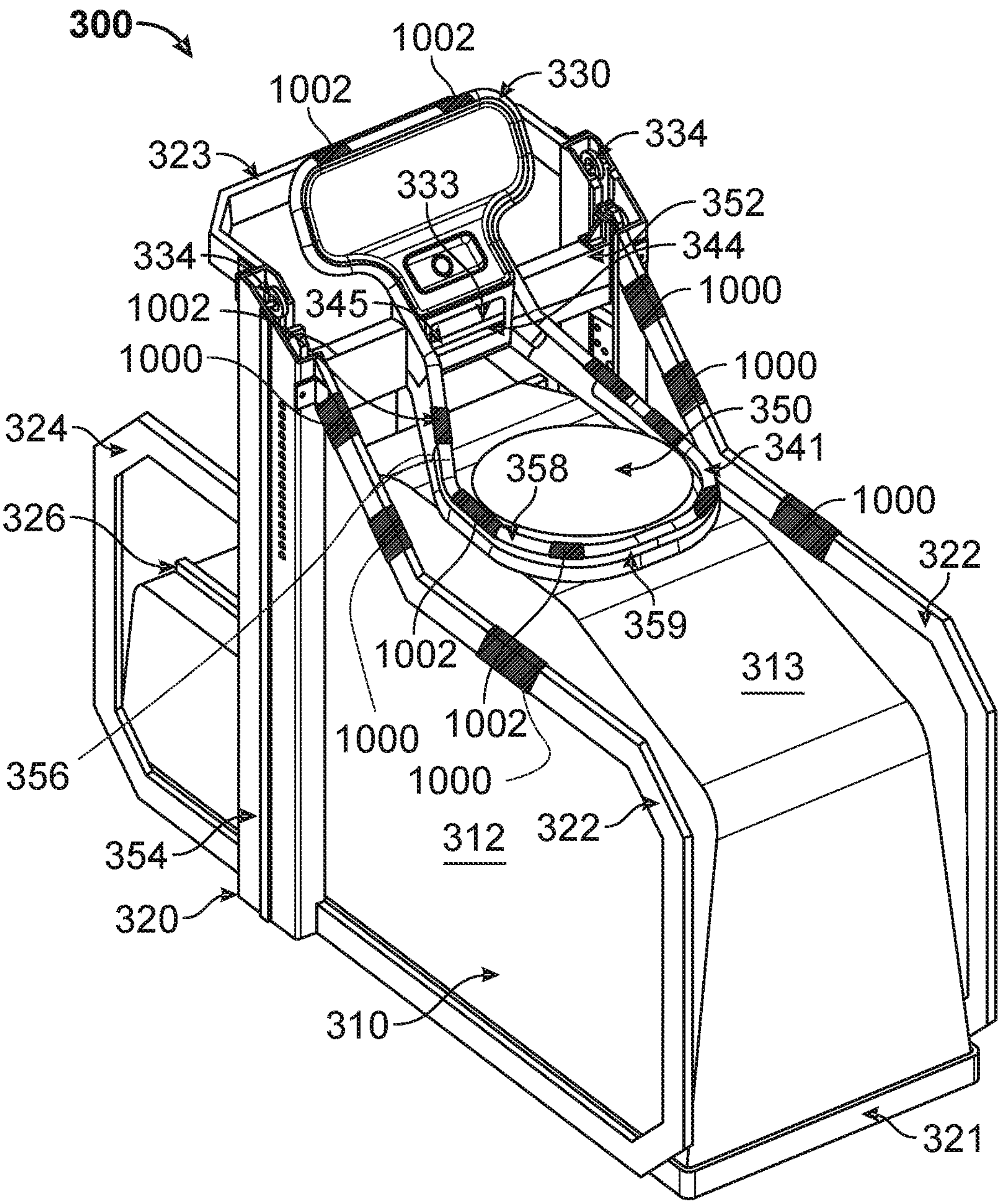
FIG. 2A is a perspective view of one example of a differential air pressure system.
Figure 2B:
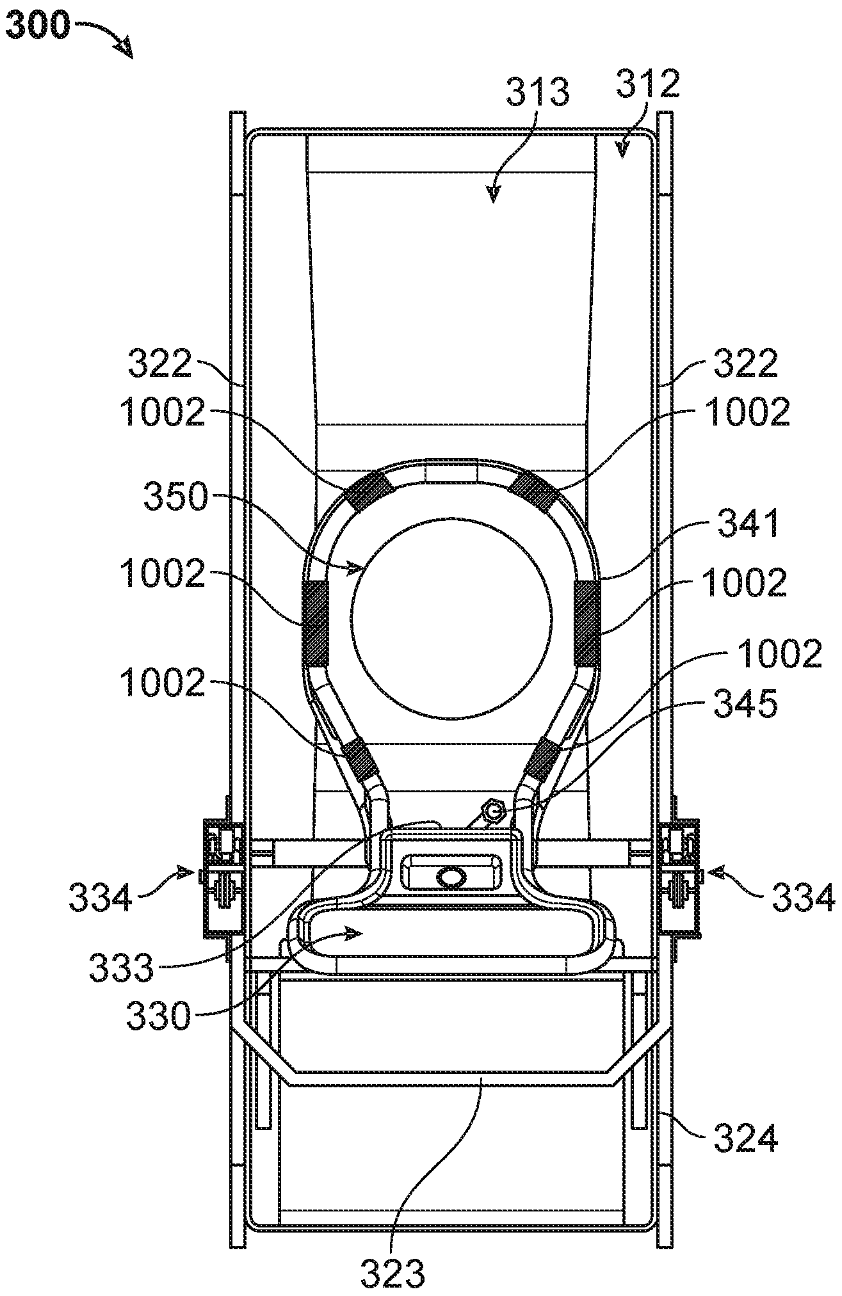
FIG. 2B is a top view of the system of FIG. 2A.

FIGS. 2A and 2B schematically illustrate the DAP system 300 with the pressure chamber 310 in an expanded state. Although the chamber 310 is shown with surfaces having generally planar configurations, in use, at least some if not all of the surfaces may bulge outward when inflated or pressurized. The chamber 310 may be configured with a particular shape or contour when pressurized and/or depressurized or otherwise collapsed.

Certain shapes or contours may be useful to accommodate particular movements or motions, including moving a mobility impaired user into and out of the chamber 310. For example, for a disabled user who is wheelchair-bound, the chamber 310 may have a larger, collapsible shape to accommodate the rolling of a wheelchair near the entrance of the chamber 310 and the sliding of the user across the collapsed chamber 310 into the opening of the chamber 310 prior to inflation. The chamber 310 may also be designed to accommodate the placement of an access assist device outside but near the chamber 310 such as a ramp abutting the opening of the chamber 310 where the user can slide into the opening directly from the wheelchair.

Certain shapes or contours may also be useful in controlling the shape of the enclosure in the collapsed state to minimize loose fabric which would otherwise create a tripping hazard. In FIG. 2A, for example, the chamber 310 has a greater length relative to its width. The ratio between the length and the width of the chamber may be in the range of about 1.5:1 to about 5:1 or greater, in some examples about 2:1 to about 4:1 and in other examples in the range of about 2.5:1 to about 3.5:1. An elongate length may permit the use of a treadmill, and/or accommodate body movements associated with some training regimens. For example, an elongate chamber length may provide increased space for forward leg extensions and/or rearward leg kicks associated with running and other forms of ambulation. In other variations, the chamber may have a greater width than length, and the ratios of length to width may be the opposite of the ranges described above, or a shape or footprint different from a rectangle, including but not limited, to a square, circle, ellipse, teardrop, or polygon footprint, for example.

Figure 5:
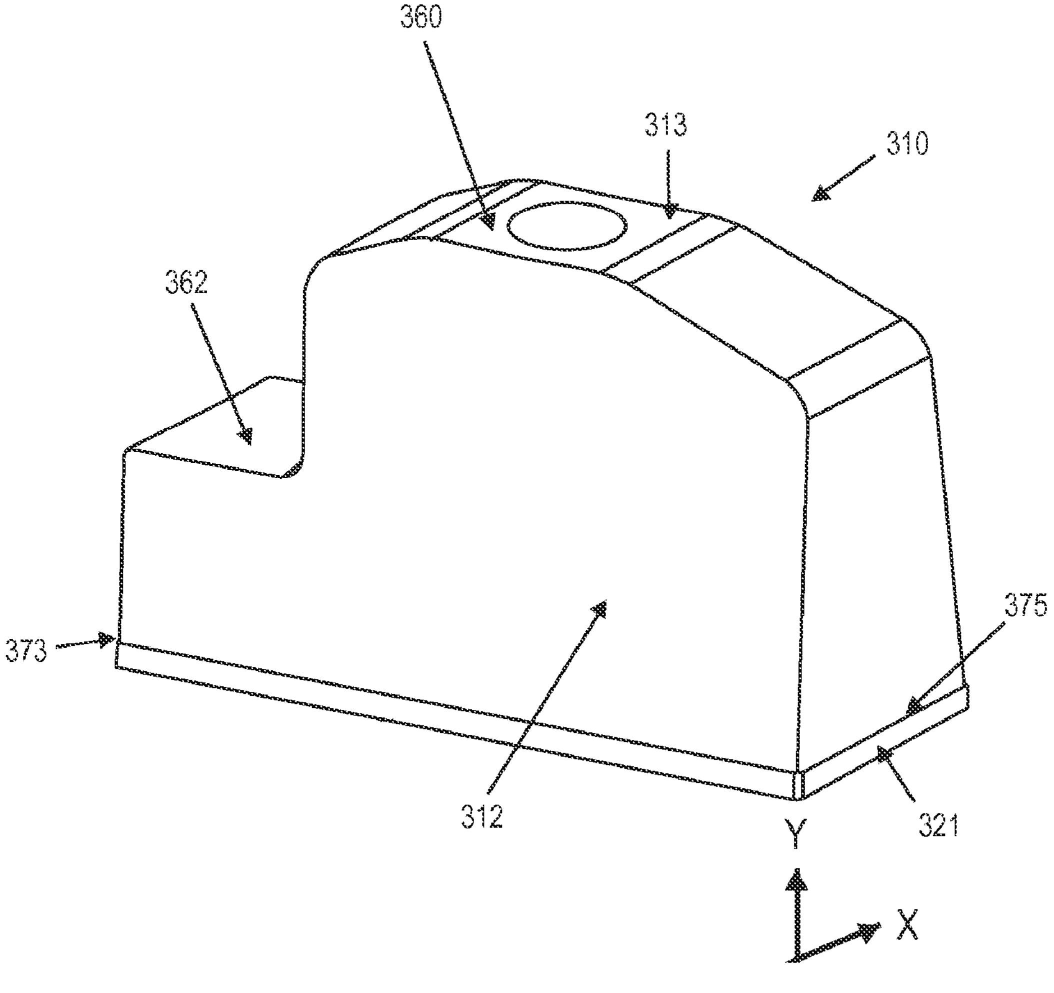
FIG. 5 is a perspective view of one embodiment of a pressure chamber attached to the base of a differential air pressure system.

Referring to FIG. 5, the chamber 310 may also have a variable width, with one or more sections of the chamber 310 having a different width than other sections of the chamber 310. For example, the chamber 310 may comprise a reduced superior central width 360, as compared to the superior anterior width 362and/or the superior posterior width of the chamber 310. Also, the superior anterior width and the superior posterior width may be similar, while their ratios to the central superior width are about 5:3. In other examples, the ratio may in the range of about 1:2 to about 4:1 or higher, in some examples about 1:1 to about 3:1, and in other examples about 5:4 to about 2:1. The superior width of anterior, central and/or posterior regions may also be smaller or a greater than the inferior width 366, 368,370 of the same or different region. The ratio of a superior width to an inferior width may be in the range of about 1:4 to about 4:1, sometimes about 1:2 to about 1:2, and other times about 2:3 to about 1:1. The bag may be contoured to allow for volumetric efficiency in placing additional components in unused space.

Referring back to FIGS. 2A to 2C, the superior to inferior widths of the anterior and posterior regions may be about 2:3, while the ratio in the central region may be about 2:5. One or more sections of the chamber 310 may comprise any of a variety of axial cross-sectional shapes, including but not limited to trapezoidal or triangular cross-sectional shapes. Other shapes include but are not limited to square, rectangular, oval, polygonal, circular, and semi-circular shapes (or other portion of a circle or other shape), and the like. Two or more sections of the chamber along the same directional axis may have the same or a different cross-sectional shape. A chamber 310 with a reduced superior central width (or other region adjacent to the user seal 350) may provide increased space above or outside the chamber 310 to accommodate arm swing during ambulation, permit closer positioning of safety handrails, and/or or use of ambulation aids (e.g., walker or cane). In other examples, the superior central width of the chamber, or other section of the chamber, may be increased relative to one or more other sections described above, and in some specific examples, the chamber may be configured to facilitate resting of the arms or hands on the chamber, or even direct gripping of the chamber with one or more handles.

The chamber of a DAP system may have a fixed or variable height along its length and/or width, as well as a variable configuration along its superior surface. The vertical height of the chamber may be expressed as a percent height relative to a peak height or to a particular structure, such as the user seal. The peak height of a chamber may be located anywhere from the anterior region to the posterior region, as well as anywhere from left to right, and may also comprise more than one peak height and/or include lesser peaks which are shorter than the peak height but have downsloping regions in opposite directions from the lesser peak. The superior surface may comprise one or more sections having a generally horizontal orientation and/or one or more sections with an angled orientation that slopes upward or downward from anterior to posterior, left to right (or vice versa). Some configurations may also comprise generally vertically oriented sections (or acutely upsloping or downsloping sections) that may separate two superior sections of the chamber.

Figure 2C:
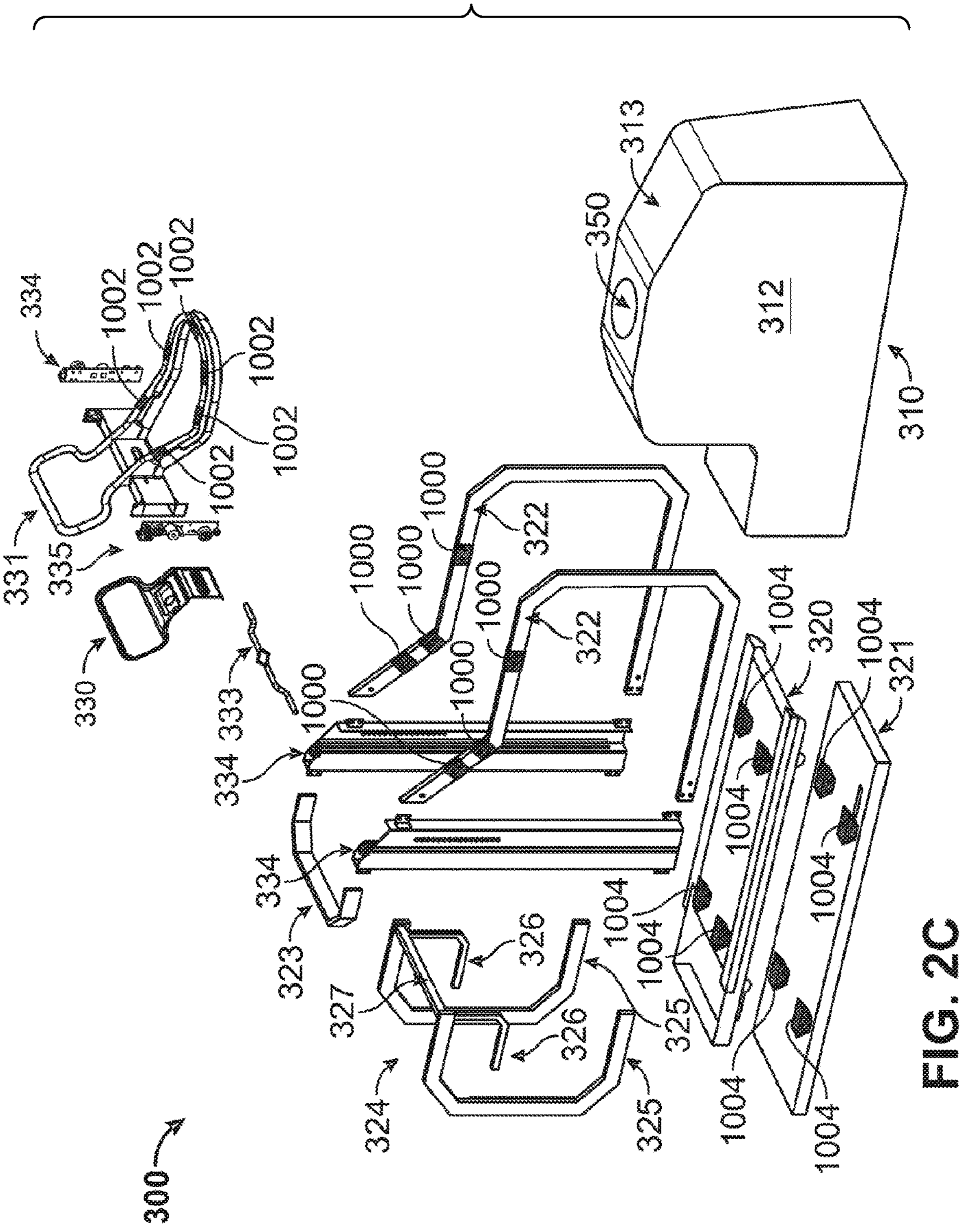
FIG. 2C is a perspective component view of the system of FIG. 2A.

As depicted in FIG. 2C, the chamber 310 may comprise an anterior region with a height that is about 50% or less than the height of the user seal 350, but in some variations, the height may be anywhere in the range of about 1% to about 100% of the peak height, sometimes about 5% to about 80%, and other times about 20% to about 50%. A reduced height region may provide additional space within the chamber for internal structures, such a treadmill, while providing space above the reduced height region for external structures. The internal and external structures may have a fixed location or a movable position.

Figure 3A:
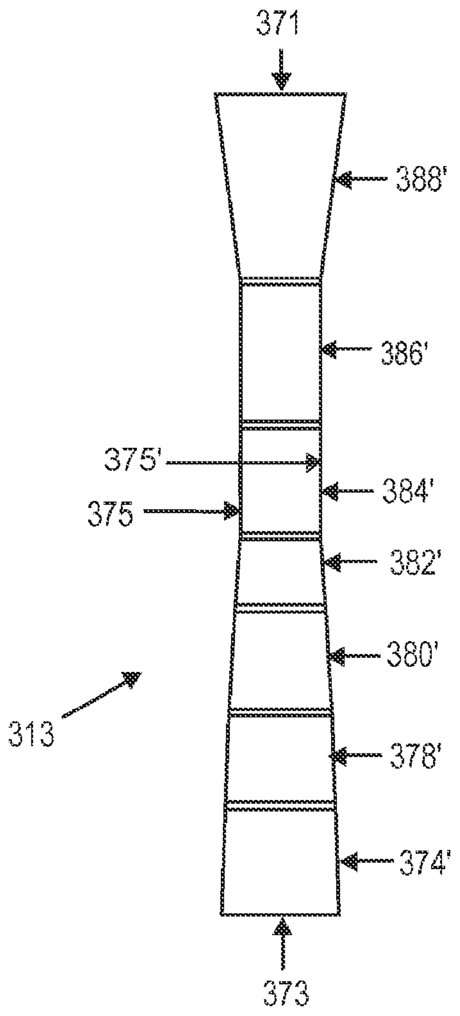
FIGS. 3A and 3B are schematic illustrations of a middle panel and a side panel of one example of a pressure chamber, respectively.
Figure 3B:
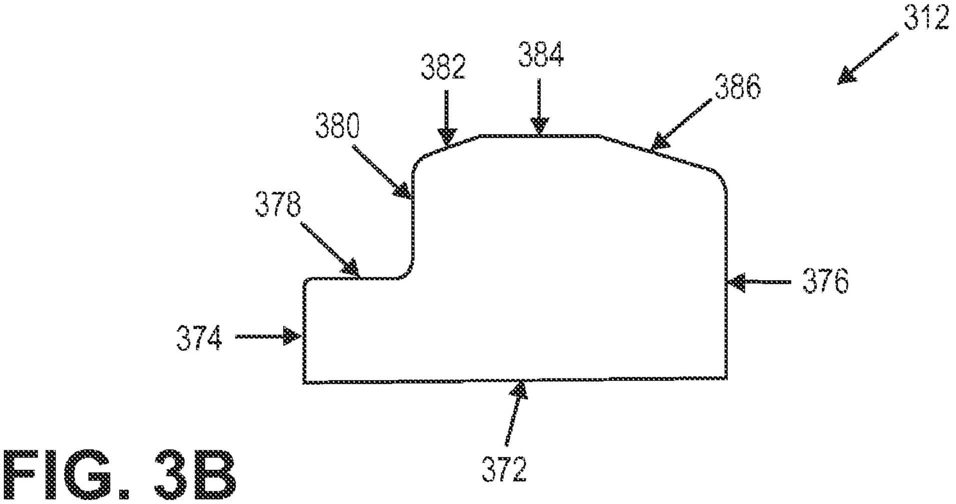
Figure 6A:
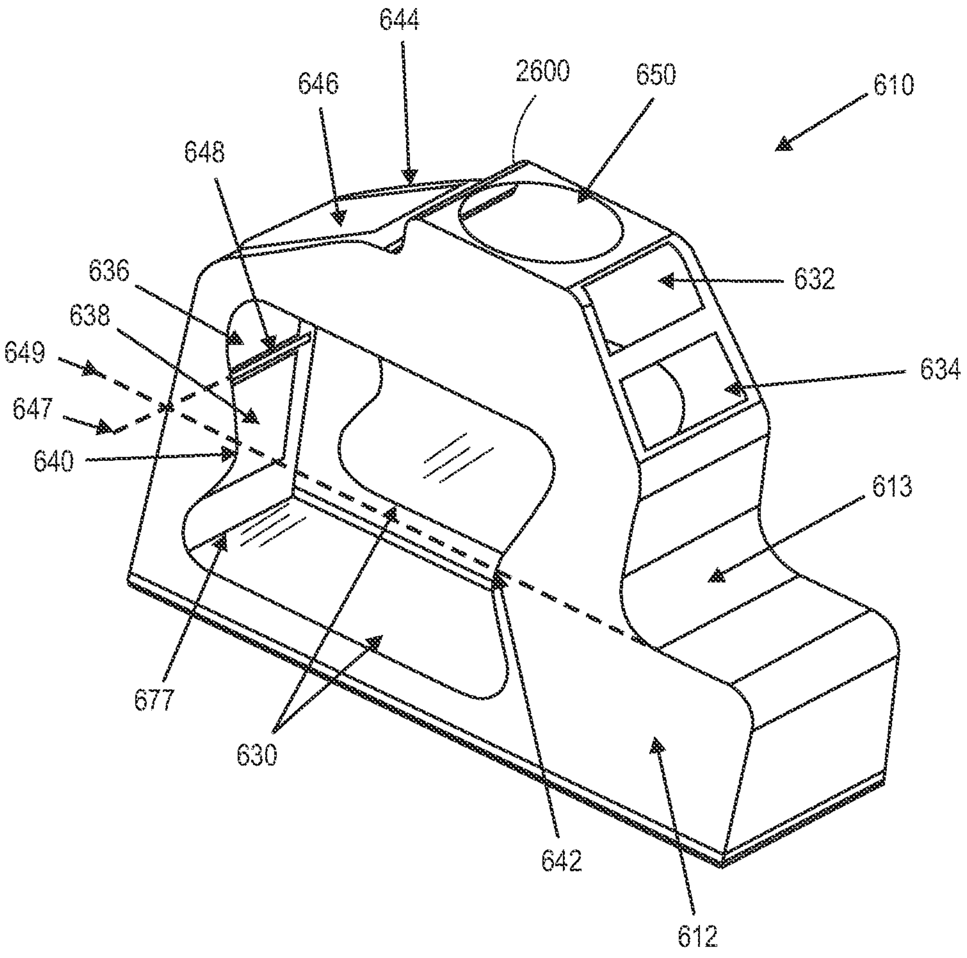
FIGS. 6A and 6B are schematic anterior and posterior perspective views, respectively of another embodiment of a pressure chamber in an expanded state.
Figure 6B:
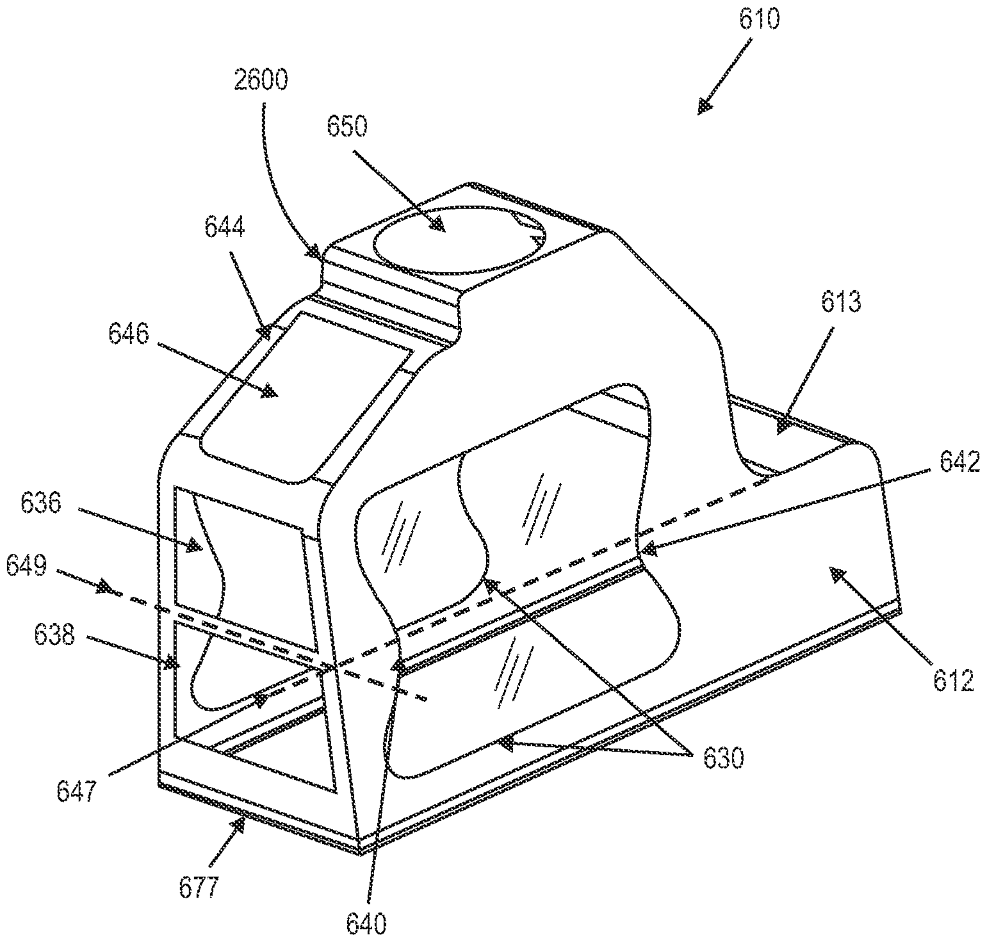

The pressure chamber may be assembled or formed by any of a variety of manufacturing processes, such as shaping and heating setting the enclosure, or attaching a plurality of panels in a particular configuration. The chamber 310 illustrated in FIGS. 2A to 2C comprises two side panels 312 and a middle panel 313, but in other variations, fewer or greater number of panels may be used to form the same or a different chamber configuration. For example, a side panel may be integrally formed with one or more portions of the middle panel or even the other side panel. As schematically illustrated in FIGS. 3A and 3B, these panels 312 and 313 may be cut or manufactured from sheet-like material but are then attached in non-planar configurations. The middle panel 313 of the chamber 310 may comprise an elongate sheet of material having an anterior edge 371, a posterior edge 373 and two non-linear, centrally narrowed lateral edges 375, 375' such that the middle panel 313 has a greater width anteriorly and posteriorly than centrally. The side panels 312 may have an irregular polygonal shape, comprising a generally linear horizontal inferior edge 372, a generally linear vertical anterior edge 374, and a generally linear vertical posterior edge 376, while the superior edge comprises an generally horizontal first superior edge 378, a generally vertical second superior edge 380, a generally upsloping third superior edge 382, a generally horizontal fourth superior edge 384, and a generally downsloping fifth superior edge 386. The transition from one edge to the adjacent may be abrupt or gradual, and may be angled or curved. Although the side panels 312 and the lateral edges 375, 375' of the middle panel 313 may be generally symmetrical or mirror images, while in other variations the side panels and/or the lateral edges of the middle panel may have asymmetric configurations. The characterization of some or all the edges of the shape into general orthogonal orientations (e.g., anterior/posterior/superior/inferior) is not required may vary depending upon the reference point used. Thus, in the example above, the second superior edge 380 may also be characterized as an anterior edge, while edge 378 may be characterized as either an anterior or superior edge. In other variations, one or more of the edges of the panel may be generally curved or non-linear, and may be generally upsloping, downsloping, vertical, or horizontal, and may comprise multiple segments. The panels may have a shape the promotes folding such as a stiffer outer section and more flexible inner section as shown in FIGS. 6A and 6B, which resembles a butterfly or hourglass shape, but could also be any of a variety of other suitable shapes with a reduced central dimension.

Figure 4A:
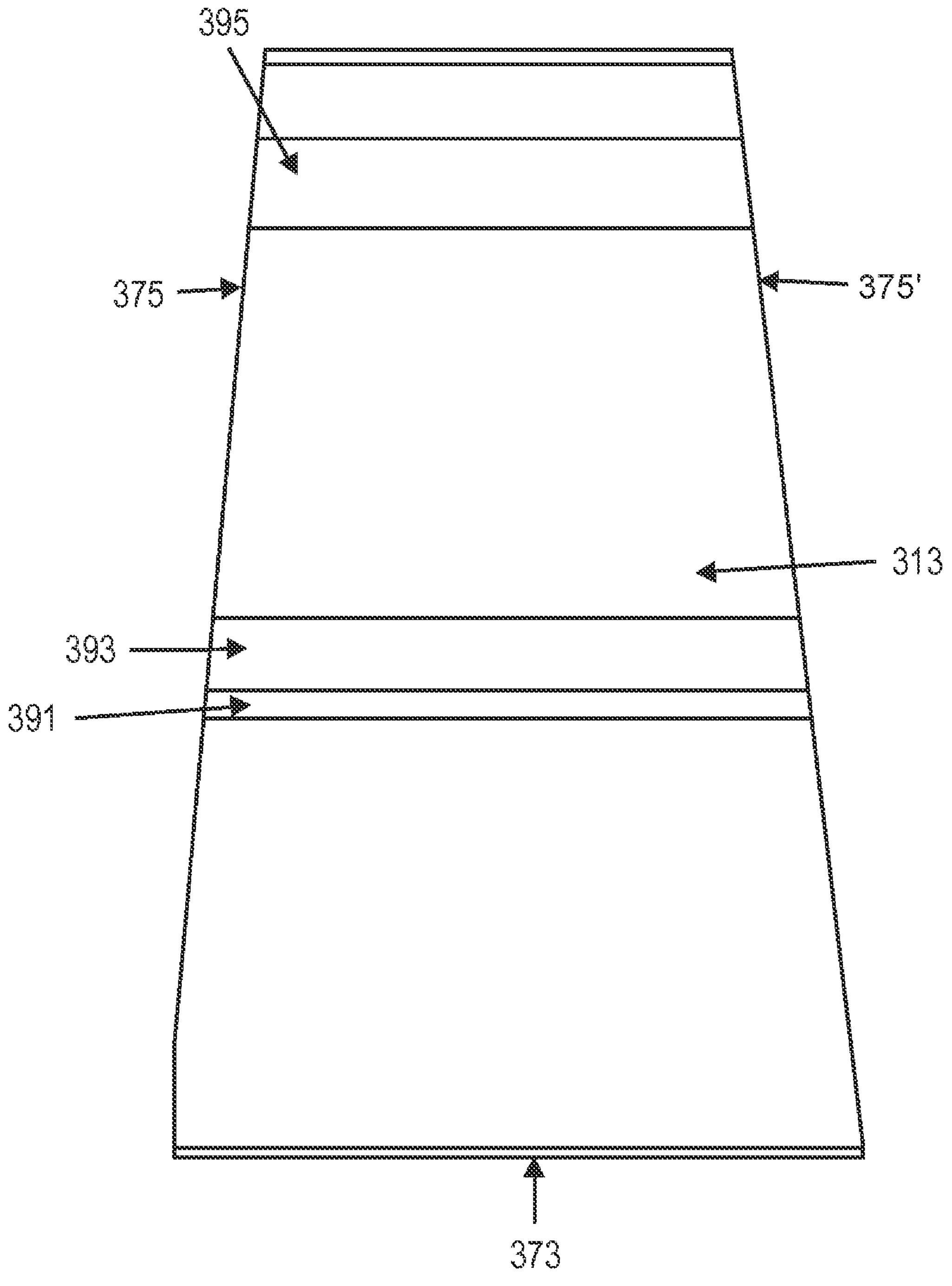
FIGS. 4A and 4B illustrate one embodiment of a pressure chamber.
Figure 4B:
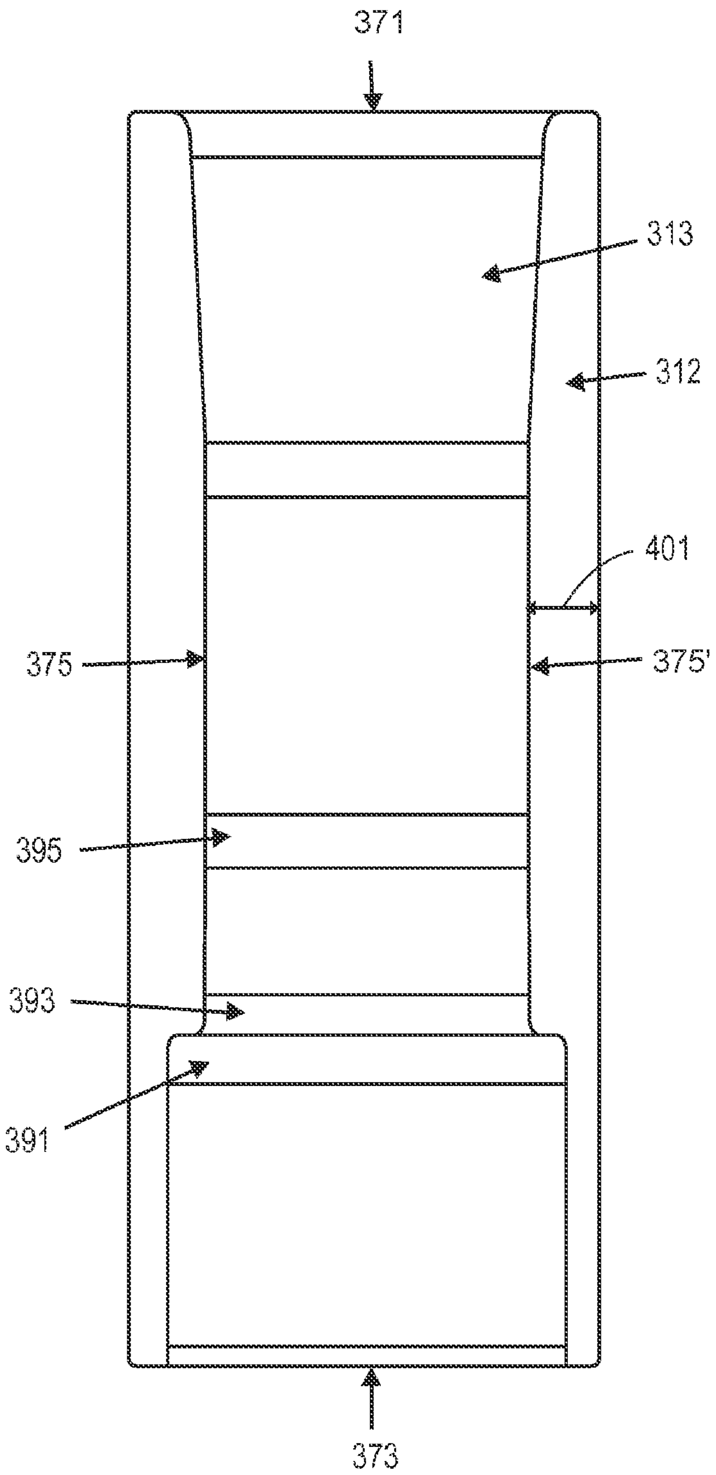

The edges or edge regions of the two side panels 312 may be attached to the lateral edges 375, 375' (or lateral edge regions) of the middle panel 313, e.g., the anterior edge 374 of the side panel 312 is attached to first edge 374' of the middle panel 313, etc. The various edges of the middle panel 313 may be characterized (from anterior to posterior, or other reference point) as parallel edges 378' and 384', tapered edges 374', 380' and 382' or flared edges 388'. The edge or edge regions may be attached and/or sealed by any of a variety of mechanisms, including but not limited to stitching, gluing, heat melding and combinations thereof. The chamber may also be formed from a single panel which may be folded or configured and attached to itself (e.g., edge-to-edge, edge-to-surface or surface-to-surface) to form a portion or all of the chamber. FIGS. 4A and 4B are orthogonal frontal view superior views, respectively of the chamber 310 in an assembled and expanded state, and schematically depicting the contours of the chamber 310. FIG. 4A schematically illustrates the wider base and narrower superior surface of the chamber 310, which may provide an offset or a gap 401 between side panel 312 of the chamber 310, as depicted in FIG. 4B. In some examples, a superiorly tapered chamber may reduce the amount of fabric or material used and/or may reduce the degree of bulge when the chamber is pressurized.

In some embodiments, the chamber or panels of the chamber may be configured with pre-determined fold lines or folding regions that may facilitate folding or deflation of the chamber along the fold lines or regions to assume a pre-determined shape. For example, the chamber may have an accordion or bellows-like configuration that biases the chamber to collapse to a pre-determined configuration along folds with an alternating inward and outward orientation. The pre-determined fold lines include but are not limited to the interface between flexible and rigid regions of the chamber, creases along a panel, or panel regions between generally angled edges of adjacent panels, for example. In some variations, fold lines may be creases or pleats provided by heat setting or mechanical compression. In other variations, fold lines may be made by a scoring or otherwise providing lines or regions with reduced thicknesses. Fold lines may also be provided along a thickened region, rigid region, ridge or other type of protrusion. Other fold lines may be provided by stitching or adhering strips of the same or different panel material to the chamber, and in other variations, stitching or application of curable or hardenable material (e.g., adhesive) alone may suffice to control folding. In still other variations, fold lines may be provided by attaching or embedding one or more elongate members (e.g., a rail or a tread made by NITINOL™) along the chamber. An elongate member may have any of a variety of characteristics, and may be linear or non-linear, malleable, elastic, rigid, semi-rigid or flexible, for example. The chamber or panels may comprise pre-formed grooves or recesses to facilitate insertion and/or removal of the elongate members, and in some variations, may permit reconfiguration chamber for different types of uses or users. In some embodiments, the fold-lines may comprise one or more mechanical hinge mechanisms between two panels (e.g., living hinges) that are either attached to the surface of the chamber or inserted into chamber pockets. Each fold line of a chamber may have the same or a different type of folding mechanism. Collapse of the chamber in a pre-determined fashion may also be affected by elastic tension elements or bands attached to the chamber.

As illustrated in FIGS. 4A and 4B, the middle panel 313 of the chamber 310 may comprise one or more fold lines 391, 393 and 395 which may help the chamber deflate or collapse into a pre-determined shape or configuration. In some examples, the pre-determined shape may facilitate entry and/or separation between the user and the system by reducing protruding folds or surface irregularities that may trip or otherwise hinder the user. The fold line 393 may be configured (e.g., with an internal angle greater than about 180 degrees by virtue of the side panel shape) to fold the adjacent external surfaces of the middle panel 313 against each other. This configuration in turn, may facilitate the nearest fold lines 391 and 395 to fold so that their adjacent internal surfaces fold against each other. The pre-determined fold lines 391, 393 and 395 in the anterior region of the chamber may result in a corresponding flattening of the posterior chamber.

As illustrated in FIG. 5, the front and back edges 373 and 375/375' of the middle panel 313 and the inferior edge 372 of the side panels are attached to the system platform or base 321 rather than a flexible panel or material, but in other variations, an inferior panel may be provided. The side panels 312 may be made from the same or different material as the middle panel 313 of the chamber 310, and in some variations, the side panels may also comprise different materials. In some variations, the stretch or flexible properties (or any other material properties) may be anisotropic. For example, the middle panel 313 of the chamber 310 may be made from a less stretchable material in order to limit the chamber's expansion in transverse direction (i.e., along X axis in FIG. 5). The side panels 312 may be made from a more stretchable material, which may or may not redistribute the tension acting on the less stretchable portions of the chamber 310. The side panels 312 may comprise a relatively more flexible material, which may facilitate a pre-determined folding pattern of the middle panel 313 when deflated or collapsed. The chamber 310 may be made of any suitable flexible material, e.g., a fabric (woven or nonwoven), a polymeric sheet (e.g., polyurethane, polypropylene, polyvinylchloride, Nylon®, Mylar®, etc.), leather (natural or synthetic), and the like. The materials may be opaque, translucent or transparent. In some embodiments, the outer surface of the middle panel 313 may be coated with anti-slip materials or coatings, and/or may comprise ridges or other surface texturing to resist slipping when a user steps onto the deflated chamber 310.

Figure 6C:
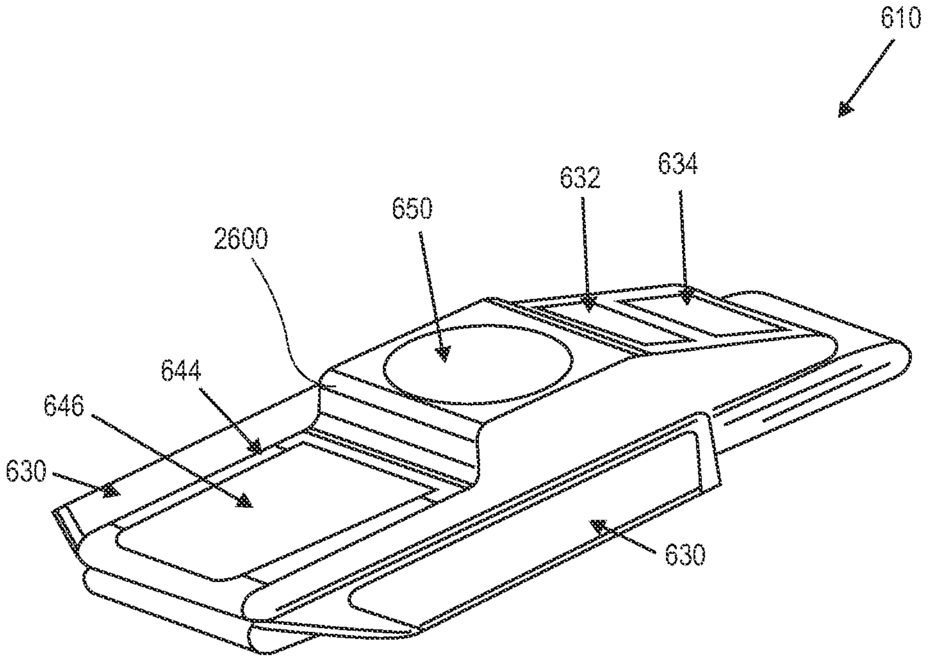
FIG. 6C is a schematic anterior perspective view of the pressure chamber of FIG. 6A and FIG. 6B in a collapsed state.

FIGS. 6A to 6C depict one example of a pressure chamber 610 comprising multiple panels with different material characteristics. Here, the side panels 612 and the middle panel 613 further comprise generally airtight transparent windows 630, 632, 634, 636 and 638. The user seal 650 may also comprise one or transparent or translucent regions. In some examples, transparent materials may permit a healthcare provider or other observer to view the movement of the user (e.g., gait analysis), or to improve the safety of the system by permitting viewing of the chamber contents, in the expanded and/or collapsed states. The windows may also permit the user to view his or her lower limbs, which may promote gait stability and/or balance. The side windows 630 of the side panels 612 may also comprise non-linear, concave edges 640 and 642 anteriorly and posteriorly. In some examples, the concave edges 640 and 642 may facilitate folding of the side panels 612 along fold line 647. As shown in FIG. 6C, the outfolding, rather than infolding, of the side windows 630 may also be facilitated by the bulging side windows 630 in the pre-collapsed/pressurized state. In some examples, by promoting the outfolding of the side windows 630 in the collapsed configuration, there may be less chamber material adjacent to the user seal 650 which a user may trip or step on when entering the system. This may permit the superior posterior section 644 of the lie in a flatter orientation and to span the area from the posterior edge 677 of the middle panel 613 to the user seal 650. In some variations, a rod or other elongate element 648 (as shown in FIG. 6B) may be attached horizontally between the posterior windows 636 and 638 to facilitate the folding along fold line 649. The elongate element 548 may be attached to the interior or exterior surface, and/or partially or completely embedded within the panel material itself. In some examples, the rod or elongate element may comprise a significant weight such that upon depressurization of the chamber, the weight of the rod and its location along a sloped surface of the chamber may facilitate the inward folding of the chamber. A non-slip layer 646 of material may be provided on the superior posterior section 644, which may promote safe ingress and egress from the chamber 610. A non-slip layer may also be reinforced or made of substantially stiff material to assist in contouring of the chamber to aid in folding and prevent wrinkling where deflated, thereby reducing the trip hazard. In other examples, the concave or inwardly angled edges may be located more inferiorly or more superiorly, and may also be located along other edges of the window (or panel) or multiple sites may be found along one edge. In still other variations, one or more edge may comprise a convex or outwardly angled edge, which may facilitate folding in the opposite direction.

Although various shapes, dimensions, contours, materials, etc. have been described for the chamber, it can be appreciated that any number of combinations of these features may be suitable for a target user or treatment. For example, some embodiments provide for DAP systems without an exercise device. For some users the mobility impairment may be so severe that exercising on a device is nearly impossible or even dangerous. For example, a paraplegic with lower body paralysis cannot walk or run on a treadmill per se. Rather for these users, being positioned upright in a pressure chamber is sufficient activity to improve movement, circulation, and overall health. In other cases, an individual may conduct activities that do not require a device such as squatting, lunging, walking in place, jumping, sitting on a balance ball inside the chamber. Accordingly, the DAP systems described can be used with or without an exercise device. For example, the DAP systems shown in FIGS. 2A-2C and FIGS. 7A-7E include a platform or base for the user to stand or move upon in the chamber. An exercise device can be optionally added to bottom of the chamber if needed. In such cases, the chamber may be designed to accommodate these activities. A compliant material that allows vertical flexibility so that a user sealed in the chamber can jump or squat can be used. Moreover, the shape of the chamber can be configured to give the user more flexibility. As an example, the middle panel 613 and side panels 612 of the chamber as shown in FIGS. 6A-6C merge to create a neck portion 2600 at the top of the chamber. In some embodiments, the neck portion is extended to allow greater compliance at the top of the chamber. This allows a user to maneuver vertically for squatting, lunging, etc. In some variations, the chamber provides about 10-20 inches of compliance. Moreover, the platform or base of the chamber 321 can include load sensors 1004 (see FIG. 2C) to measure the weight of the user exerted against the platform.

A DAP system may comprise an attachment mechanism to couple and/or seal a pressure chamber to the base of the system in a sufficiently airtight manner to maintain pressurization within the chamber, such as those described in International Patent Appl. Serial No. PCT/US2010/034518, which was previously incorporated by reference in its entirety.

In some embodiments, the DAP system also includes a frame assembly with various structures to support and/or stabilize other structures of the DAP system. For example, the frame assembly may comprise a platform or base to attach the inflation chamber, as well as bars, braces or rails that limit the shape the inflation chamber. The frame assembly may also be used to stabilize the height adjustment mechanism, using various frame structures to dampen vibrations or stabilize other stresses generated by or acting on the DAP system or the user during use. In the example depicted in FIGS. 2A to 2C, the DAP system 300 comprises a frame assembly 320 with a base 321, side hand-rails 322, a front horizontal bar 323 and front vertical bars 324. Some portions of the frame assembly 330 may also maintain or limit the chamber to a predetermined shape. For example, when chamber 310 is inflated, the expansion of the chamber 310 at the front end of the system 300 is limited by side bars 325, L-shape bars 326, and the front bar 327 of the front brace 324. The lateral expansion of the chamber 310 may be limited by the rear hand-rails 322. The rear hand-rails 322 may provide support to a user during exercise and/or in the event of pressure change within the chamber 310, which may cause the user to lose body balance temporarily. In some embodiments, a pressure source may be placed upon or mounted to the two L-shape bars 326. In one example, the pressure source may be a blower. The pressure source may be placed at other locations as well. For example, it may be placed on the ground next to the DAPS to reduce vibration that may be caused by the pressure source.

The frame assembly 320 may be assembled together by any suitable methods known to the ordinary skilled in the art. Non-limiting examples include brackets, bolts, screws, or rivets. In some embodiments, in addition to or in lieu of the components described above, the frame assembly 320 may comprise other components or parts. For examples, additional bars or braces may be used to stabilize the system 300 while the user is in motion.

In other examples, one or more other structures may be attached to the frame assembly to facilitate certain types of exercise or training. For example, the adjustment mechanism may further comprise a walker or cane mechanism to simulate, facilitate or coordinate upper body lifting and planting motions associated with walker or cane use. In some examples, the walker or cane mechanism may incorporate sensors which may be synchronized to the treadmill or other exercise machine used with the DAP system. In still other examples, one or more panels of the chamber may be sealably opened to permit access to the enclosed portions of the body. Also, in further examples, the chamber and/or the frame assembly, or may include harnesses or straps to provide non-pneumatic body support.

As noted above, the expansion of the chamber 310 in the embodiment depicted in FIGS. 2A to 2C may be limited by several bars, rails and/or braces of the frame assembly 320 of the DAP system 300. In this specific embodiment, the two parallel height adjustment mechanisms 334 may also facilitate shaping the inflated chamber by limiting its lateral expansion. As illustrated in FIG. 2A, the vertical expansion of an inflated chamber 310 around a user seal 350 may be limited by a console frame 331 of the movable assembly 330. When a user is positioned in the inflated chamber 310 while using the system 300, the seal frame 341 of the movable assembly 330 may be disposed just at or above the user's waistline. As best illustrated in FIG. 2B, the seal frame 341 of the movable assembly 330 may be of approximately the same width as the top section 313 of the chamber 310, but may be slightly wider than the user seal 350. As a result, when chamber 310 is inflated, the disposition of the console frame may allow the user seal 350 to rise but depress bulging chamber material around the seal 350. This design may prevent or reduce the risk that the bulging chamber material around the user seal 350 from interfering with the user's upper body motion and allow the user to swing arms freely and comfortably. As will be discussed in further detail below, the top section 313 of the chamber 310 may be attached to the a portion of console frame 331, thereby allowing the height of user seal 350 to be adjusted with the height of movable assembly 330.

In addition to the structures that have been described here, additional structures may be used to limit the expansion of the chamber 310 in order to contour the chamber to a specific configuration. For example, X-shape cross-bars may be added between the height adjustment mechanism 334 and the rear hand-rails 322 to flatten the bulging chamber material on the sides of the base. In some embodiments, the chamber 310 may comprise one or more rigid portions or other types of integrated supporting structures that may facilitate maintaining the inflated chamber in a particular configuration or shape.

A DAP system may be configured to be height-adjustable, such that the user-seal/opening of a chamber may be adjusted to help facilitate user access to a chamber. For example, in the DAP system 300 shown in FIGS. 2A-2C, seal frame 341 may be configured to attach to chamber 310, and may be height adjustable. Height adjustability may facilitate use of the user seal 350 at a particular body level or body region (including use of the system by shorter patients), may also provide a limit or stop structure to resist vertical displacement of the chamber, and may also allow the user seal 350 to be temporarily lowered such that a user may step into or otherwise enter the user seal. In FIG. 2A, the seal frame 341 is attached to a height adjustment bar 352, which in turn is movably supported by two adjustment side posts 354. Also, the anterior seal frame struts 356 are medially oriented with respect to the lateral seal frame struts 358. Various examples of height adjustment mechanisms for the seal frame are described in International Patent Application Serial Nos. PCT/US2008/011832 and PCT/US2010/034518, which were previously incorporated by reference in their entirety, and the height adjustment mechanisms may be attached to the chamber in any suitable manner.

A DAP system may also comprise a locking mechanism, which may be configured to adjust and/or lock the position of the height adjustment mechanism. In some embodiments, the locking mechanism further comprises a control interface accessible to the user while using the system. The control interface may comprise an actuator (e.g., a button, a lever, a knob or a switch, etc.). In other embodiments, the control interface may be integrated into the control panel where the user may control and adjust other parameters (e.g., pressure level inside the chamber, parameters of the exercise machine, etc.) of the system. Various examples of locking mechanisms are described in International Patent Application Serial No. PCT/US2010/034518, which was previously incorporated by reference in its entirety.

The DAP system may be height adjusted manually or automatically. For example, in some embodiments, the user seal 350 and the seal frame 341 are equipped to be raised and lowered manually by the user. Alternatively, the DAP system may have a motorized height adjustment mechanism, such as a motorized lift, that allows the user, especially a mobility impaired user, to enter the seal 350 area and have the seal 350 raised to engage the user's body. This is advantageous where a disabled user cannot raise or lower the seal to the proper height independently without assistance. Moreover, the power required to operate the motorized lift can also provide the user's weight to the processor. For example, the motorized lift may be operated by the control panel or processor where once the lift command is given the lift begins lifting the user and outputting a load value signal to the processor, which can be used to calibrate the DAP system.

As discussed above, the DAP system 300 can be configured to have one or more load sensors to measure the weight of the user exerted on different areas of the system. For example, as shown in FIG. 2A, the frame assembly 320 can include handrails 322 for a user to hold or lean onto for support while entering, exiting, or using the DAP system. The handrails 322 may also include load sensors 1000 such that the weight of the user exerted on the handrails 322 is measured and transmitted to the system processor. In another example, the load sensors 1000 may be placed at any point along the handrail 322 such as the midway point or toward the front of the DAP system. As can be appreciated, any number of positions may be suitable depending on the mobility and comfort of the user. Moreover, in some embodiments, the frame assembly 320 may include a slideable track system where the load sensors 1000 may be removed or repositioned along the track (such as on the handrail 322) such that the load sensors 1000 can be adjusted and personalized for each user. Additionally, the load sensors can be built into the DAP systems or added on to an existing system.

In some examples, the load sensors may be placed on attachable components such as adhesive load sensor pads or snap-on members where the load sensors can be attached to various locations on the frame assembly 320 depending on the needs of the user. For example, depending on the motor or mobility impairment, the user may need to lean in a specific direction for support while positioned in the chamber. For a user leaning forward, the load sensors can advantageously be placed toward the front of the DAP system. Moreover, for a subsequent user who may lean toward the sides, the load sensors can be moved to a side location from the front location. In other embodiments, the load sensors may be affixed as adhesive pads to the DAP system at suitable locations to engage the user and measure the user's weight.

In further variations, load sensors may be placed on multiple locations on the system and access assist device. For example, a disabled user may be first lifted and maneuvered by an access assist device having a load sensor into the seal 350. Once inside the seal 350, the user may need to lean against the seal frame 341 or the frame assembly 320 for support. The DAP system may include load sensors 1002 on the user seal frame 341 and/or frame assembly 320. The load sensors 1002 can be placed anywhere along the user seal frame 341 depending on the needs of the user. Furthermore, although shown as load sensors on the handrail 322 or the seal frame 341, load sensors can be placed anywhere on the DAP system to accommodate the limits of a mobility impaired user. Moreover, the load sensors 1004 can be in the base or platform 321 in addition to anywhere else on the DAP system where the user can engage the system and exert a weight force against the system. Furthermore, load sensors can be placed on exercise devices or under exercise devices. In some embodiments, the load sensors are placed under a treadmill belt. In other embodiments, the load sensors may be placed on or near a user connection such as a harness or wearable support so that when a user's weight is supported by the harness or wearable support, the weight is measured by the load sensor.

Because mobility impaired users may have difficulty staying still, having multiple load sensors at different locations on the system can accommodate a user who needs to shift positions during use of the system. As such, load sensors can be placed in any area around the span of a user such that a user can apply weight to the area. In some variations, this is area around the arm span of a user to allow the user to grasp, lean, push, etc. against an area for support. In other variations, this is the space around a user's body that includes where the user can apply force by any means such as pushing, kicking, pressing, pulling, etc.

Furthermore, the type of load sensor may be selected depending on the anticipated load measured by a load sensor. For example, a load sensor placed under a treadmill belt may measure a much lower range of loads than one placed under the treadmill. Varying degrees of resolution and range may be selected for load sensors depending on the placement of the sensors and anticipated load measured.

Additionally, as discussed above, the load sensors can be configured to electronically communicate with a system processor or control system to provide load values to the processor for calibration or operation of the DAP system. The load sensors may communicate with the processor via a wired electrical connection (e.g. Ethernet or electrical wiring) or wirelessly. Wireless communication methods include communicating via WiFi, Bluetooth, or Ant+. In some embodiments, suitable load sensors include load cells from Sentran, Futek, and LCM Systems.

As shown in FIG. 1A, the DAP system 100 may further comprise an access assist device 136 for facilitating user access to the chamber 104. For example, for a user requiring a high level of assistance such as a bedridden patient (e.g. quadriplegic) or wheelchair-bound patient (e.g. paraplegic), an access assist device may comprise a device that can bear a portion or all of the user's body weight while maneuvering the user to the chamber of the DAP system. Such devices include a lift assist device such as an overhead suspension (with or without a harness) system that attaches or connects to the user. In some embodiments, an access assist device 136 may comprise an access frame 138 attached to or otherwise positioned in a fixed relationship to chamber 102. Access assist device 136 may further comprise a hoist device 140, with a patient connection portion 142 for engaging a patient. Hoist device 140 may be moveable along at least a portion of lift access frame 138, which may allow the hoist device 140 to move a user 101 relative to chamber 102, as will be described in more detail below. Additionally, patient connection portion 142 (with harness 147) may be vertically moved relative to the rest of hoist device 140 to raise or lower the user 101 relative to chamber 102.

Figure 7A:
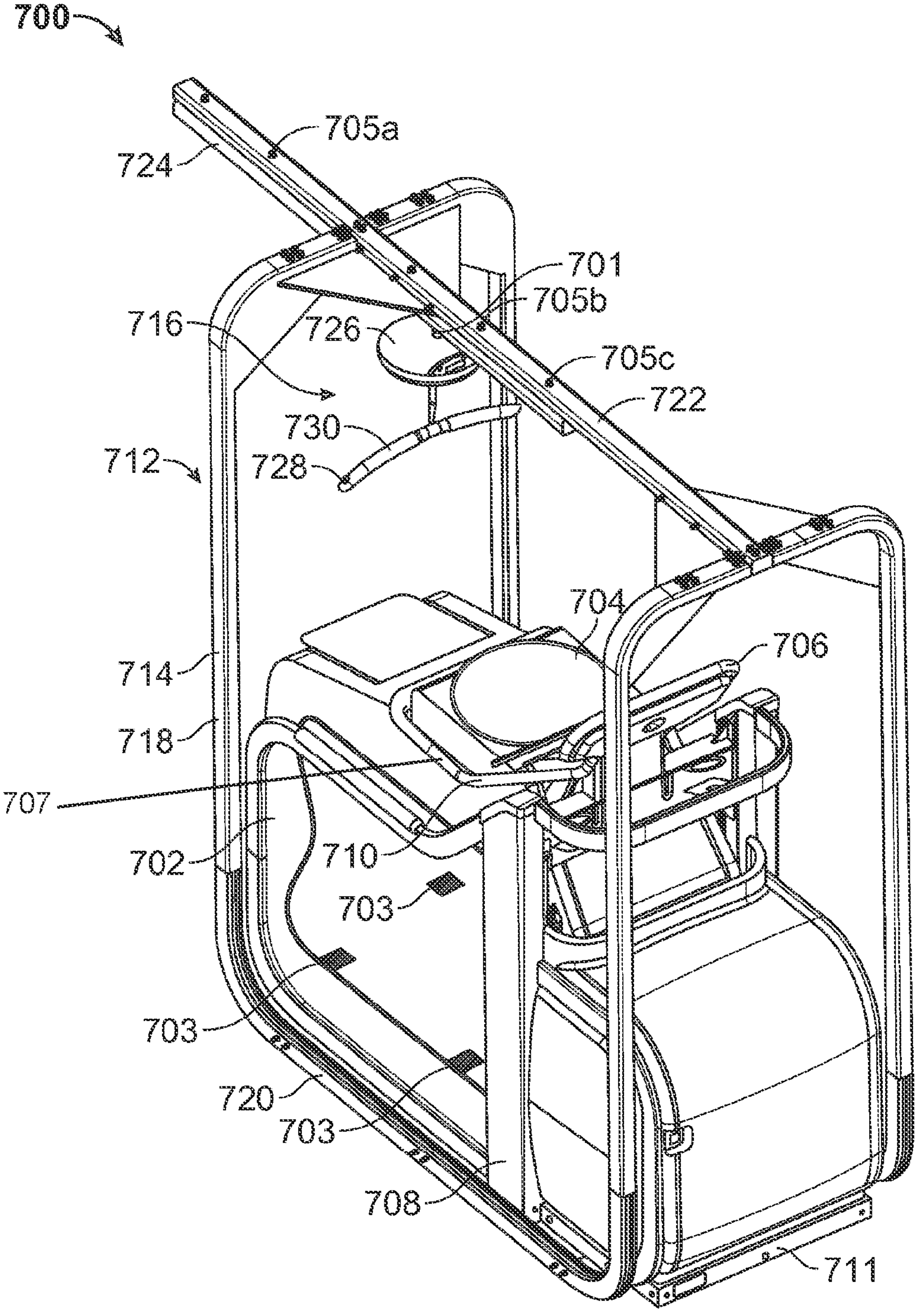
FIG. 7A is a perspective view of one example of a differential air pressure system.

FIGS. 7A-7E illustrate a variation of a DAP system 700 with an access assist device 712 for lifting and moving a user/patient. Specifically, FIG. 7A shows a perspective view of DAP system 700, comprising pressure chamber 702 with a user seal 704, console 706, chamber frame 708, height-adjustable seal frame 710, and access assist device 712. As shown there, access assist device 712 generally comprises a lift access frame 714 and hoist device 716. In some embodiments, as shown in FIGS. 7A through 7E, the lift access frame 714 may be specifically configured to mate with, attach to, or otherwise be fixed relative to the rest of the DAP system 700.

The access assist device 712 of the DAP system may be used to assist a user in obtaining access to the user seal 704 of the pressure chamber when it is dangerous or difficult for a user to otherwise obtain access. For example, in variations where the DAP system contains a height-adjustable user seal 704, the user seal 704 may be lowered to allow a user to step into the chamber 702. However, if a user has limited mobility (e.g., by virtue of injury, illness, or other condition), he or she may not be able to step into the pressure chamber 702 without assistance. The access assist device 712 may be used to move the user relative to the user seal 704 to assist the user in entering the pressure chamber 702.

Generally, in some embodiments, the lift access frame 714 can be affixed or otherwise attached to the DAP system 712, such that the hoist device 716 may be moveably positioned relative to a pressure chamber 702 of the DAP system 700. The lift access frame 714 may be permanently or reversibly attached to one or more portions of the DAP system 700. For example, in variations where the pressure chamber 702 is attached to a base or platform FIG. the lift access frame 714 may also be attached to that base/platform 711. In some variations, the lift access frame 714 may be welded or otherwise fused to the base/platform 711. In other variations, the lift access frame 714 may be mechanically joined to the base/platform 711 via one or more bolts, clamps, screws, other mechanical connectors, or combinations thereof. In other variations, the lift access frame 714 may be configured to magnetically attract to and affix to the base/platform. In still other variations, the lift access frame 714 may be configured to be friction fit with the base/platform 711. In yet other variations, the frame may contain one or more bars, struts, or other structures that project at least partially into or through one or more lumens, channels, or slots in the base/platform 711. Additionally or alternatively, the base/platform 711 or other portion of the DAP system may sit or otherwise rest upon one or more portions of the lift access frame 714 such that the weight of DAP system 700 may help hold the frame in place.

The lift access frame may comprise any suitable configuration of support struts, bars, or the like. For example, in the variation of lift access frame 714 shown in FIGS. 7A-7E, lift access frame 714 may comprise a plurality of vertical struts 718, base struts 720, and top strut 722. While shown in FIGS. 7A-7E as having four vertical struts 718, lift access frame 714 may comprise any suitable number of vertical struts (e.g., two, three, four, or five or more). Additionally, some or all of vertical struts 718 need not be vertically oriented, and instead may extend upward at an angle. As mentioned above, lift access frame 714 may be configured to be adjustable. For example, each of the vertical struts 718 may be configured such that they have variable length (e.g., each vertical strut 718 may comprise a telescoping portion) to allow adjustment of the height of top strut 722.

Lift access frame 714 may additionally include a track system comprising one or more tracks along which a hoist device 716 may move. In some variations, one or more tracks of a track system may be formed separately from the lift access frame 714, and attached thereto. For example, in the variation of lift access frame 714 shown in FIGS. 7A-7E, track 724 is attached to top strut 722. In other variations, one or more tracts may be integrally formed in one or more struts of the lift access frame. While shown in FIGS. 7A-7E as having a single track that allows for movement in one dimension, it should be appreciated that the track system may comprise multiple tracks that allow the hoist device to move in two dimensions. For example, in some directions, first and second tracks may be attached to the lift access frame 714, and a third track may be slidably connected to the first and second tracks. A hoist device 716 may be slidably connected to the third track, such that the hoist device 716 may move along the third track in a first dimension. The third track may slide relative to the first and second tracks to move the hoist device is a second dimension.

In variations where the connection between lift access frame and the DAP system 700 is releasable, the lift access frame 714 may be configured to be moveable relative to the DAP system (e.g., the DAP system may comprise one or more wheels that may allow the lift access frame to be moved). In these variations, the lift access frame 714 may be disengaged from the rest of the DAP system and may be moved away from the DAP system. This may provide utility in replacing an access assist device with a new or different access assist device.

Additionally, the lift access frame 714 may be configured to be adjustable. In some variations, the height of lift access frame may be variable. This may allow the height of the lift access frame to be raised in instances where a taller patient is being transported, or may be lowered to allow the DAP system to be moved through a doorway or other height-restricted space. Similarly, one or more portions of the lift access frame may be configured to be collapsible to allow for lower-profile transportation and/or storage of the DAP system.

In other variations, the access assist device may also include an interlocking mechanism to ensure that the user is properly and safely moved in and out of the chamber 702. For example, the lift access frame 714 may contain one or more interlock checkpoints 705*a-c* designed to communicate with a processor in the DAP system. When the hoist device travels over a checkpoint 705*b*, for example, a processor controlling the DAP system 700 (not shown) may also control the operation of the access assist device. The processor can check whether the pressure chamber 702 is ready to receive the user when the hoist device 716 engages the checkpoint 705. This prevents the unwanted situation where the user may be lowered or dropped into the user seal 704 or chamber 702 when the user seal is not open for receiving the user or the chamber is blocked. The checkpoints 705 may contain sensors that output a signal to the processor when the hoist device engages a checkpoint. The processor then checks on the status of the DAP system, in particular the user seal 704 and the chamber 702. If conditions are acceptable, the processor can send a command for the hoist device to continue moving. If conditions are not acceptable, the hoist device 716 will not receive a "go" command and the hoist device 716 will stop movement.

Similarly, the interlock checkpoints 705 can also act in the reverse to ensure that a user is safely removed from the DAP system 700. When the hoist device 716 carrying a user out of the chamber 702 travels along the track 724 over an interlock checkpoint 705*b*, the checkpoint outputs a signal to the processor. The processor may check the status of the system 700 such as whether the pressure chamber 702 has been readied for user exit. In some embodiments the pressure chamber 702 is made from an inflatable, collapsible material. In such cases, exiting the DAP system safely may require that the pressure chamber 702 is substantially deflated and lowered below the user's torso. The interlock checkpoints 705 can be designed to ensure that the user is not dragged against a raised and inflated chamber while attached to a moving hoist device 716. Similarly, the processor may also check if the pressure in the chamber is at a safe level for user extraction. At a high positive pressure, attempting to remove the user may result in breaking the seal around the seal interface and allowing the upward force of the pressure to inadvertently push the user out of the chamber. Accordingly, the processor may check if the pressure source is off, for example, whether an air/gas blower is off.

Figure 14:
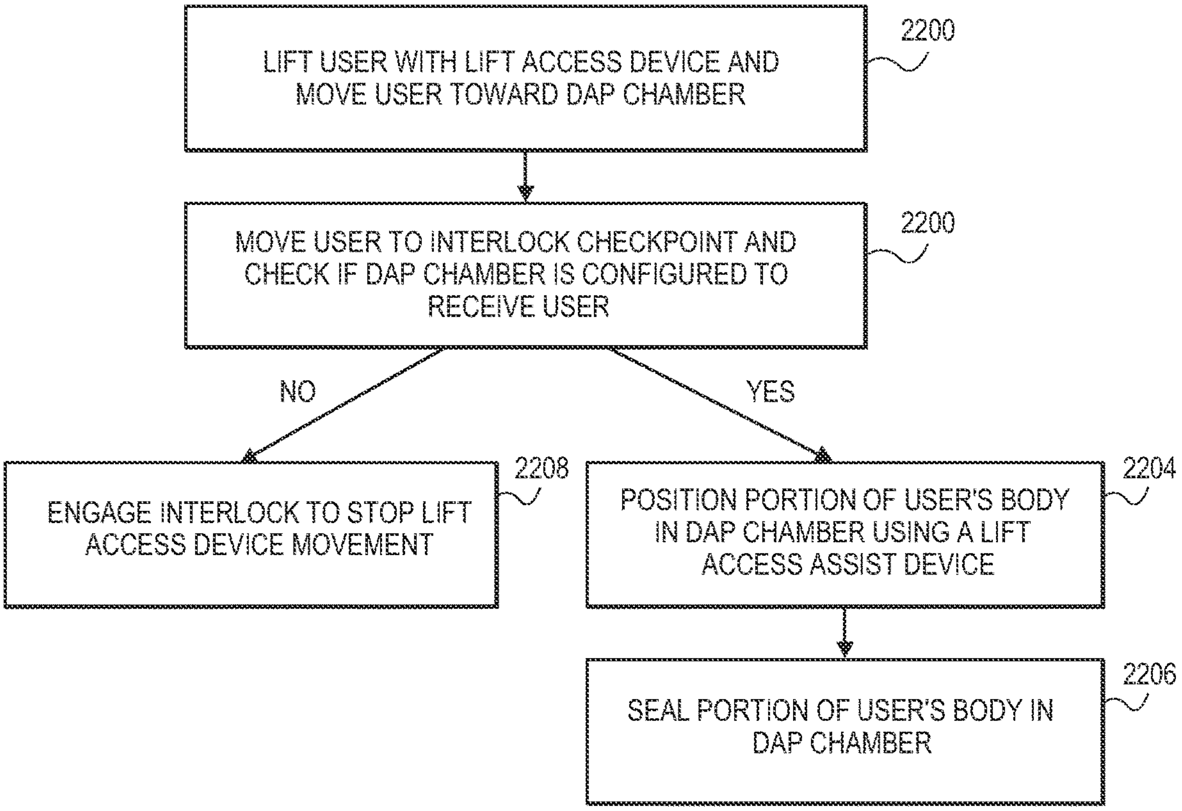
FIG. 14 is a flow diagram schematically illustrating a method for calibrating the system according to one embodiment.

FIG. 14 provides a flowchart showing one embodiment of the interlocking mechanism where the processor operates the interlocking mechanism. At 2200, the lift access device such as the one shown in FIGS. 7A-7E begins moving the user toward the chamber. Once the device moves over an interlock checkpoint, 2202, the processor performs a check of the chamber configuration. If the chamber is configured to receive the user then the lift access device continues toward the chamber and positions the user in the chamber 2204. The user is then sealed in the chamber 2206. If the chamber is not configured for the user, the interlock engages and prevents movement of the lift access device 2208.

In some embodiments, the hoist device 716 is generally configured to engage a user, lift the user into the air, and to move the user relative to the lift access frame 714 and relative to the DAP system chamber 702. For example, in the variation of DAP system 700 shown in FIGS. 7A-7E, hoist device 716 comprises a lift housing 726 and a patient connection portion 728. A portion of lift housing 726 may engage track 724, such that hoist device 716 may be moveable along track 724. Hoist device 716 may be moveable along track 724 in any suitable manner. In some variations, one or more portions of the access assist device 712 (e.g., hoist device 716) may comprise one or more motors for moving the hoist device 716 along track 724. In these devices, a processor or other control system may control the motor to move hoist device 716 along track 724. In other variations, the hoist device 716 may be manually movable along frame. For example, hoist device 716 may comprise a releasable locking mechanism (not shown) that may hold the hoist device 716 in place relative to the track 724. The locking mechanism may be temporarily disengaged, at which point the hoist device 716 may be moved (e.g., by a user, physician, trainer or other party) along track 724.

Additionally, patient connection portion 728 may be vertically moveable relative to lift housing 726. While shown in FIGS. 7A-7E as being a horizontal bar 730, patient connection portion 728 may be any suitable structure (e.g., a hook, carabiner, etc.). Generally, patient connection portion 728 may temporarily engage a user to lift that user into the air. The patient connection portion may lift a user in any suitable manner. In some variations, the patient connection portion 728 may be attached to a sling or seat (not shown). In these variations, a user may sit in the sling or seat (or the sling or seat may be placed underneath the user), and the sling or seat may be lifted into the air via the hoist device. Once the user has been lowered at or near the user seal of the pressure chamber (as described in more detail below), he or she may stand from or may otherwise be aided from the sling or seat to a standing position in the pressure chamber.

In other variations, the horizontal bar 730 can be a handlebar for the user to hold onto while being lifted or otherwise moved relative to the chamber 702. The bar 730 may be equipped with hand rests or handle straps (not shown) to help a user hold onto the bar 730.

In other variations, the patient connection portion 728 may be attached to, or may otherwise comprise one or more arm straps (not shown). In these variations, a user may place his or her arms through the straps, and the arm straps may lift the patient by the arms and/or shoulders when the patient connection portion 728 is raised. When a user is lowered into the user seal 704 of a pressure chamber 702, the user may pull their arms from the arm straps.

In still other variations, the patient connection portion 728 may attach to one or more portions of the user's clothing. For example, in some variations a user may wear a harness (e.g., a waist harness or a shoulder harness), and the patient connection portion 728 may be connected to the harness. The patient connection portion 728 may be raised to lift the user into the air via harness, and may move the user over and/or through the user seal. Once in place, the patient connection portion 728 may be disengaged from the harness, or the harness may be disengaged from the user. In variations where the user seal may comprise a separate pressure structure or material that may be removably attached to the chamber and is wearable by a user (e.g., a waistband or belt with panels or a skirt, or a pair of shorts or pants, as described above), the separate portion of the user seal may be worn by the user and attached to the patient connection portion 728, such that the hoist device may lift the user via the user seal.

When engaging a user, patient connection portion 728 may be raised or lowered relative to the rest of hoist device 716 (e.g., lift housing 726) to raise or lower the user. Patient connection portion 728 may be raised and lowered in any suitable manner. In some variations, the hoist device 716 comprises a motor (not shown) for raising or lowering the patient. In these variations, the DAP system may comprise one or more processors or other control devices for controlling the height of the patient connection portion 728. In other variations, one or more pulley systems may be utilized to raise or lower the patient.

Figure 7B:
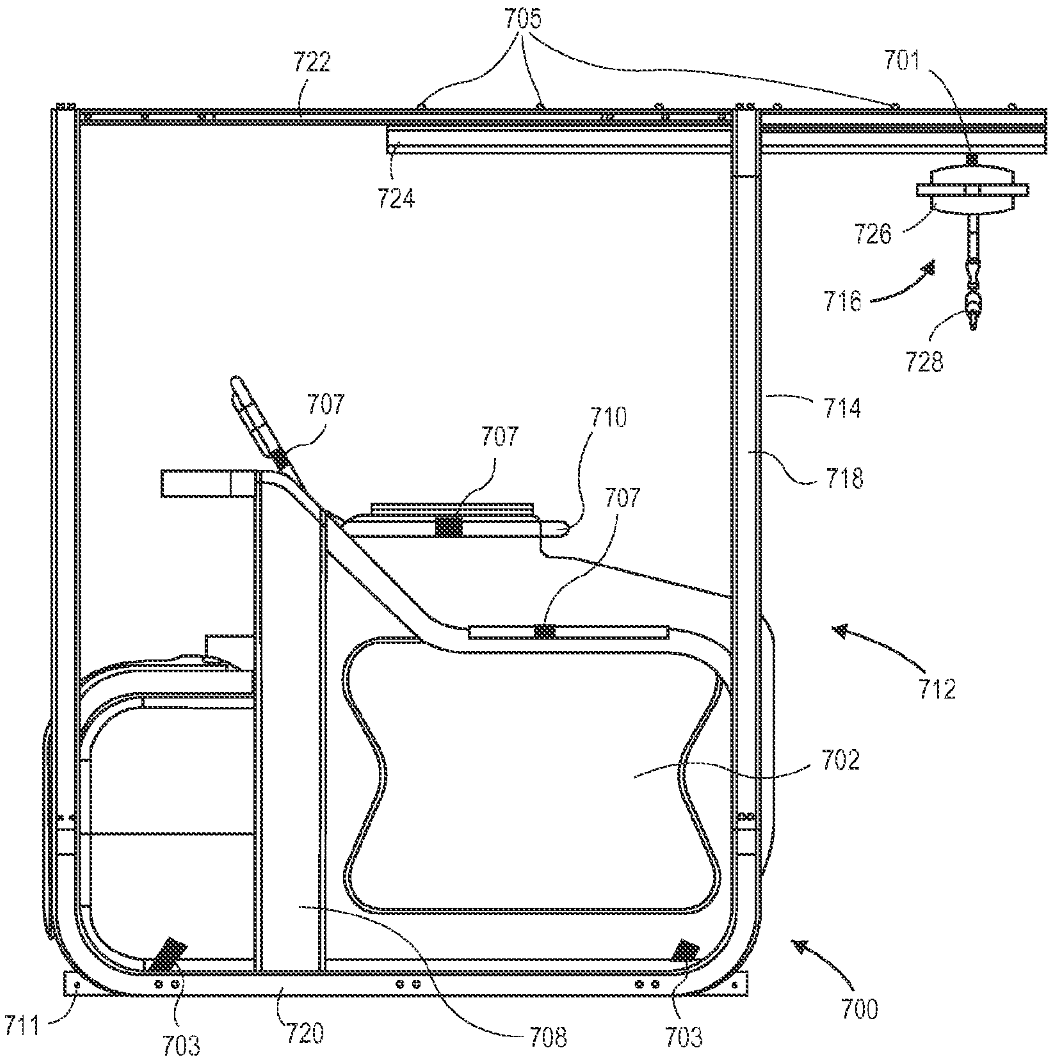
FIGS. 7B-7E are side views of the system of FIG. 7A.
Figure 7C:
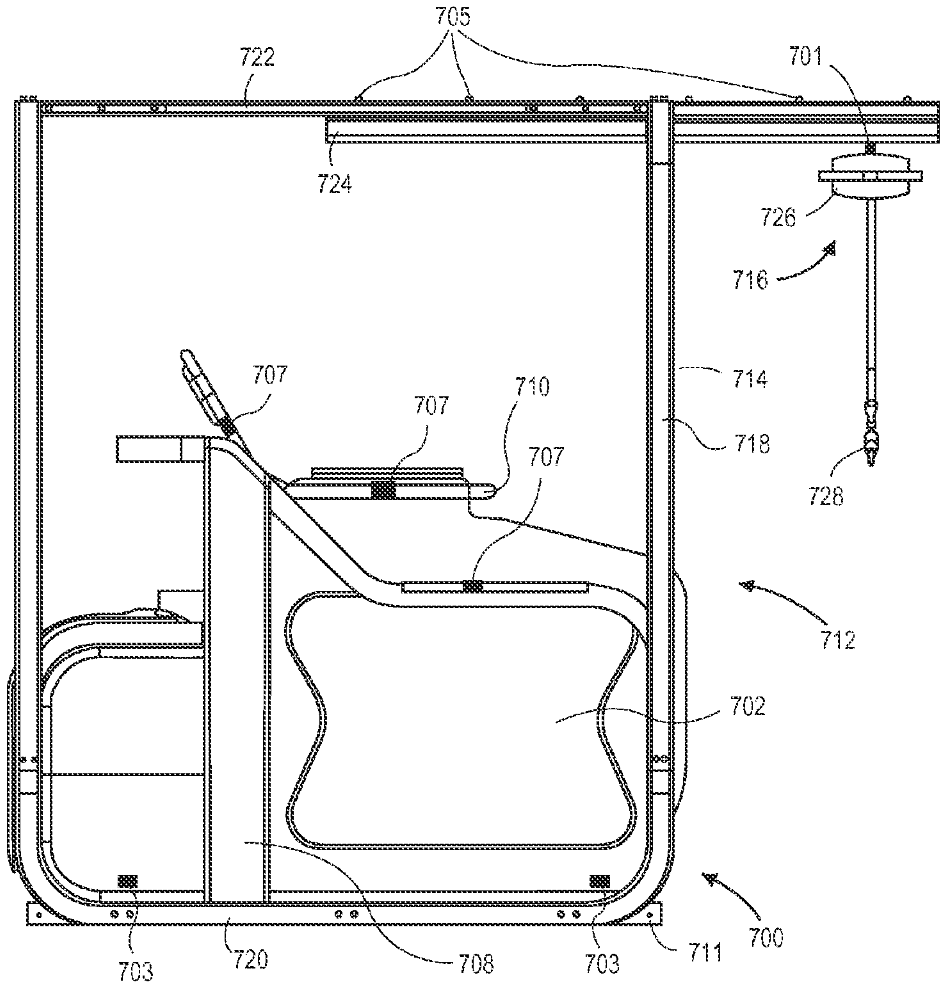

FIGS. 7B-7E illustrate one access method by which access assist device 712 may facilitate user access to chamber 702. It should be appreciated that although shown in FIGS. 7B-7E as being in a raised position, a height-adjustable seal frame 710 of the DAP system may be lowered before using access assist device 712. To use access assist device 712, hoist device 716 may be moved along track 724 away from chamber 702 to a first position, as shown in FIG. 7B. Once in the first position, the hoist device 716 may be locked in place, and patient connection portion 728 may be lowered, as shown in FIG. 7C. Once lowered, the patient connection portion 728 may temporarily engage a user (not shown), as described in more detail above. The patient connection portion 728 may be raised, thereby lifting the user into the air. The first position of the hoist device 716 may also engage an interlock checkpoint 705*a* where as described above, the control system or processor of the DAP system checks on the status of the DAP system's readiness for the user. For example, the processor may check on whether the height-adjustable seal frame 710 has been lowered to accept a user from the assist access device. In some embodiments, the processor may do this check prior to the user attaching to the hoist device or after the user is connected but prior to the movement of the hoist device. As can be appreciated, any number of variations on the timing and/or location of an interlock checkpoint can be arranged as needed in the DAP system.

Figure 7D:
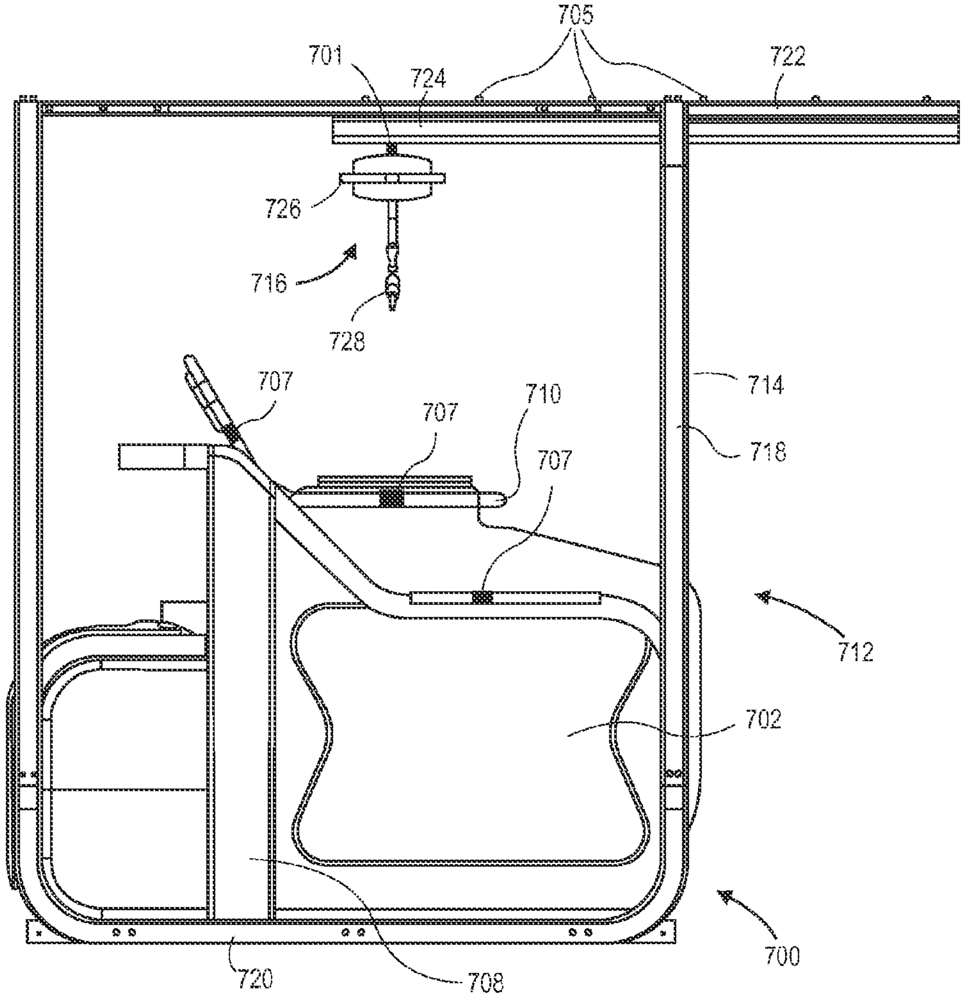
Figure 7E:
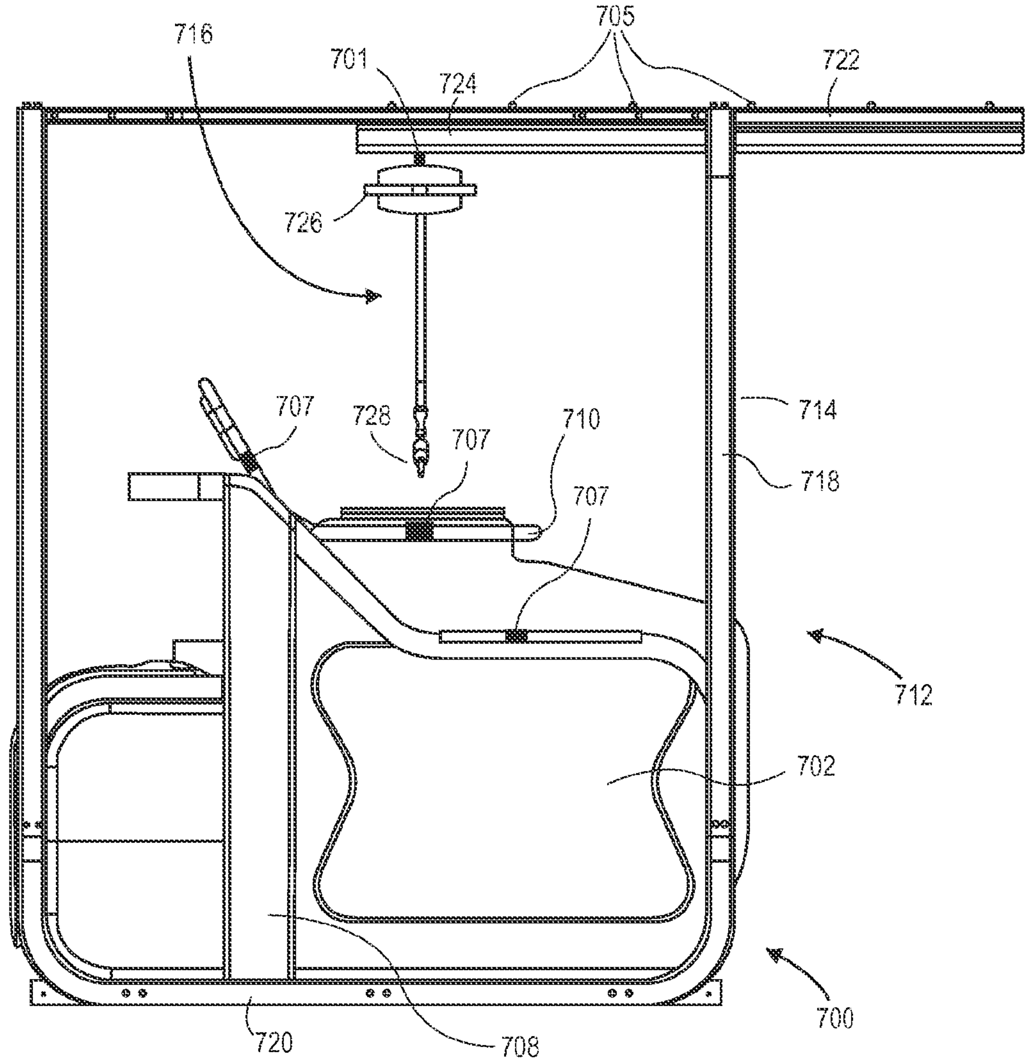

Once the user is connected to the hoist device 716, the hoist device 716 may then be moved to a second position to place the user above the user seal (not shown) of chamber 702, as shown FIG. 7D. The patient connection portion 728 may then be lowered to place the user at least partially inside of chamber 702, as shown in FIG. 7E. Prior to lowering the user into the chamber 702 or seal, the hoist device may engage with additional interlock checkpoints 705*a-c*.

Once in place, the user may initiate a training, exercise, or rehabilitation session. In some variations, this may comprise raising the user seal of the chamber to a comfortable height using seal frame 710 or another mechanism. Additionally or alternatively, the patient connection portion 728 may be disengaged from the user prior to initiating the training, exercise, or rehabilitation session, and may be moved to another position (e.g., first position) during the session. Following the session, the steps described above may be reversed to remove the user from the chamber 702.

It should be appreciated that one or more of the steps described above may be performed automatically. For example, in some variations, an operator may press a first button or other actuation mechanism to initiate the access method. A processor or other device may be configured to automatically move hoist device 716 to the first position, lock the hoist device 716 in place, and lower the patient connection portion 728. Once a user has engaged the patient connection portion 708, another button may be pressed, and the device may be configured to automatically raise the patient connection portion 728 and the user, move the hoist device to the second position, and/or lower the patient into the pressure chamber. The processor (or other device) may also optionally check the conditions of the DAP System at interlock checkpoint(s) at any time during the process of lifting and moving the patient/user in and out of the chamber 702. Additionally or alternatively, one or more steps may be manually controlled. For example, it may be desirable to manually control the lowering of patient connection portion 728, such that the patient connection portion 728 may be lowered to different heights depending on the height or positioning of a user. In these instances, one or more buttons or other control devices may be used to control the positioning of the hoist device 716, and the height of the patient connection portion 728.

Figure 16A:
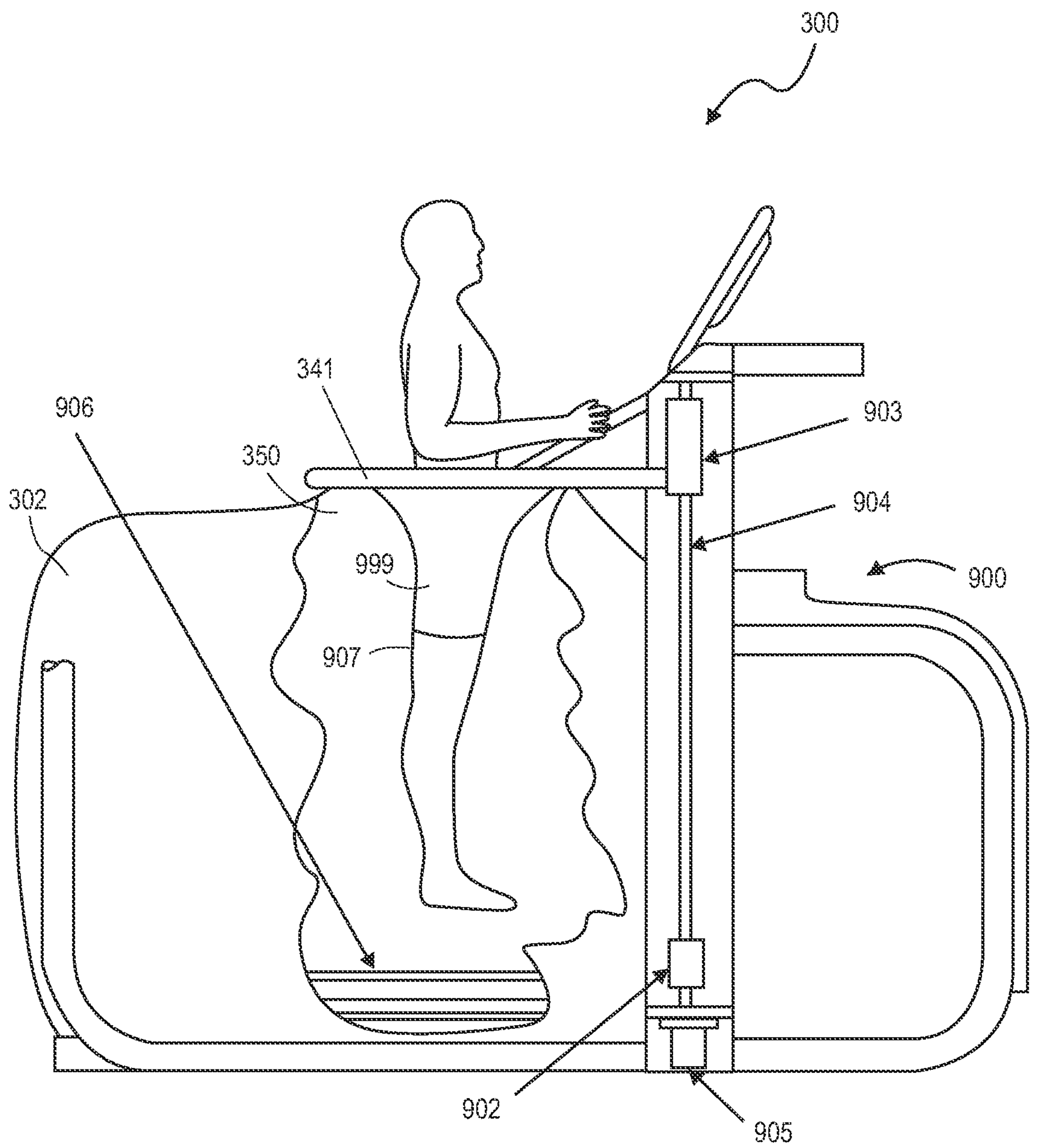
FIG. 16A shows a side view of a differential pressure system with a motorized lift according to one embodiment.

Although shown as an overhead lifter 712 in FIGS. 7A-7E, the access assist device for helping a user/patient enter and exit the DAP system can be a variety of any number of devices for carrying and moving a user's body. For example, the DAP system may include a motorized seat lift 900 to maneuver a user vertically. In those variations, the DAP system may use the power required to operate the lift to derive the weight of the user. FIG. 16A shows one embodiment of the DAP system 300 with a motorized lift 900 for adjusting the height of the seal frame 341. In this embodiment, the user is generally placed into the seal interface 350 while the chamber 302 is deflated and collapsed. The seal frame 341 is lowered and the user is positioned in the seal interface 350 either unassisted or with help from an access assist device. Once inside the seal interface 350, the user may be secured to the seal interface 350 by way of a support connection such as a harness or a wearable connector 907 that engages with the seal interface to maintain the seal between the chamber and the environment outside the chamber 302. Dotted line 999 shows the outline of the user's leg in the connector 907. The seal frame 341 is then vertically lifted with the user connected in the seal interface 350. As shown in FIG. 16A, the DAP system 300 includes a motorized lift system 900 with a lead nut 903, lead screw 904, and motor 905 to automatically lift the seal frame 341 to a desired height. The motorized lift system 900 may include a load sensor 902 such as a load cell configured to measure the load lifted. The load sensor may output a load signal to a processor with the load measurements. In some embodiments, the processor is configured to subtract the load lifted when the seal frame 341 without user is vertically moved from the total load lifted with the user engaged in the seal frame 341. In other embodiments, the DAP system 300 may include an exercise device 906 such as a treadmill. In some embodiments, the user may be weighed in the motorized lift 900 by lifting the user such that the user's lower extremities are substantially in a standing position. This may be done by lifting the user such that the user's feet, for example, are above the platform/exercise device (as shown in FIG. 16A). The user can then afterward be lowered to contact the treadmill or platform etc. In other embodiments, the user is lifted and weighed while the user's feet contact the platform, treadmill, or bottom of chamber.

Figure 16B:
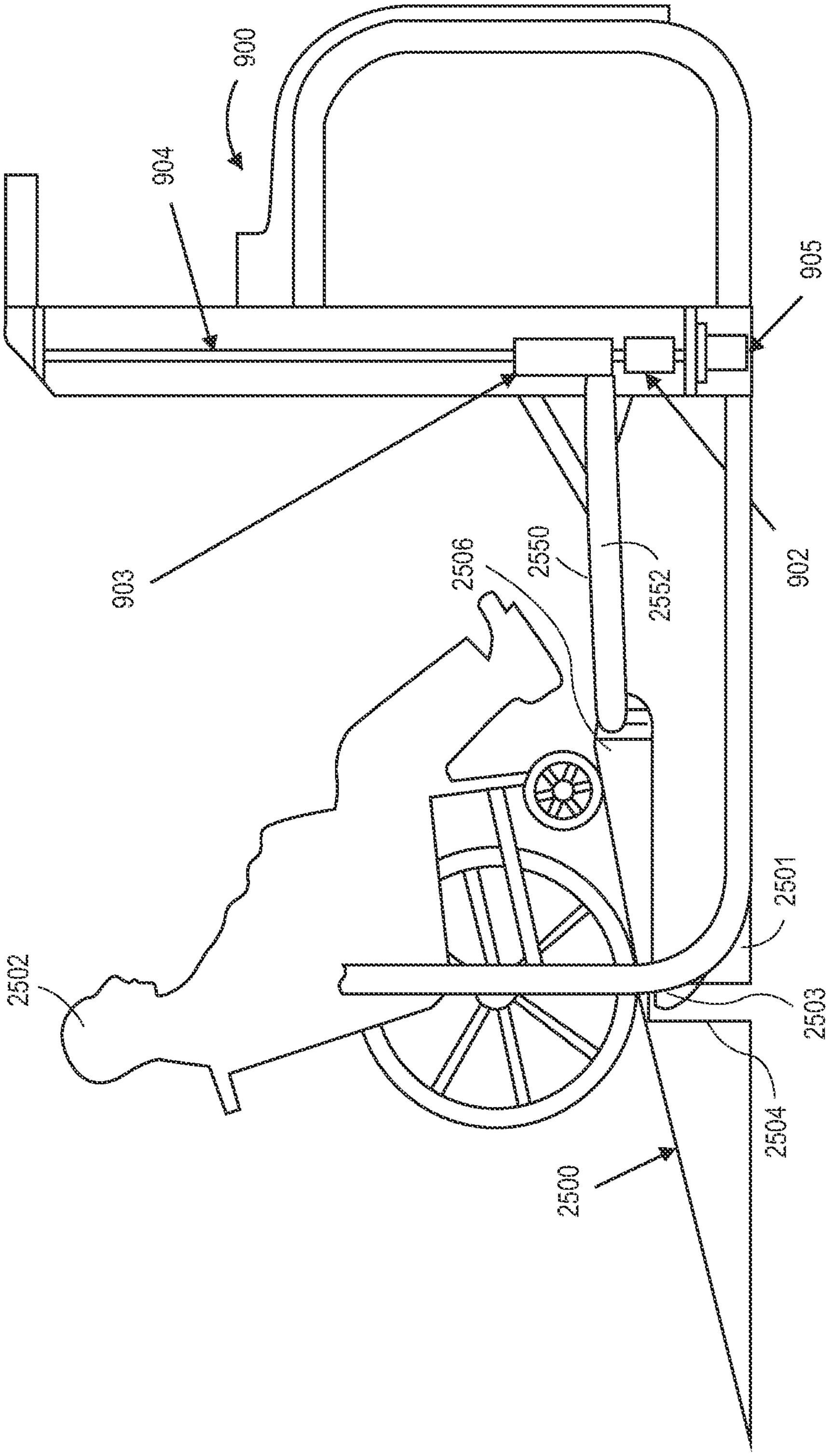
FIG. 16B shows a side view of a differential pressure system with a motorized lift and a wheelchair ramp according to one embodiment.

As shown in FIG. 16B, a user may gain access to the motorized lift 900 shown in FIG. 16A from a wheelchair. For example, an access assist device such a wheelchair ramp 2500 with a contoured 2504 side to fit over the deflated collapsed chamber material 2503 and a lip 2506 spanning across a portion of the chamber 2503 to the opening 2550 can be used to wheel the user to over the opening 2550. Once in position, the user 2502 can drop his feet into the opening 2550 and maneuver off the wheelchair into the chamber 2503. The user 2502 may be able to sit in the seal interface 2552 and put on a wearable harness such as the user connection 907. In some embodiments, a motorized lift 900 can then be used to maneuver the user into a substantially upright position as shown in FIG. 16A.

Figure 17E:
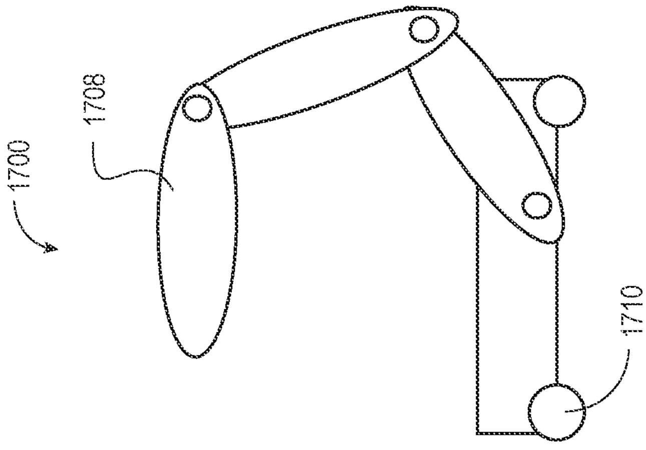
FIGS. 17A-17E show an access assist device according to one embodiment for moving a user into a differential pressure system.
Figure 17D:
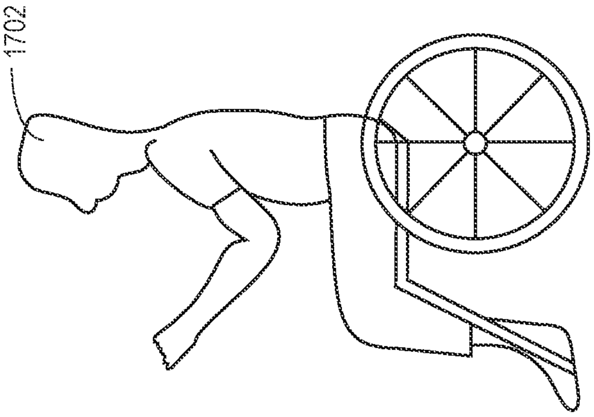
Figure 17A:
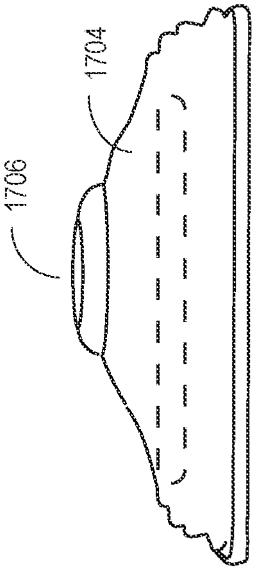
Figure 17B:
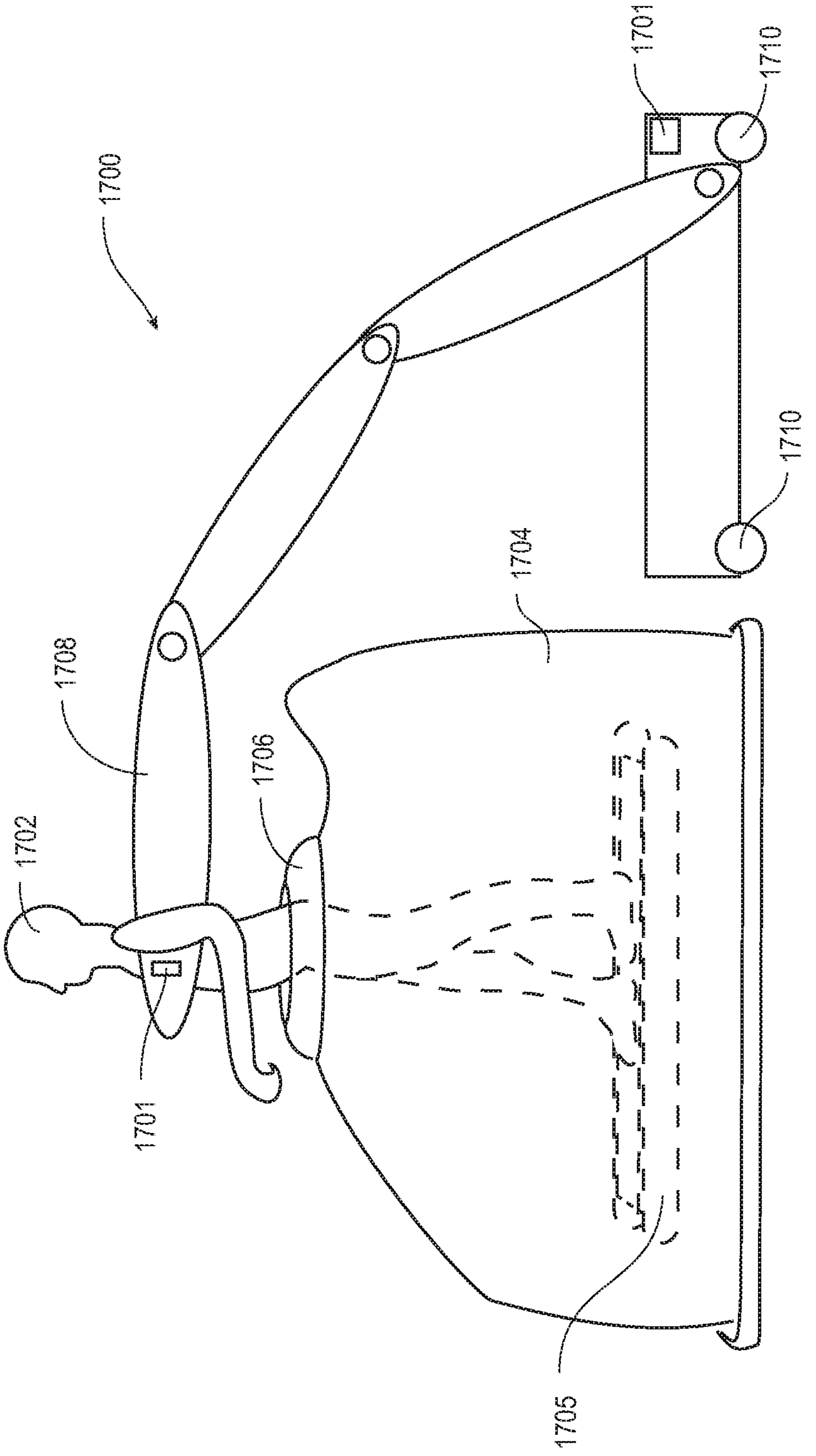
Figure 17C:
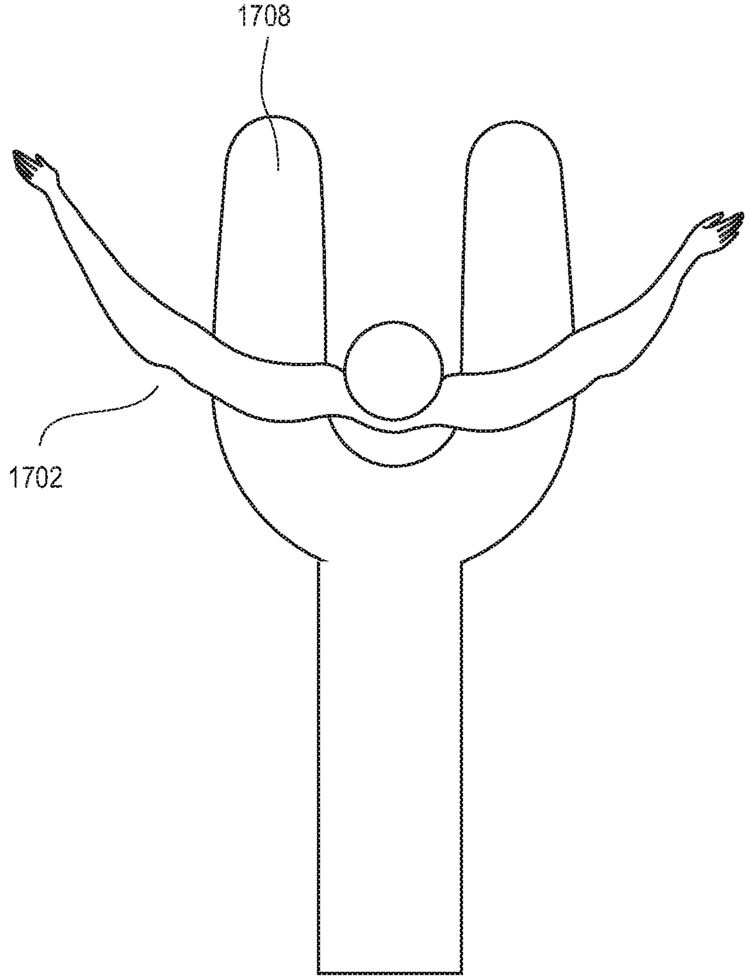

In additional embodiments, the access assist device may be unconnected to the DAP system. In such embodiments, the user may be bedridden in a separate location from the DAP system. The user may need to be moved from the bed to an access assist device and then moved to the chamber for therapy. FIGS. 17A-19 show exemplary embodiments where the access assist device is a moveable unit that can transport the patient to the DAP system. FIGS. 17A-17C show a multi-link arm lifter 1700 with load cells 1701 that can be connected to the user body to lift and carry the user to the chamber. The device 1700 shown in FIGS. 17A-17E includes an engagement portion 1708 that connects to the user 1702 to support the user 1702 during movement from one location to the DAP system. The device 1700 may be powered manually or automatically suitable operating means such as a pneumatic, hydraulic, or mechanical mechanism. The device 1700 may also be mobile, such as including wheels 1710 to allow the assist device to roll to a user location, pick up the user, and then bring the user to the DAP system for drop-off. The device 1700 can also be used to lift the user into and out of the chamber 1704 via opening 1706, shown in FIG. 17A. In some embodiments, the lifter 1700 includes an engagement portion that supports the user 1702 from under the user's arms (e.g. thoracic support). As shown in FIG. 17B, the lifter 1700 has an extendable length to accommodate varying distances. For example, in a non-extended state, the device 1700 in FIG. 17E can approach a wheelchair (FIG. 17D) and lift a user 1702. In the extend state, shown in FIG. 17B, the lifter 1700 can position the user 1702 into the opening 1706 and on an exercise device 1705 inside the chamber 1704. FIG. 17C provides a top-down view of a variation of device 1700 with a user engagement connection supporting the user 1702 from under his arms.

Figure 18A:
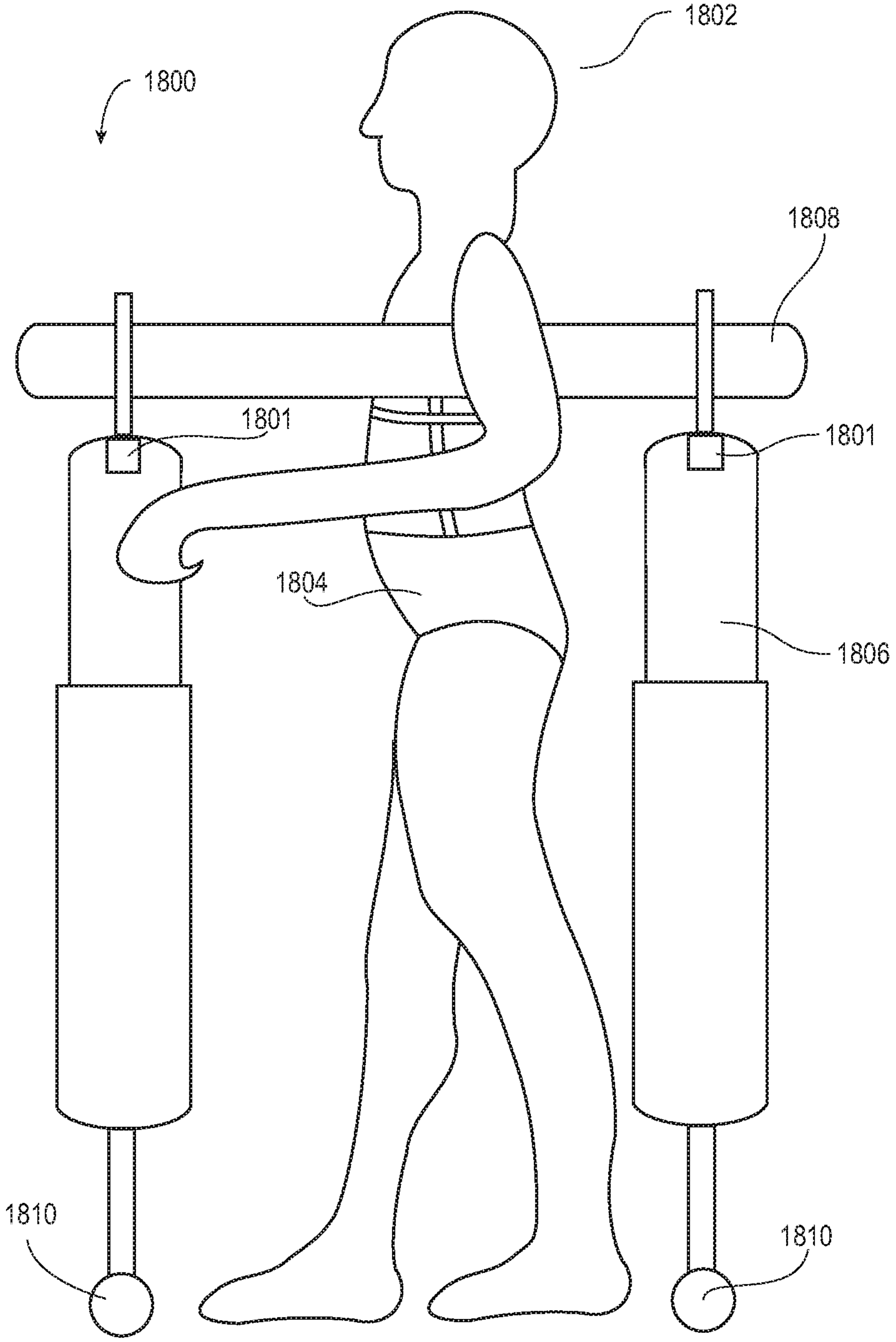
FIGS. 18A-18B show another access assist device according to one embodiment for moving a user into a differential pressure system.
Figure 18B:
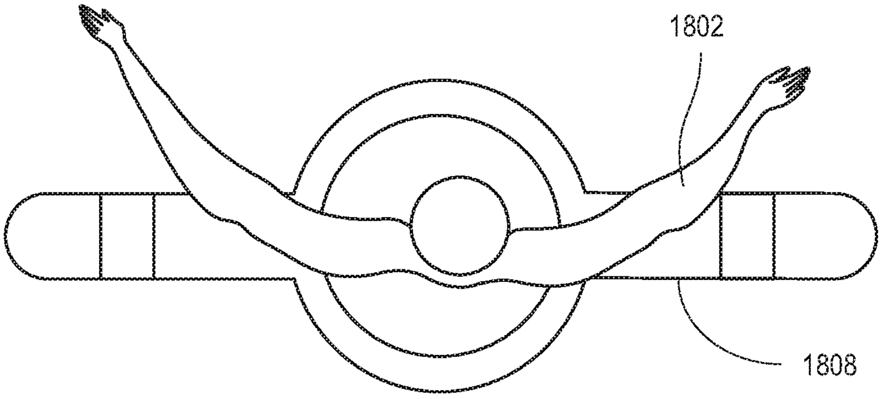

Alternatively, the access assist device can be a rolling lifter such as the one shown in FIGS. 18A-18B where the device 1800 has a patient/user connector 1808 to hold the user 1802 when the user 1802 is in the connector 1808, a height-adjustable frame 1806 to allow the user 1802 to be raised and lowered, and wheels 1810 to permit movement. The device 1800 may also be angularly adjusted to accommodate the user's 1802 positioning into and out of the user connection 1808. The device 1800 may also include load cells 1801 and a harness 1804 for supporting the user 1802 as the device 1800 is moved angularly, vertically, or horizontally (e.g. rolling). FIG. 18B shows a top-down view of the user 1802 in the engagement portion 1808 where the user connection 1808 is a circular component for underarm support. Alternatively, the user connection 1808 can be designed to support the user's 1802 waist or torso region.

Figure 19:
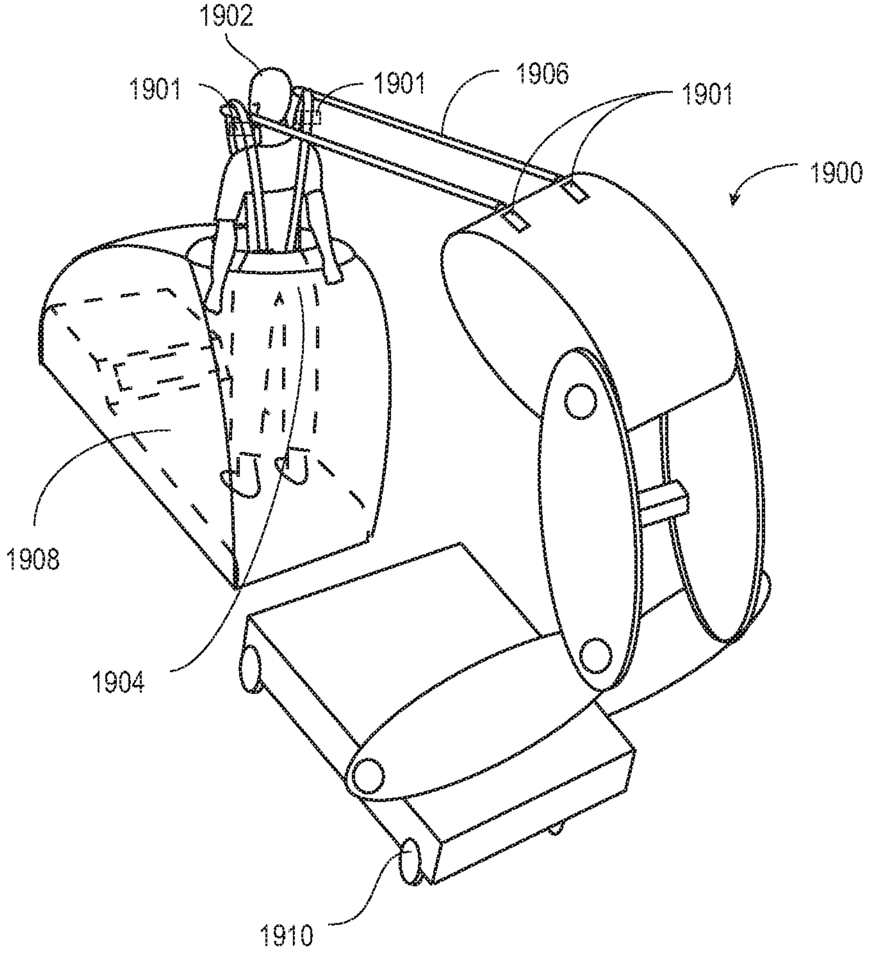
FIG. 19 shows another access assist device according to one embodiment for moving a user into a differential pressure system with an overhead suspension system.

In an additional embodiment, FIG. 19 shows an overhead suspension system 1900 with load cells 1901, a harness 1904 and wheels 1910 that is moveable from the user's location to a DAP system. The device 1900 can include a harness system 1904 designed to be worn by the user 1902. Although shown as lifting the user 1902 from behind, the access assist devices can be used to lift a user 1902 from any direction needed. For example, access to bedridden patient may be limited and require the device 1900 to lift the user 1902 from the sides or the end of the bed rather than from behind. The device 1900 can include extension components 1906 to accommodate varying movement distances. The device 1900 can also continue to be connected to the user 1902 even while the user is in the DAP system and on an exercise device 1908. In some embodiments, the device 1900 continues to provide support to the user 1902 while the DAP system is operating, in other embodiments, the device 1900 provides no support to the user 1902 once the user is in the chamber.

In further embodiments, the access assist device may not utilize a lifting mechanism to transport the user to the DAP system. For example, FIG. 16B shows a ramp system where a wheelchair can be rolled into proximity of an opening 2550 in the chamber and the user 2502 can slide into the opening. The ramp system 2500 can be configured to accommodate the contours and shape of the collapsed chamber by, for example, fitting over a portion of the collapsed chamber material such that the user 2502 is positioned directly above the opening 2550. Although FIG. 16B includes a motorized lift, in some embodiments, the user 2502 may have sufficient mobility to slide into the opening 2550 and manually raise the seal frame of the seal interface 2552.

In some embodiments, the access assist devices may also include a load sensor such as a load cell to measure the weight of the user supported by the device. For example in the overhead access assist device in FIGS. 7A-7E, the DAP system includes load sensors 703 in the base 711 of the system and load sensor 701 in the access assist device. The load sensors 703 are configured to measure the user's weight exerted against the bottom of the chamber 702 and load sensor 701 measures the user's weight supported by the access assist device 712. Although the DAP system 300 is shown with load sensors in the base 711 of the system, as described above, load sensors 707 can be placed in a variety of locations including handrails, seal frame, frame assembly, etc.

In addition, FIGS. 17A-17B show the load sensors 1701 at various locations on the device 1700. As can be appreciated, the location of the load sensors is variable depending on the device; however, generally a load sensor can be placed near a user load-bearing portion of the device 1700. The user connection 1708 is one location where the device 1700 bears the weight of the user 1702 when the user 1702 is lifted. Similarly, the power to lift the user may be provided by a motor or pneumatic mechanism. In other embodiments, the load of the user may be derived such as from the amount of power needed to lift the user. FIGS. 18A-18B and 19 show load sensors 1801 and 1901 respectively.

In addition to assisting users who have a high degree of motor and mobility impairment, other embodiments are directed toward supporting users with some but not complete impairment. Users requiring moderate levels of assistance may not require the use of an access assist device such as an overhead suspension system. Rather, some users may need only a leaning arm rest or other type of supportive structure in the DAP system to allow entering, exiting, and using the DAP system.

Figure 8A:
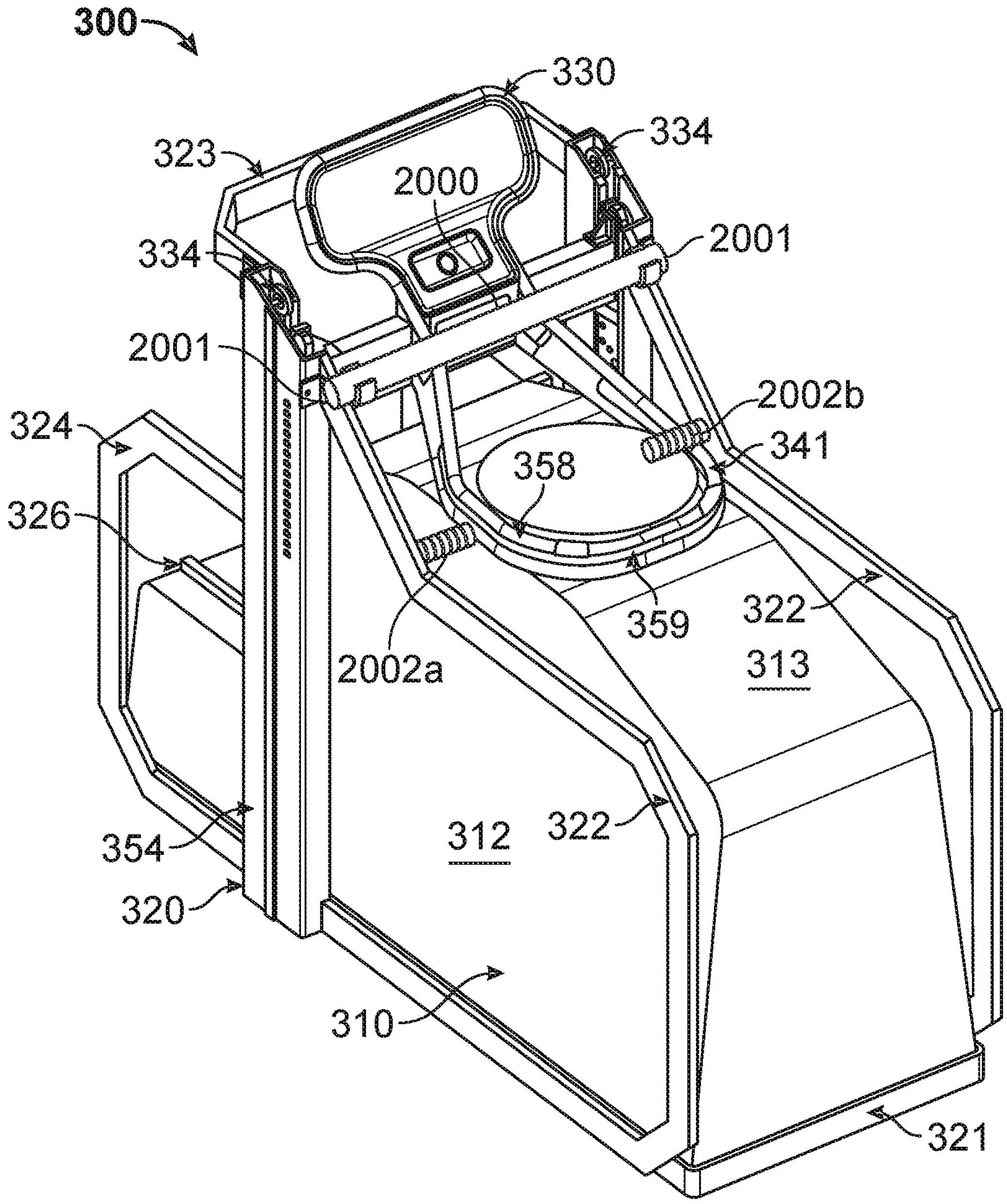
FIGS. 8A-8C is a perspective view of the differential air pressure system of FIG. 2A with an access assist device removably attached.

FIG. 8A provides an example of one embodiment of the access assist device having a supportive structure for use with the DAP system. FIG. 8 shows the DAP system of FIGS. 2A-2C outfitted with a support bar 2000. The support bar 2000 is shown to be placed on the frame assembly 320 of the DAP system. In FIG. 8A, the support bar 2000 is a horizontal bar positioned across the two side handrails 322 such that a user facing forward can grasp or lean against the support bar 2000.

Figure 11:
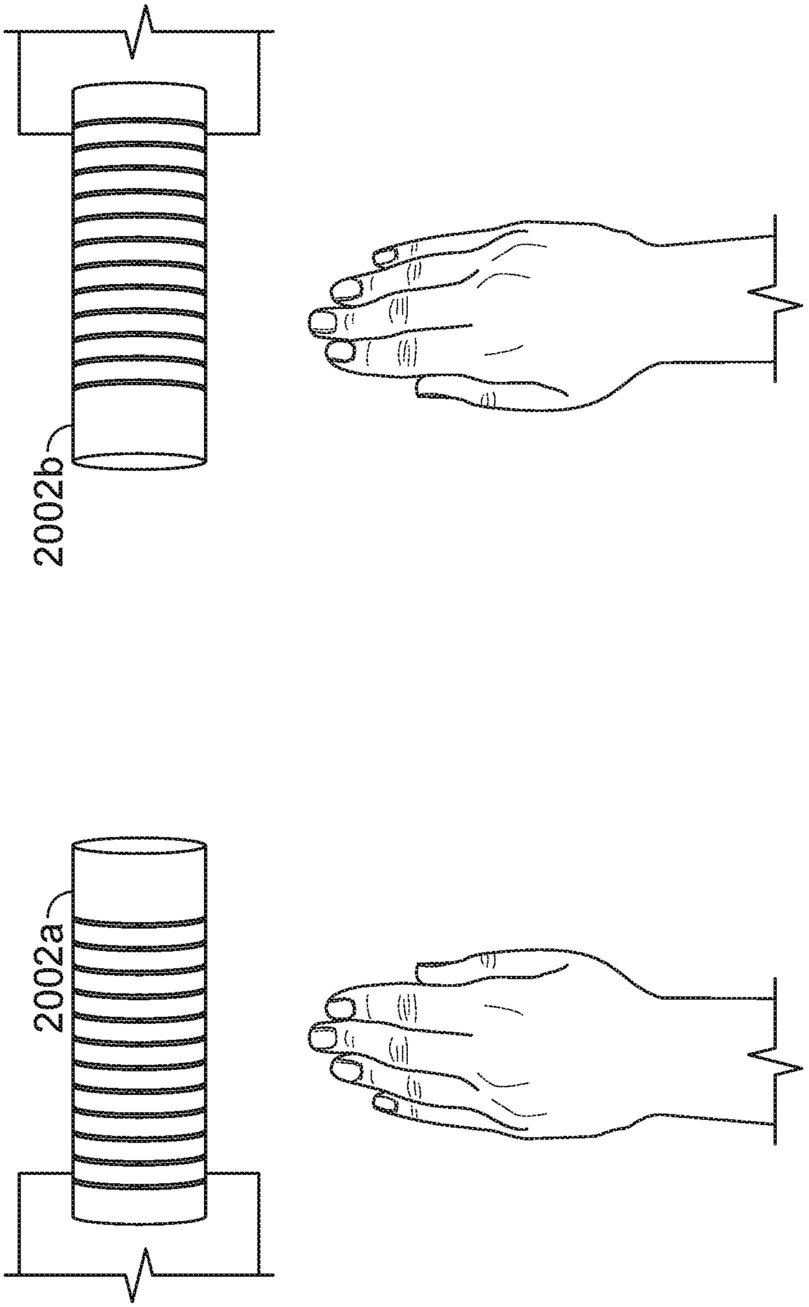
FIG. 11 shows an embodiment of a supportive structure with two bar portions to provide access and calibration assistance.

Moreover, multiple support bars may be used to provide support at different locations of the DAP system depending on the user's orientation. For example, the support bar may not comprise a single horizontal bar but more than one bar where one bar 2002*a* is on one side of the user and one bar 2002*b* is on the other side. The bars may have a length less than the width between the sides of the chamber. In one embodiment, as shown in FIG. 11, support bar 2002*a* and support bar 2002*b* are attached to the frame assembly 320 but do not span across the width the space between the handrails 322.

Figure 8B:
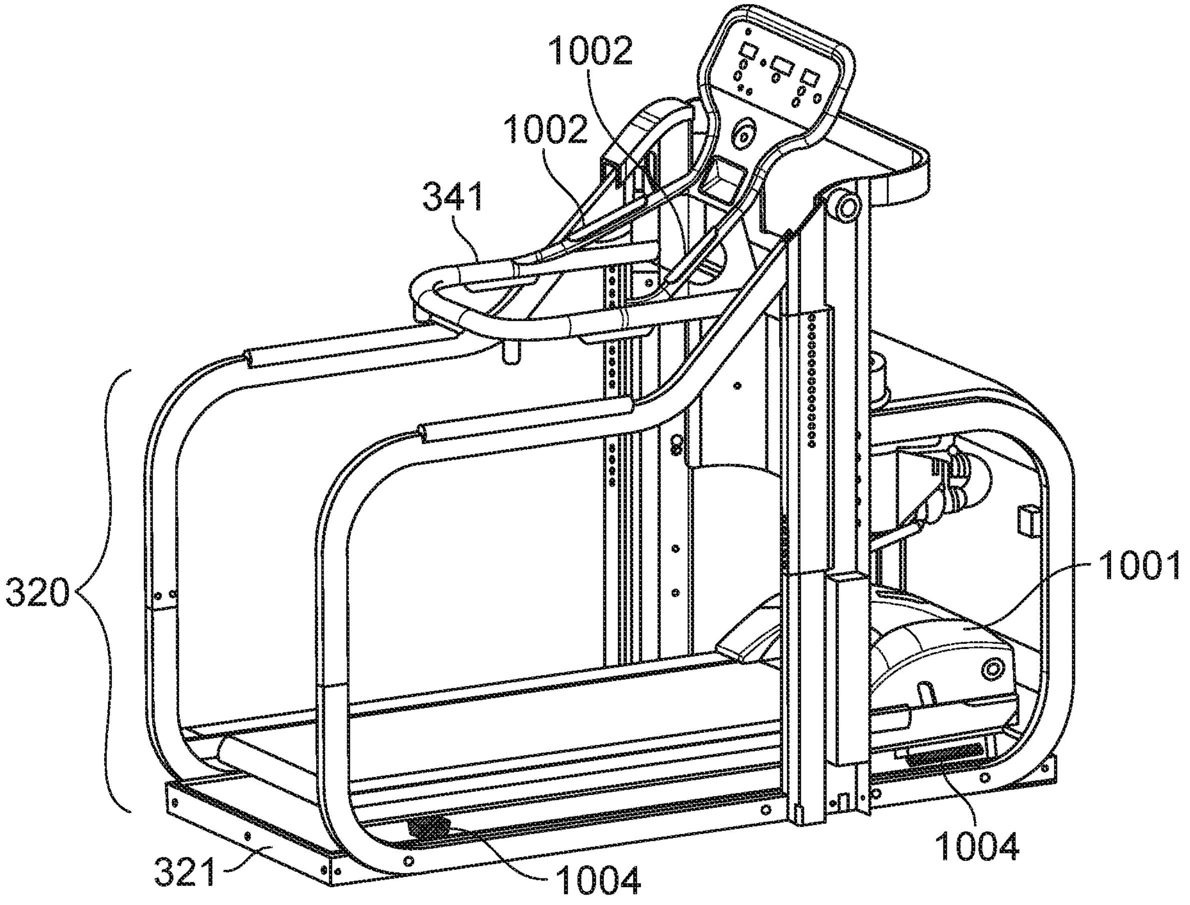
Figure 8C:
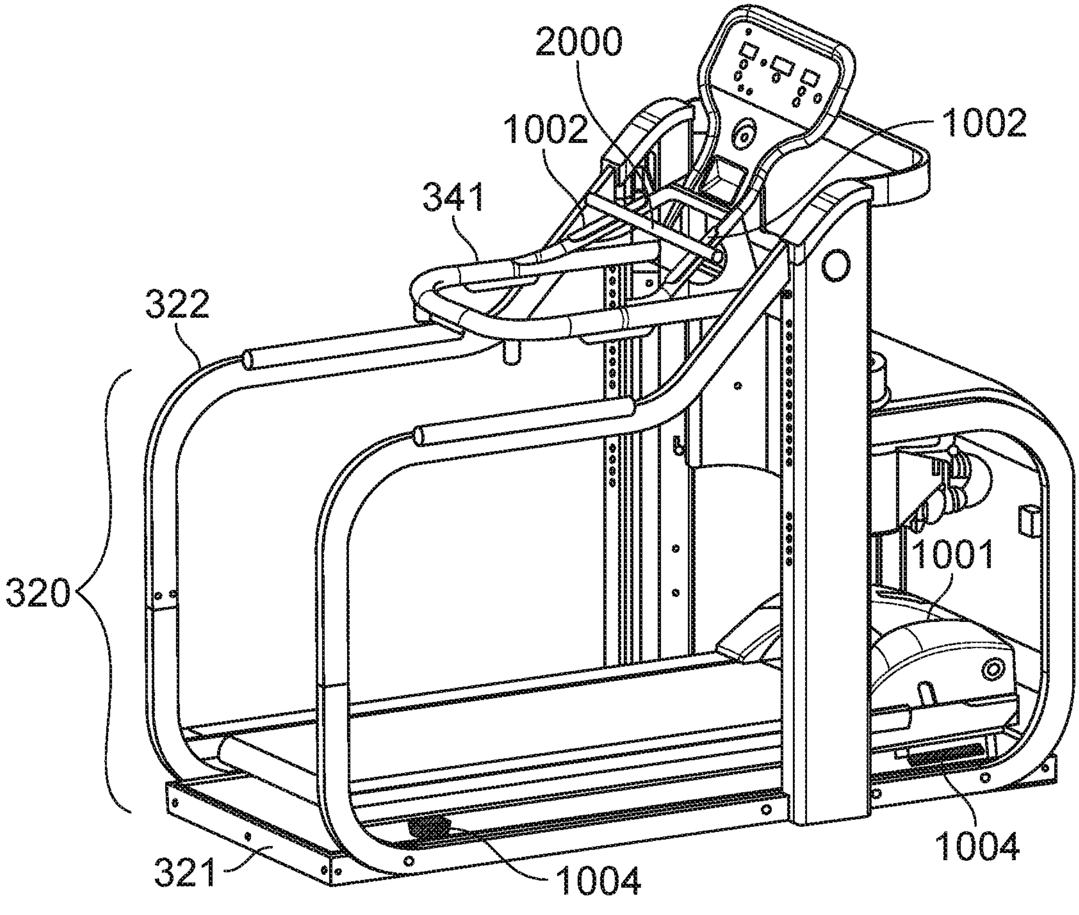
Figure 12:
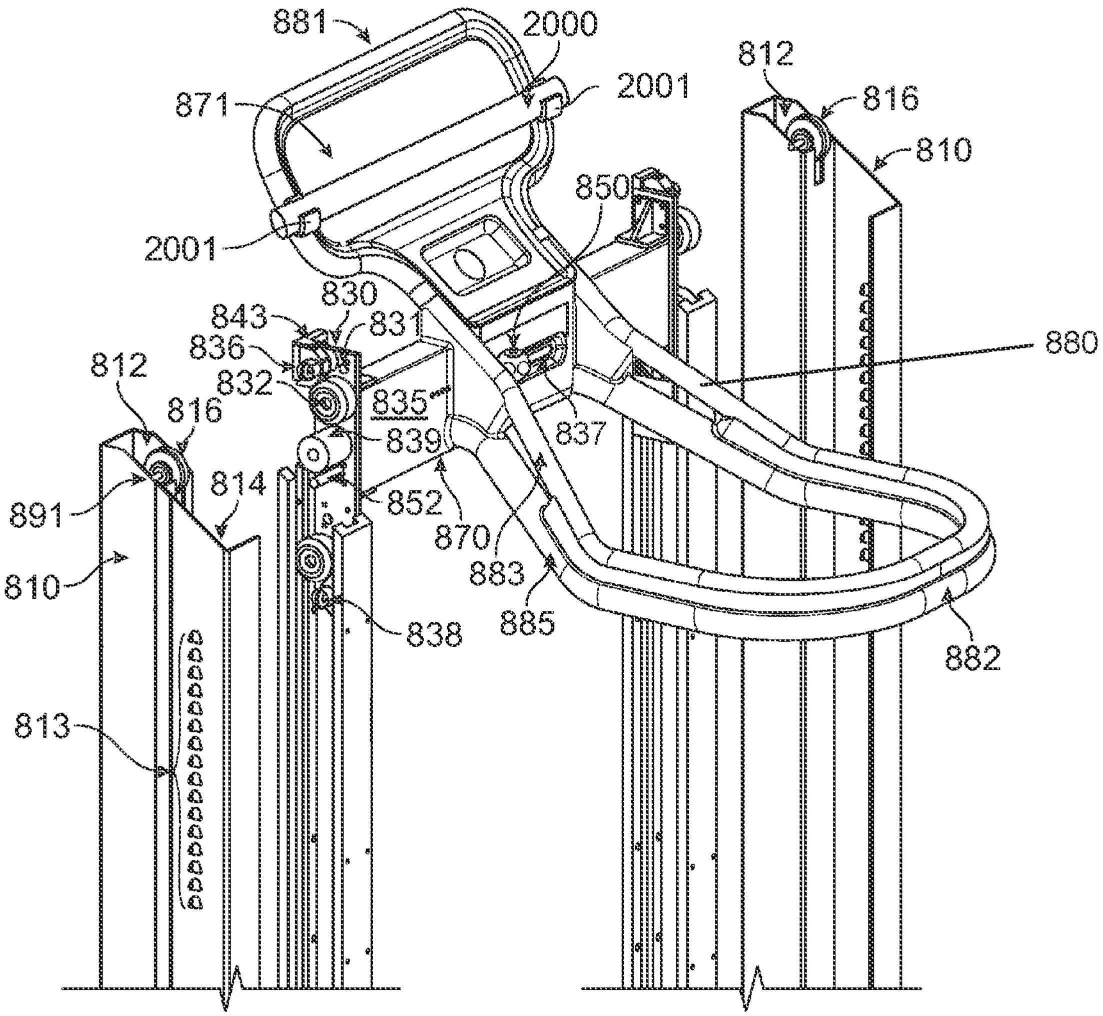
FIG. 12 shows an embodiment with a supportive bar attached to the seal frame of the differential air pressure system.

Although shown as part of the handrail 322, the support bar 2000 can be placed on any of the DAP system components such as frame assemble 320 or seal frame 341 to bear the user's weight. FIG. 8A shows the support bar 2000 and 2002 on the frame assembly 320. FIGS. 8B-8C and FIG. 12 show the support bar 2000 on the seal frame 341. In particular, FIGS. 8B and 8C show the support bar 2000 on the seal frame 341 and load sensors 1002, 1004 on the DAP system. The support bar 2000, in the depicted embodiment, is a horizontal crossbar designed to engage the hands or arms of a user. The support bar 2000 can be affixed to or removable from the seal frame 341. The crossbar may include handgrips to provide additional support when leaned or grasped by the user. In some embodiments, the support bar 2000 is designed to engage load sensors on the DAP system. For example, FIG. 8C shows load sensors 1002 on the seal frame 341 under the support bar 2000. When a user applies force on the support bar 2000, the load sensors 1002 measure the force and can output the measurement to a processor on the DAP system. In some embodiments, the processor receives an output signal from the load sensors 1002 providing the force measurements. In some embodiments, the user's force is a compressive force exerted by leaning or pushing against the support bar 2000. In other variations, the user's force is a tension force pulling the support bar away from the load sensors 1002.

In addition to the load sensors on the seal frame 341, the DAP system 300 can include load sensors 1004 in the base/platform 321 of the DAP system. The load sensors 1004 may be placed under an exercise device 1001 (e.g. treadmill). In other embodiments, the load sensors 1004 may be placed in the exercise device, such as under a treadmill runway belt. In some embodiments, four load sensors are placed at the four corners of a treadmill in the DAP system. In further embodiments, the processor of a DAP system receives the load output from load sensors 1004 and subtracts the load of the exercise device from the total load for the weight of the user exerted against the load sensors 1004.

Figure 9:
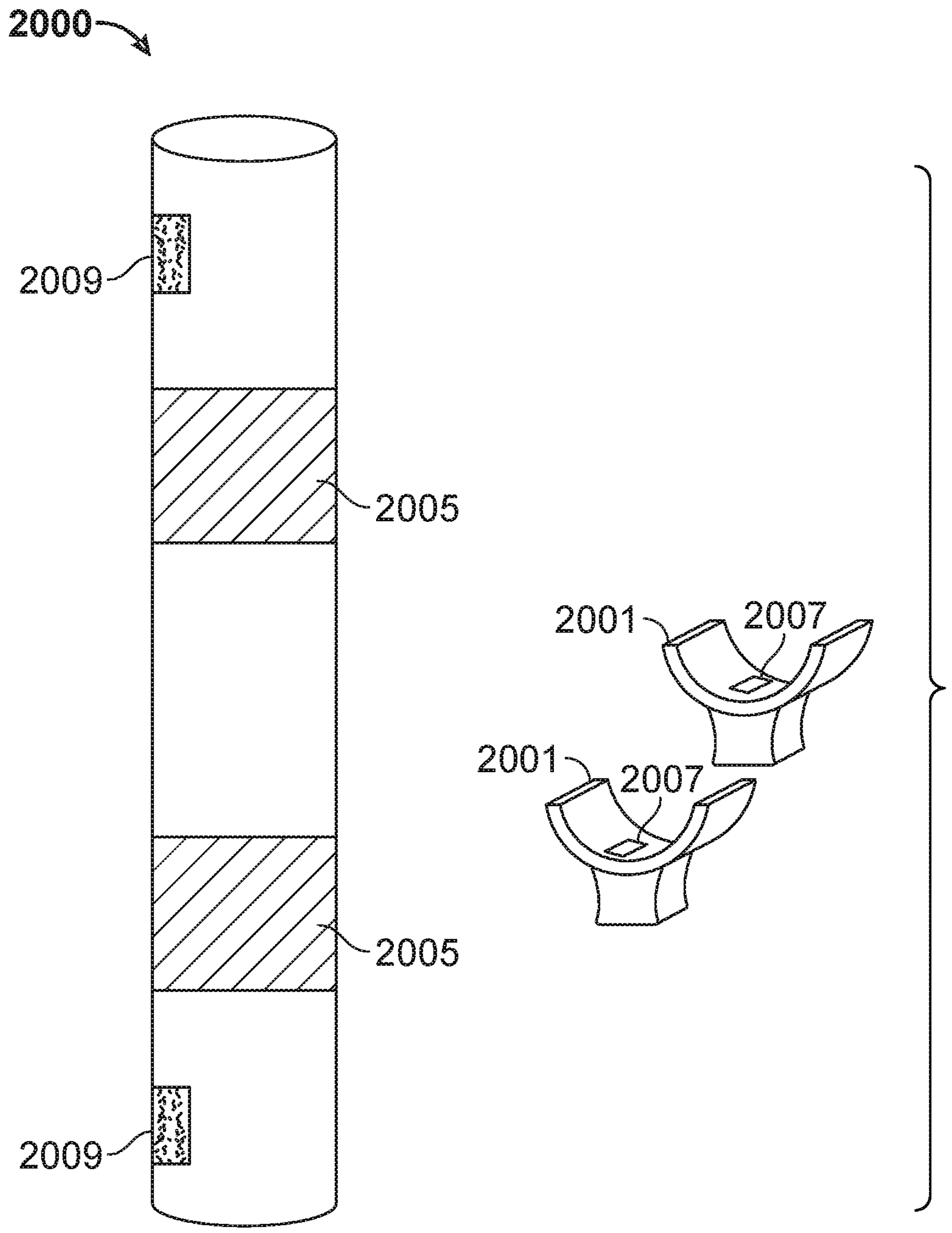
FIG. 9 shows one embodiment of a supportive bar that can provide access and calibration assistance.

As described, the support bar may be permanently affixed or removable from the DAP system. FIG. 9 provides an example of a removable support bar 2000 and a corresponding receiver 2001 on the DAP system. In such embodiments, the DAP system may have a frame assembly with a receiving means 2001 to receive and attach the support bar 2000 to the system. Such receiving means may include an attachment mechanism where the support bar snaps or clips into place with a mated interface. Other mechanisms include a groove or a slot designed to accommodate the support bar's dimensions. Still other examples include a strap or VELCRO mechanism to releasably fix the bar to the system. FIG. 9 shows a receiver with a curved semi-flexible elastic component to accommodate the shape of the support bar 2000. The support bar 2000 may be attached to the DAP system by pushing the support bar 2000 against the flexible component of the receiver 2001 to increase the diameter of the curved piece. The flexible component widens to accept the support bar 2000 and holds the support bar 2000 in place. In other embodiments, the receiver 2001 may retain the support bar 2000 by a locking mechanism such as mated locks or straps.

FIG. 9 also shows that the support bar includes electrical connectors 2009 to connect with the receiver at 2007. In some embodiments, the support bar 2000 can generate a signal to the processor via the receiver connection 2007 to indicate that the support bar 2000 is engaged with or disengaged from the receiver 2001.

Figure 10:
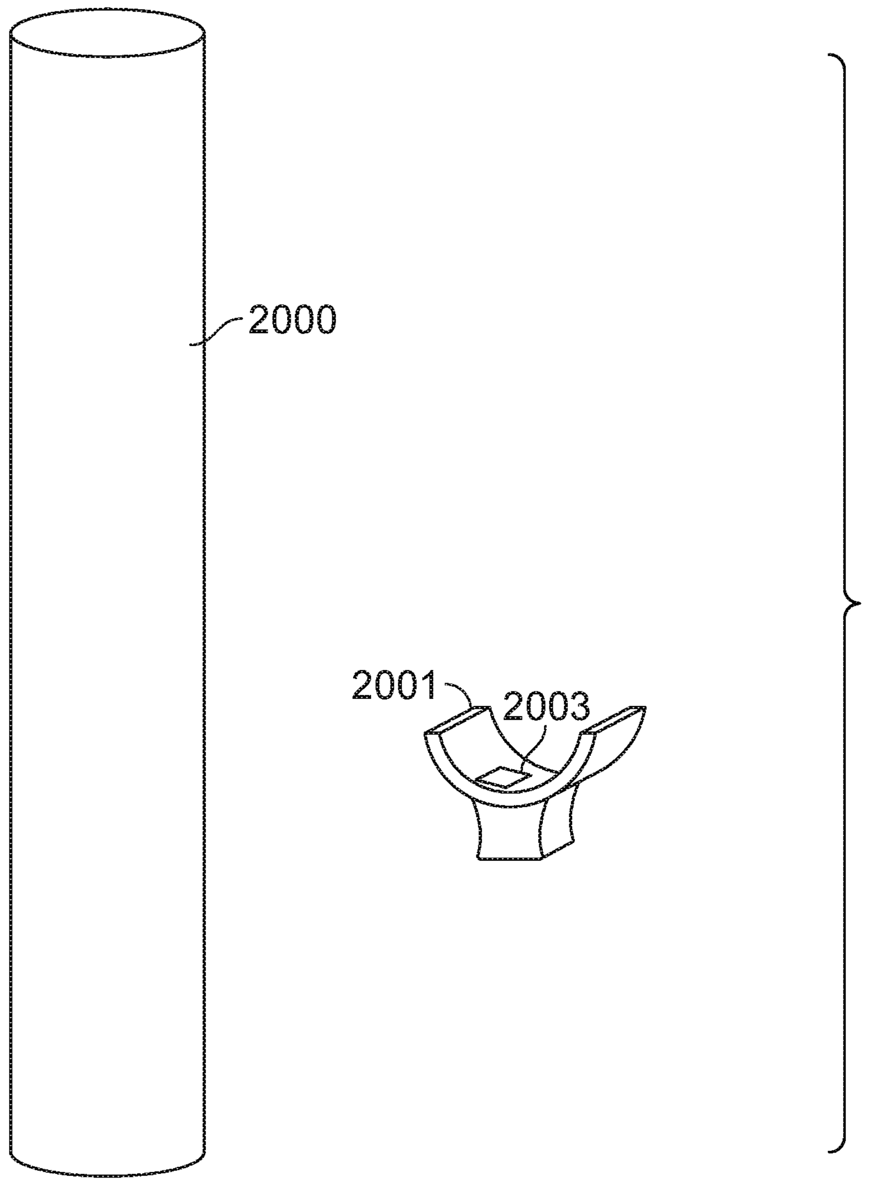
FIG. 10 shows another embodiment of a supportive bar that can provide access and calibration assistance.

In further embodiments, the support bar 2000 has an embedded load sensor 2005 to measure the force exerted against the bar. The load measured by sensors 2005 may be transmitted to the processor via the electrical connections 2009 and 2007. In other embodiments, the support bar (and its sensors) can communicate wirelessly with the processor. Alternatively, the load sensors may be embedded in the receivers. FIG. 10 shows a support bar without a load sensor and a receiver 2001 with load sensor 2003. As the user exerts force against the support bar in the receiver 2001, the load sensor 2003 in receiver 2001 measures the force and transmits the measurements to the processor.

In addition to the load sensor 2003, the support bar 2000 may include other sensors for tracking the patient's use of the DAP system. Other features, such as a heart rate sensor, temperature, blood oxygen content, may also be separately measured and communicated by the support bar 2000. In some variations, the support bar is equipped with data storage capacity such that the support bar can retain user identification and training or therapy information. For example, the support bar can be programed with the user's identification and to keep track of the patient's therapy or training protocol. When the patient uses a different DAP system with the same support bar, the DAP system can retrieve the protocol and provide the patient with the same training without having to re-enter the parameters of the therapy.

FIG. 12 further illustrates the structure of the height adjustment mechanism of the DAP system in FIG. 2A. The height adjustment mechanism 800 comprises a pair of generally parallel, vertically oriented side posts 810, a movable assembly 870 with two roller assemblies 830, each of which is at least partially housed inside a side post 810. The movable assembly 870 further comprises a frame 880 and a frame support bar 835 attached to the roller assemblies 830, which movably interface with the two side posts 810. As illustrated in FIG. 12, the frame 880 further comprises a console portion 881, a seal frame portion 882 and an angled middle portion 883. The angle between the console portion 881 and the seal frame portion 882 may be in the range of about 45 degrees to about 180 degrees, sometimes about 90 degrees to about 135 degrees, and other times about 110 degrees to about 135 degrees. The console portion 881 of the frame 880 may be configured to receive a console tray 871, which may be used to attach and/or support a control panel/display (not shown). The angled middle portion 883 of the frame 880 connects the console portion 881 and the seal frame portion 882. While the frame 880 may be configured to permit height adjustments while grasping or manipulating any portion thereof, in some embodiments, the middle portion 883 of the frame 880 may be configured as a handle to lift or to lower the movable assembly 870. The angled middle portion 883 may provide one or more gripping regions, which may comprise one or more flanges or ridges, for example, and/or be made of a high traction material such as rubber or a block copolymer with polystyrene and polybutadiene regions, e.g., KRATON® polymers by Kraton Polymers, LLC (Houston, Texas). The middle portion 883 of the frame 880 may be attached to the adjustment bar 835 of the movable assembly 870, which is in turn attached to the two roller assemblies 830 at both of its ends. In some embodiments, the middle portion 883 of the frame 880 may be reinforced by additional bars 885, which may increase the area of the contact surface between the frame 880 and the frame support bar 835 and thereby enhance the structural integrity of the frame 880.

Also illustrated in FIG. 12, each side post 810 may comprise a counterbalance compartment 812 and a roller compartment 814. A pulley 816 is rotatably mounted at the top of the counterbalance compartment 812 around an axial pin 891. The pulley belt or cable 892 is trained over the pulley 816 and one end is connected to a counterweight 890 located in the counterbalance compartment 812. The counterweight 980 is configured to generally move vertically (or other direction of the posts) within the counterbalance compartment 812 of the post 810. The other end of the cable 892 is mounted on a counterweight cable mount 843 located on the top of the roller assembly 830.

One example of a locking mechanism that may be used includes a pin-latch locking mechanism where the rotary motion of a control latch may drive linear motion of two locking pins, thereby locking or unlocking the present position of the movable assembly. As illustrated in FIG. 12, the base plate 831 of the roller assembly 830 may comprises at least one opening 837, which is designed to receive an end pin 852 of a pin-latch locking mechanism 850. The end pin 852 may extend through the opening 837 and engage one of the side recesses or openings 813 on the side post 810, thereby locking the roller assembly 830 and the movable assembly 870 to the post 810. In some examples, the side openings 813 may be protected by a cover to avoid inadvertent push out and disengagement of the locking pin 852. The locking pin 852 may also comprise a notch or groove that forms a mechanical interfit with the openings 813 to further resist inadvertent disengagement. In some embodiments, a tubular pin carrier 839 may be mounted around the opening 837 to guide the end pin 852 and to support the end pin 852 and resist deformation or bending of the pin. The pin carrier 839 may be made from any suitable material, e.g., rubber or metal. In some variations, the distal end of the locking pin 852 may be tapered to decrease the accuracy of aligning the locking pins 852 to the lock openings 837.

Figure 13A:
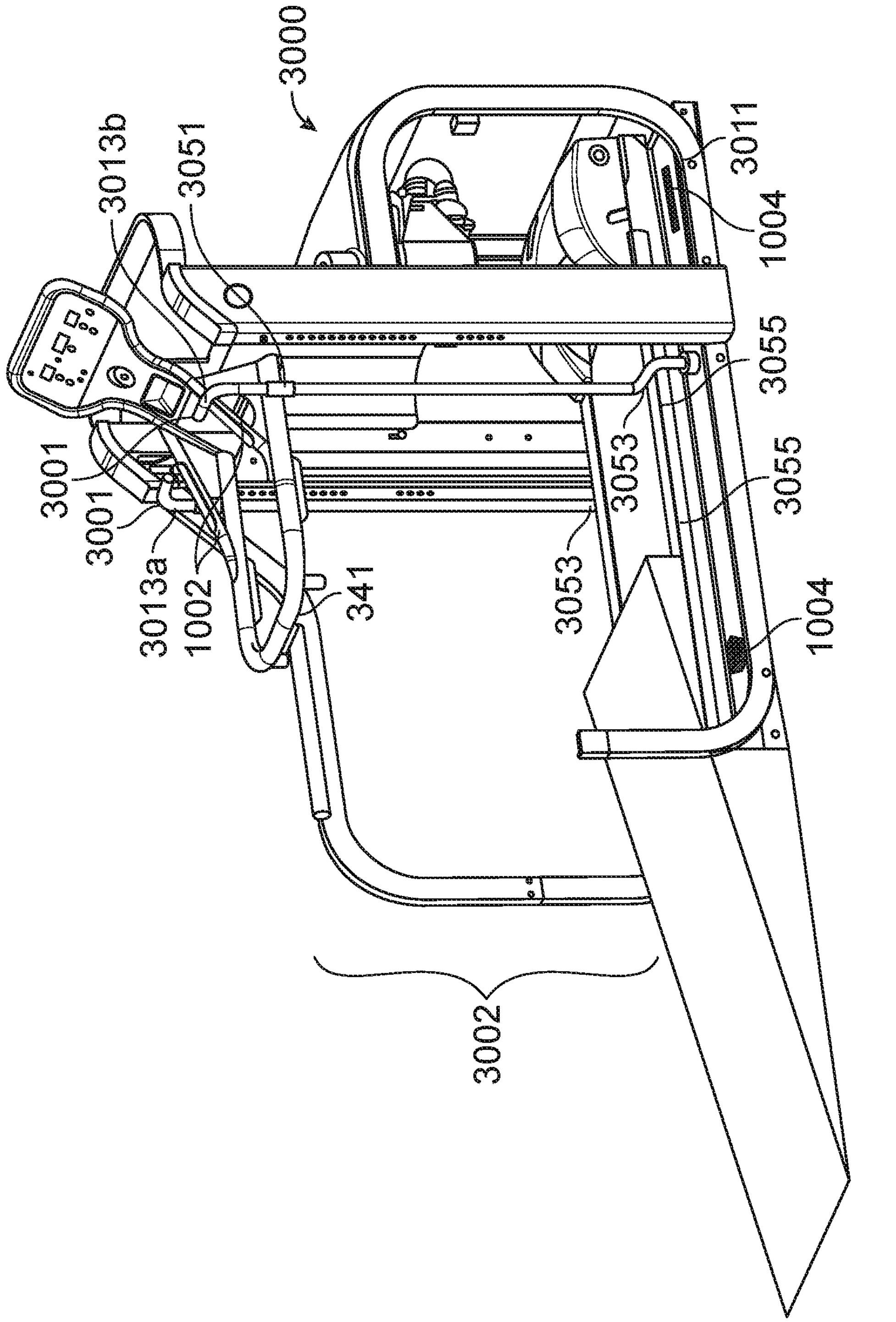
FIGS. 13A-13E show various embodiments of a supportive leaning structure with various load cell configurations.
Figure 13B:
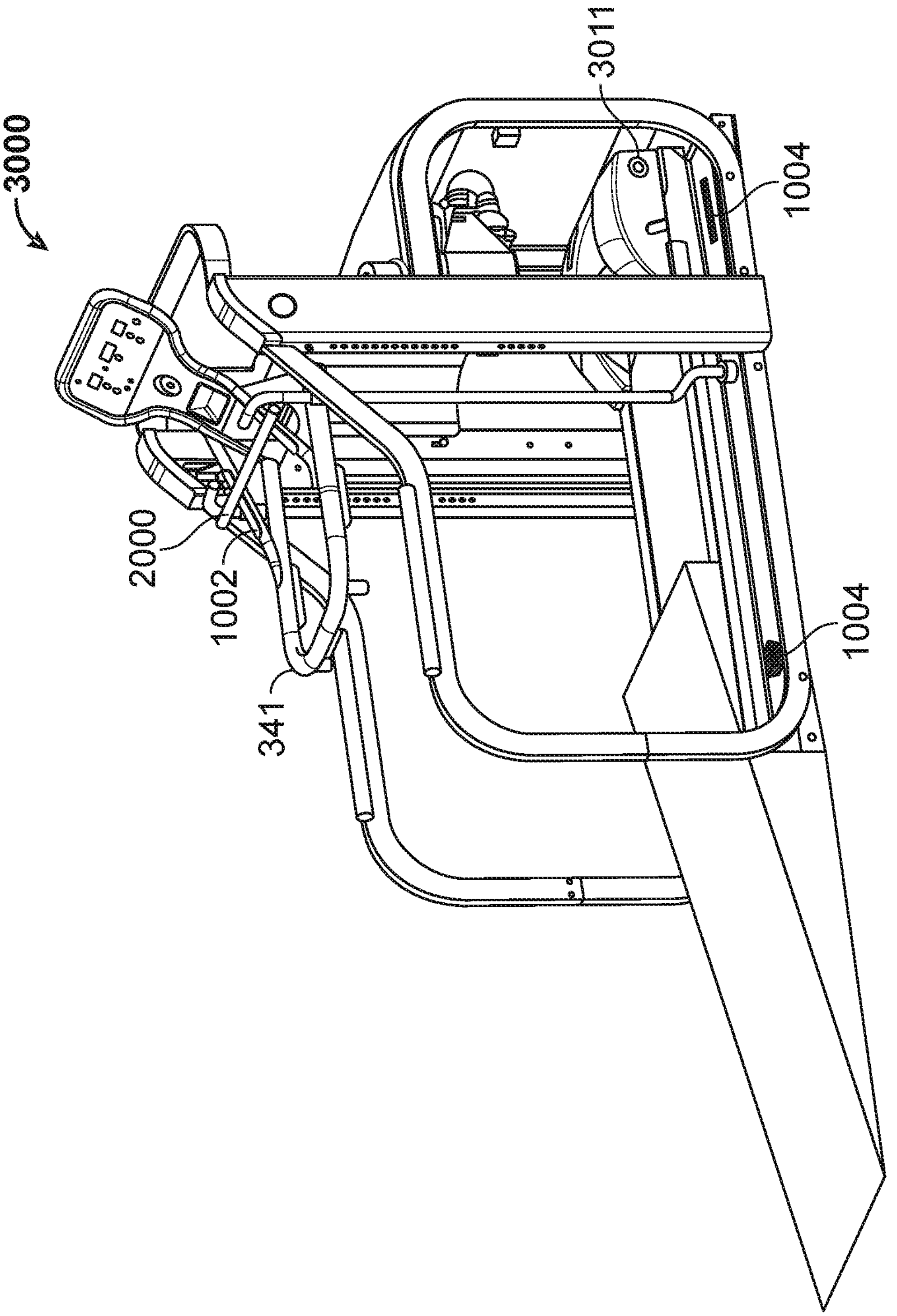
Figure 13C:
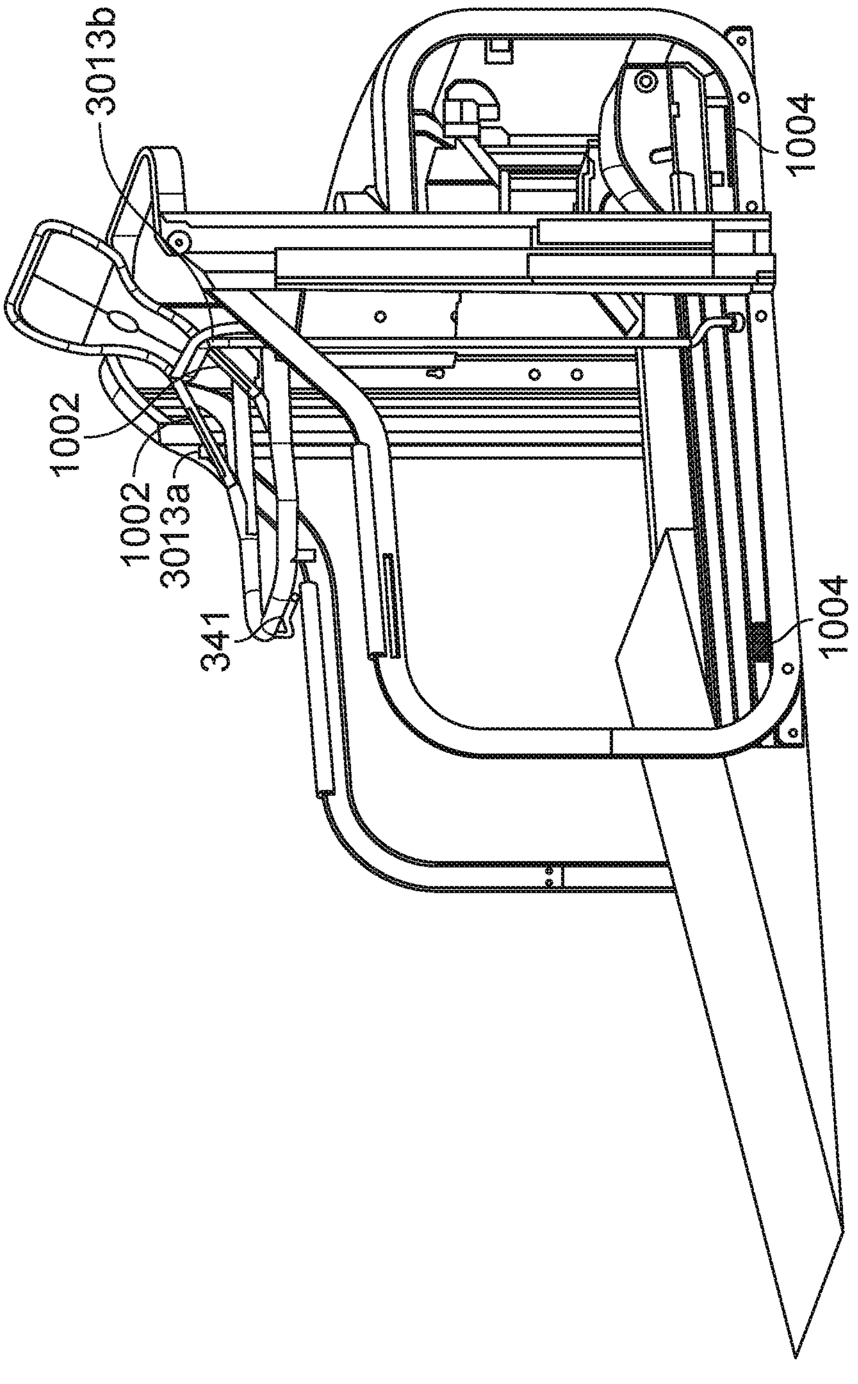

In further embodiments, other access assist devices may include an arm leaning structure 3001 where a portion of the device is inside the chamber. For example, FIGS. 13A-13C shows a DAP system 3000 with a chamber 3002, and an arm leaning structure 3001. The bag is removed for clarity in each of these views. A portion of the structure 3001 resides inside the chamber and a portion is outside the chamber 3002. The transition point between inside/outside the controlled pressure environment within the bag and ambient is provided by a suitably sealed bearing. A portion of the frame is removed in FIG. 13A to show pressure seal bearing 3051 provided for this purpose. The user can lean against the structure 3001 for support during calibration. The structure 3001 may include a set of handles 3013*a-b* for the user to lean or press against to support the user's weight. The structure 3001 may also be in communication with a load sensor to measure the force exerted on the structure by the user.

As shown in FIGS. 13A-13C, the handles 3013*a-b* are within reach of the user and the arm leaning structure distal end 3053 is mounted to the treadmill 3011. While the arm leaning structure or device may be attached in a number of different locations on the treadmill 3011, the embodiments of FIGS. 13A, 13B and 13C illustrate the distal end 3053 being supported by the treadmill frame 3055. In each of these embodiments, load cells 1004 under the treadmill 3011 would measure the weight of the user leaning against handles 3013*a-b* for support. In addition to the support structure 3001, the embodiments in FIGS. 13A and 13C also include handgrips with load cells 1002 in the user seal frame 341 to provide another load-bearing and measuring location on the DAP system. Additionally or alternatively, FIG. 13B shows a support structure 3001 with handles 3013*a-b* and a crossbar 2000 in contact with load sensors 1002. The crossbar 2000 may be any of the alternative cross bar or support bar embodiments described herein.

Figure 13D:
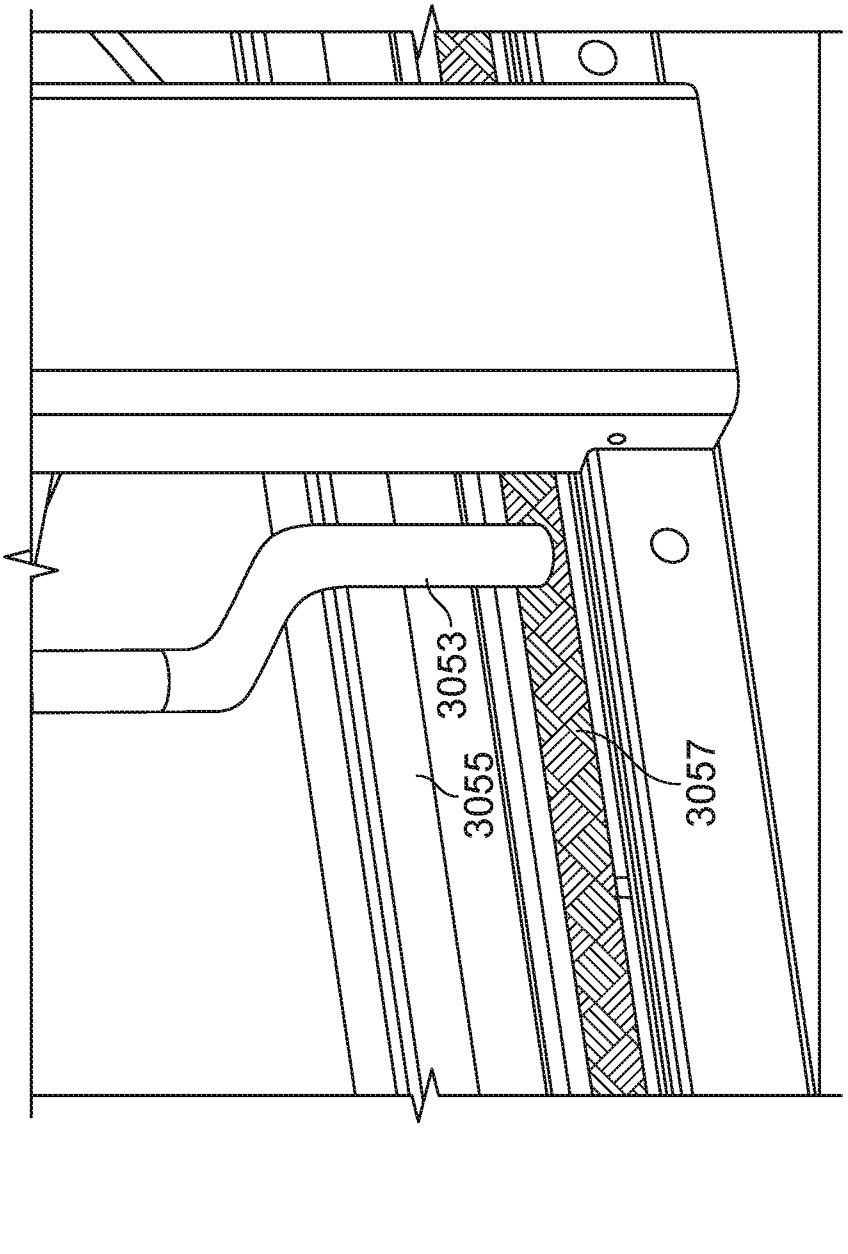
Figure 13E:
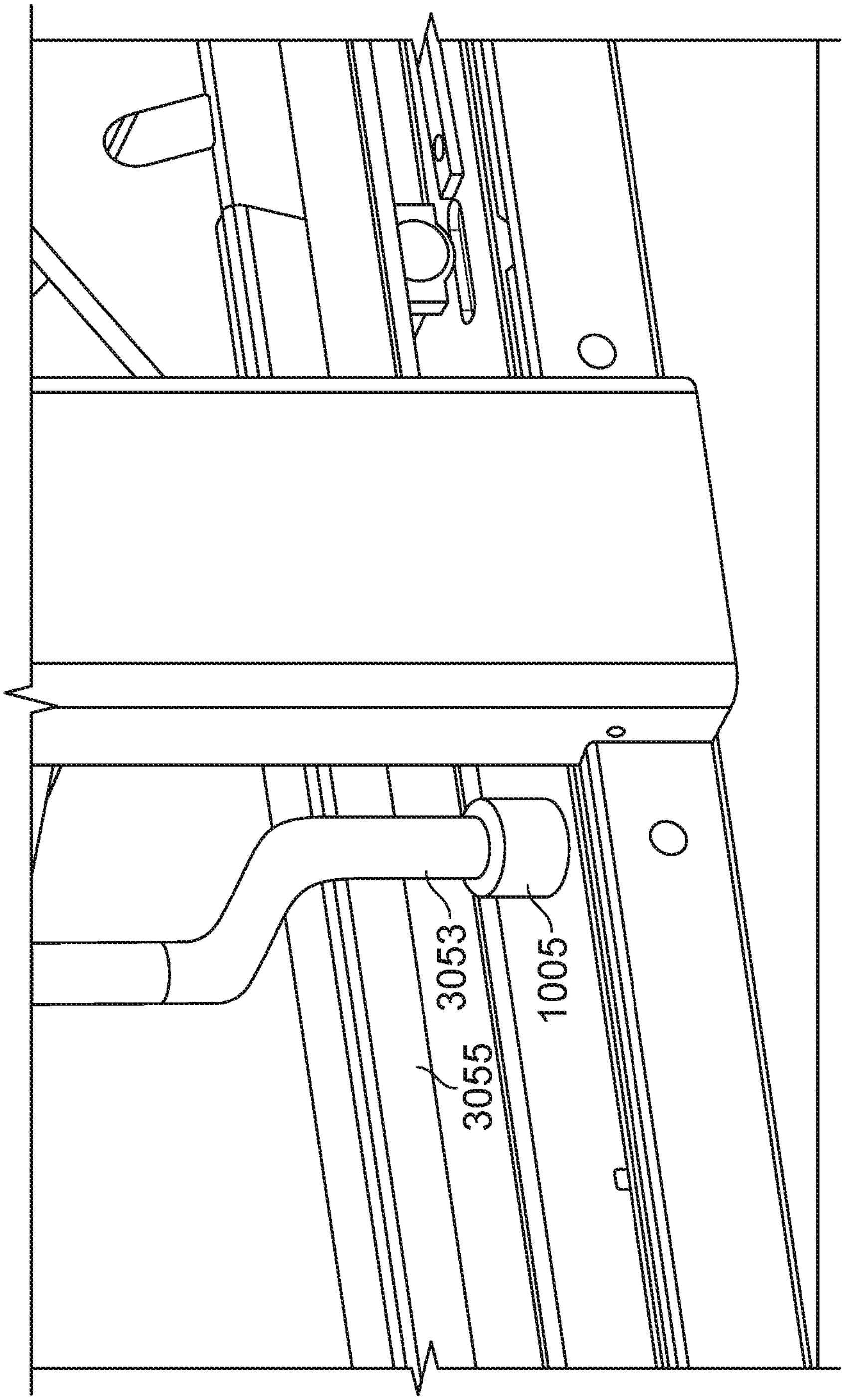

In other alternative embodiments, the load sensor in communication with the structure 3001 may be placed in a configuration different than the configuration illustrated in FIGS. 13A-13C. FIGS. 13D and 13E illustrate alternative load cell configurations based on modifications to the enlarged portion of FIG. 13A. The embodiments of FIGS. 13D and 13E are similar to FIGS. 13A-C in all respects except for these variations in load cell configurations. FIG. 13D illustrates an enlarged portion of distal end 3053 in a variation of the system of FIG. 13A. FIG. 13D includes a support plate 3057 that is coupled to the load cells 1004. The support plate 3057 permits the use of the load cells 1004 while permitting treadmill frame movement independent of the support provided for the structure 3001. The result of this configuration is that any load applied to the structure 3001 is transferred to the plate 3057 and registered by the load cell and controller for use in the calibration program and use of the DAP system.

FIG. 13E illustrates another option for the use of support structure 3001 without relying on the treadmill frame as in FIGS. 13A-13C. FIG. 13E is an enlarged portion of distal end 3053 as in FIG. 13A that includes an additional load cell 1005. The separate load cell 1005 is coupled to the distal end 3053. As such, any load applied to the structure 3001 is transferred to the load cell 1005 and registered by the controller (along with readings from other load cells) for use in the calibration program and use of the DAP system. While the above described embodiments describe a single load cell, it is to be appreciated at one or more load cells may be used to perform a particular function as well as providing separate dedicated load cells for the distal end 3053 of each one of the supports with handles 3013*a*, 3013*b*.

In another variation, the supportive structure is an overhead pull-up bar whereby the user can support a part of his weight by holding onto the bar.

In addition the embodiments described, other variations contemplated provide for a method of calibrating a DAP system for a mobility impaired user. As discussed above, DAP systems provide optimal training and treatment when the system is calibrated for the specific user. In the past, calibration required that the user stand still in the DAP system while measurements of weight and pressure were obtained. This is near impossible for individuals with impaired mobility and motor abilities. As such, the use of the access assist devices described can also provide assistance as calibration devices for calibration of the DAP system for disabled individuals.

Figure 15:
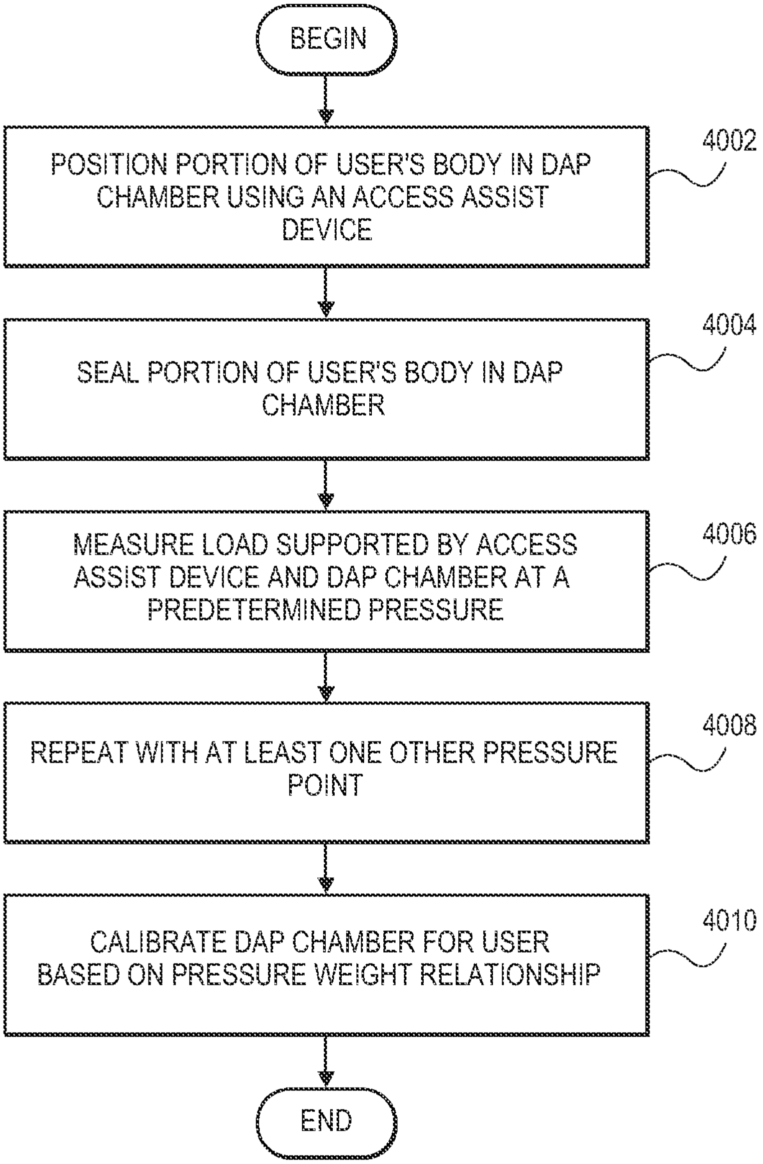
FIG. 15 is a flow diagram schematically illustrating a method for interlocking the system according to one embodiment.

FIG. 15 provides a flowchart showing calibration of the DAP system with an access assist device. At 4002, the user is positioned in the chamber using an access assist device. This may be carried by, for example, lifting the user into the chamber with an overhead suspension system or supporting the user in the chamber with a supportive bar (or both). Once the user is in the chamber, the chamber is sealed around the user at 4004. Then a first weight value is measured at a predetermined pressure at 4006. This may be the user's weight at ambient pressure or the user's weight at a positive pressure in the sealed chamber. The user's weight is determined by the total load supported by the access assist device and the chamber. This is generally measured by the load sensors on the access assist device and in the chamber. For example, a DAP system may have load sensors in the platform or base of the chamber and load sensors in the handrails or a supportive bar attached to the frame assembly. The user may exert weight against the platform as well as the handrails or support bar. As such, the total weight of the user at a pressure point is the combined total load supported and measured by the load sensors. At 4006, the total load supported by the access assist device and the chamber is measured by the load sensors and communicated to the processor. This is repeated at least once at 4008 for another pressure point. Once the processor has at least two pressure and corresponding weight inputs, the processor can calibrate the system according to the described methods above 4010. Briefly, the processor can generate a pressure weight relationship and operate the DAP system according to that relationship.

In some variations, the calibration is done by taking on the load values from a subset of the load sensors available. For example, if the load of the user is substantially completely supported by the access assist device (such as an overhead lifter) then the load value of the sensor attached to the assist device is used to generate a pressure weight relationship. Alternatively, if the load of the user is primarily supported by the DAP system and not by an access assist device, the calibration method may ignore the load sensors of the access assist device. In order to determine which load sensor values to take into account for calibration, the processor may run an initial review of the load sensor values measured at a time or pressure point to eliminate negligible or null values.

In other embodiments, calibrating the DAP system includes a negation step where the load measured by the DAP system or load sensors prior to use with a user is measured and subtracted from the load measure by the DAP system or load sensors while the user is in the DAP system. As can be appreciated, in some embodiments, the load sensors may register and measure the load of the system or the access assist device even where no user is present. A load sensor placed under an exercise device such a treadmill may measure the weight of the treadmill in addition to the weight of a user on the treadmill in the chamber. Accordingly, in some embodiments, the load of the DAP system and access devices without a user may be subtracted from the load of the system and devices with a user. For a given load sensor this relationship may be described as:

$$L_{T(total\ load\ with\ user)} - L_{WU(load\ without\ user/baseline\ measurement)} = L_{U(user\ load\ supported)}$$

FIGS. 20 and 21 provide examples of negation steps according embodiments contemplated. In FIG. 20 system is calibrating by first measuring the load of the DAP Chamber prior to use by a user. The load can be the measurements registered by load sensors in the frame assembly or the base of the DAP system. The load can be measured at any pressure, including ambient pressure. This baseline load measurement/reading can be transmitted and stored by a DAP systems processor or separately entered/inputted as part of the operating the DAP system with the user. After a baseline measurement is obtained, the user can be positioned into and sealed in the chamber. A second load measurement is taken for the total load measured by the load sensors (which reflects the load supported by the system and any access assist device). This second load measurement would include the user's weight as well as the baseline weight. To obtain the weight of the user, the baseline weight can be deducted from the second load measurement. In some embodiments, the processor is configured to receive output signals from the load sensors with the baseline and total measurements. The processor can then deduct the baseline measurement from the total to obtain the user's weight at a pressure point. This process can be repeated with at least one other pressure point to create a pressure weight relationship for the specific user.

In other embodiments, as shown in FIG. 21, the load sensors may be zeroed (e.g. tare) before a user applies weight to the sensors. The user is then placed into the chamber and sealed into the DAP system. The load of the user is then measured at least two pressure points to generate a pressure weight relationship.

In some embodiments, the access assist device may provide weight support prior to calibration but no weight support either during or after calibration. For example, the overhead suspension system of FIGS. 7A-7E can lift and move a user into the chamber 702. Once the user is placed into the chamber, the suspension system may be configured to release tension and discontinue supporting the user's weight. In such circumstances, the user may be able to bear his weight standing or leaning in the chamber during calibration and operation of the DAP system. Once the user is done with the session, the suspension system may re-tension to lift the user out of the chamber 702.

Alternatively, in other embodiments, the access assist device, such as the suspension system, if present during therapy is operated to provide stabilization for the patient while using the DAP system. In one embodiment, the patient is one with compromised trunk control or upper body strength. Stabilizing may be provided by supporting the user without substantially supporting the user's weight. For example, the access assist device may be an overhead suspension system with a harness that lifts the user from a location outside the chamber. Once the user is in the chamber, the suspension system can continue to provide support that does not substantially offset the user's weight in the chamber. This can be done, in some embodiments, where the suspension system maintains lateral support to help keep the user upright in the chamber without lifting the user off the bottom of the chamber. Additionally, the harness system may provide some support to help the user maintain balance in the chamber without substantially offsetting the user's weight. In such cases, the calibration of the DAP system may ignore any negligible load measured by the suspension.

Alternatively, in other embodiments, the suspension system continues to provide weight support even after the user has been placed into the chamber (e.g. after calibration). In such cases, the DAP system may be configured to allow the system to apportion the weight of the user between the suspension system (or other access assist device) and the chamber. The system, via a processor, for example, can monitor the load measured by load sensors and apportion the user's actual weight during therapy. For example, 60% of the user's weight may be supported by the pressure chamber and 40% by the suspension device.

In further embodiments, the processor, such as that shown in FIG. 1A can monitor the load supported by various load sensors 141, 143, and 145 to determine the percentage of the user's weight supported at the various locations. The system can further regulate the pressure of the chamber and the support provided by the access assist device (e.g. tension of the suspension system) to apportion the weight among these and other locations.

While the embodiments have been described generally as being calibrated and used for individuals with impaired mobility, the description above is not limited to improving only the mobility or motor skills of a user. Individuals with any impairment, neurological, physical, or mental can also benefit from the described embodiments. For example, embodiments described can be calibrated and used for any user having difficulty standing upright in a DAP system during calibration and treatment. Described systems can be used to treat decreased mobility resulting from musculoskeletal conditions such as sprains or bone fractures or from neurological conditions such as neurological injury (e.g. from stroke), neurodegenerative conditions (e.g. Alzheimer's or Parkinson's Disease), or traumatic brain injury (TBI). In some embodiments, a user may be treated by DAP therapy in order to regain motor skills that have been damaged or diminished by a physical injury such as muscle atrophy from bone fracture treatment. In other cases, the patient may be improving non-motor functions such as cardiovascular circulation by allowing the patient to move from a prone to a substantially upright position. Similarly, a disabled patient may have increased water retention in, for example, lower limbs. The DAP system and access devices described can provide such a patient the ability to stand substantially upright and to exercise their limbs to help remove excess fluid. Similarly, the DAP system and access devices may be used to help improve mobility for obese or morbidly obese users who wish to exercise but are not physically fit enough to bear their entire weight during exercise.

In further embodiments, the users may be healthy but require assistance in standing upright in the DAP system during therapy. For example, pregnant women are often counseled by healthcare providers to exercise during pregnancy. However, rapid weight gain and changing body conditions often make simple activities like walking unbearable. The DAP systems and access devices described can be used to provide exercise and physical therapy to healthy individuals who need some assistance for exercise.

In some embodiments, a method for improving cardiovascular and respiratory function of user includes first transporting a disabled user into a DAP system. This can be by way of an access assist device such as the overhead suspension systems or wheelchair ramp described. Once in the DAP chamber, the user can be supported by a support bar or other load-bearing support device. The system is then calibrated for the user according to the methods described above. Once calibrated, the DAP system can provide treatment by regulating the pressure in the chamber such that a portion of the user's weight is offset by positive pressure. The user can remain in the chamber for treatment as long as needed for improving cardiovascular and respiratory function. In some embodiments, the DAP system may include sensors to monitor the user's vital signs during treatment to allow for adjustments if necessary.

In other embodiments, a method of improving cardiovascular function in a user with compromised lower body function, comprising lifting the user with compromised lower body function; lowering and sealing the user into a pressure chamber of a differential pressure system; supporting a portion of the user's body to assist in accommodating the degree of compromised lower body function such that the user is substantially upright; sealing the pressure chamber; calibrating the differential pressure system to generate a pressure-weight relationship; and regulating the pressure in the chamber according to the relationship.

Another embodiment provides for a method of improving a stroke patient' motor skills comprising: supporting a portion of the patient's weight with a calibration device; supporting another portion of the patient's weight inside a sealed pressure chamber; sealing the chamber around an area of the patient's body; calibrating the differential pressure system; and regulating the pressure in the chamber according to the relationship.

Although the components of the DAP systems and the access assist devices have been described in certain locations, these embodiments and illustrations are not intended to be limiting. As can be appreciated, for example, any number of combination or positions for the load sensors on the DAP systems and access assist devices are possible. For instance, any number of load sensors can be placed in any number of suitable locations in the systems and devices described. A load sensor can be placed in the base on the chamber, in the seal interface, in the access assist device, on a supportive structure, on a frame assembly, etc. Load sensors may be placed above or below a user as shown in FIGS. 2A-2C, FIGS. 7A-7E, and FIGS. 13A-13F. Load sensors may be attached to the DAP system directly, see FIG. 2A-2E or via another component such as those sensors 2005 shown in FIG. 9. Additionally, multiple load sensors may be placed in common or different locations suitable for measuring the user's weight. It is to be appreciated that the load sensors used in described embodiments may be used in a wide variety of alternative configurations and combinations. Exemplary load cell combinations or configurations include load sensors above the user, 141, below the user (e.g. below torso or lower extremities), 145.

While embodiments have been described and presented herein, these embodiments are provided by way of example only. Variations, changes and substitutions may be made without departing from the embodiments. It should be noted that various alternatives to the exemplary embodiments described herein may be employed in practicing the embodiments. For all of the embodiments described herein, the steps of the methods need not to be performed sequentially.

Although the embodiments herein have been described in relation to certain examples, various additional embodiments and alterations to the described examples are contemplated within the scope of the invention. Thus, no part of the foregoing description should be interpreted to limit the scope of the invention as set forth in the following claims. For all of the embodiments described above, the steps of the methods need not be performed sequentially. Accordingly, it is not intended that the invention be limited, except as by the appended claims.

What is claimed is:

1. A differential pressure system for improving mobility of an individual, comprising:
- a pressure chamber with a seal interface configured to receive a portion of a user's body and to form a seal between the user's body and the chamber, the chamber configured to apply pressure to the portion of the user's body while the user's body is sealed in the chamber;
- a platform within the pressure chamber, wherein the platform is configured to contact the user's body;
- a first sensor within the pressure chamber configured to provide a first output signal based on a load applied to the platform by the user while the user is sealed in the pressure chamber;
- a second sensor outside of the pressure chamber configured to provide a second output signal based on a load applied by the user outside of the pressure chamber; and
- a processor configured to receive the first output signal and the second output signal and determine a weight of the user based on the first and the second output signals.

2. The differential pressure system of claim 1, wherein the processor is further configured to calibrate the system by determining a relationship between pressure in the pressure chamber and the weight of the user.

3. The differential pressure system of claim 1, wherein the weight of the user is a total user weight measured by the first sensor and the second sensor disposed at pressure points.

4. The differential pressure system of claim 1, wherein the processor is further configured to determine a differential air pressure relationship for the user based on pressure within the pressure chamber and signal outputs from the first sensor and the second sensor.

5. The differential pressure system of claim 4, wherein the processor is configured to regulate pressure of the pressure chamber based at least in part on the differential air pressure relationship.

6. The differential pressure system of claim 1, wherein the platform is a part of an exercise device.

7. The differential pressure system of claim 6, wherein the exercise device is a treadmill.

8. The differential pressure system of claim 1, wherein the seal interface is configured to couple the user to the pressure chamber.

9. The differential pressure system of claim 1, further comprising a seal interface frame coupled to the seal interface and configured to support at least a portion of the user's weight.

10. The differential pressure system of claim 9, wherein the second sensor is configured to measure an amount of the user's weight supported by the seal interface.

11. The differential pressure system of claim 1, further comprising a height adjustment mechanism configured to raise and lower the seal interface.

12. The differential pressure system of claim 11, wherein the height adjustment mechanism is further configured to lower the seal interface to allow the user to step into the seal interface.

13. The differential pressure system of claim 11, wherein the height adjustment mechanism includes the second sensor.

14. The differential pressure system of claim 1, further comprising an access assist device configured to support the user while the user is on the platform.

15. The differential pressure system of claim 1, wherein at least one of the first sensor and the second sensor is disposed on the seal interface.

16. A differential pressure system comprising:
- a pressure chamber with a seal interface configured to receive a portion of a user's body and form a seal between the user's body and the pressure chamber, the pressure chamber configured to apply pressure to a portion of the user's body while the user's body is sealed in the pressure chamber;
- an exercise device disposed within the pressure chamber, wherein the exercise device is configured to contact the user's body while the exercise device is in operation;
- a first sensor on the exercise device, the sensor configured to measure a load applied by the user to the exercise device while the user is in the pressure chamber and provide a first output signal;
- a second sensor not on the exercise device and positioned on the differential pressure system outside of the pressure chamber, the second sensor configured to provide a second output signal;
- a height adjustment mechanism configured to raise and lower at least a portion of the pressure chamber; and
- a processor configured to receive the first output signal and the second output signal and calibrate the system for use by the user by generating a relationship between pressure in the pressure chamber and an actual weight of the user while the user is sealed in the pressure chamber, wherein the actual weight of the user is a total user weight measured by the sensors at pressure points, the processor regulating the pressure of the pressure chamber according to said relationship.

17. The differential pressure system of claim 16, wherein the exercise device is a treadmill.

18. The differential pressure system of claim 16, further comprising a locking mechanism configured to lock the height adjustment mechanism.

* * * * *